United States Patent
Raman et al.

(10) Patent No.: US 7,546,364 B2
(45) Date of Patent: Jun. 9, 2009

(54) REPLICATION OF REMOTE COPY DATA FOR INTERNET PROTOCOL (IP) TRANSMISSION

(75) Inventors: Suchitra Raman, Winchester, MA (US); Philippe Armangau, Acton, MA (US); Milena Bergant, North Grafton, MA (US); Raymond A. Angelone, Norfolk, MA (US); Jean-Pierre Bono, Westboro, MA (US); Uresh Vahalia, Newton, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1449 days.

(21) Appl. No.: 10/147,751

(22) Filed: May 16, 2002

(65) Prior Publication Data

US 2003/0217119 A1 Nov. 20, 2003

(51) Int. Cl.
*G06F 15/173* (2006.01)
(52) U.S. Cl. ...................... 709/224; 709/226
(58) Field of Classification Search ............. 719/331, 719/321, 329; 709/227, 201, 224, 216; 395/825; 370/389; 707/204
See application file for complete search history.

(56) References Cited

U.S. PATENT DOCUMENTS

| | | | |
|---|---|---|---|
| 4,686,620 A | 8/1987 | Ng ............................ 364/200 |
| 4,755,928 A | 7/1988 | Johnson et al. ............. 364/200 |
| 5,155,845 A | 10/1992 | Beal et al. ................... 395/575 |
| 5,175,837 A | 12/1992 | Arnold et al. ............... 395/425 |
| 5,175,852 A | 12/1992 | Johnson et al. ............. 395/600 |
| 5,218,695 A | 6/1993 | Noveck et al. ............. 395/600 |
| 5,255,270 A | 10/1993 | Yanai et al. ................. 371/10.2 |
| 5,276,860 A | 1/1994 | Fortier et al. ................ 395/575 |
| 5,276,867 A | 1/1994 | Kenley et al. .............. 395/600 |
| 5,276,871 A | 1/1994 | Howarth ..................... 395/600 |
| 5,301,286 A | 4/1994 | Rajani ......................... 395/400 |

(Continued)

FOREIGN PATENT DOCUMENTS

EP   0 672 985 A1   9/1995

(Continued)

OTHER PUBLICATIONS

Ben Black "Layer 5 Switch" project @ Watson, 1999, p. 1-5.*

(Continued)

*Primary Examiner*—John Follansbee
*Assistant Examiner*—Karen C Tang
(74) *Attorney, Agent, or Firm*—Richard C. Auchterlonie; Novak Druce & Quigg, LLP.

(57) ABSTRACT

Consistent updates are made automatically over a wide-area IP network, concurrently with read-only access to the remote copies. A replication control protocol (RCP) is layered over TCP/IP providing the capability for a remote site to replicate and rebroadcast blocks of the remote copy data to specified groups of destinations, as configured in a routing table. A volume multicast layer over RCP provides for multicasting to specified volume extents of the blocks. The blocks are copied at the logical level, so that it does not matter what physical structure is used for storing the remote copies. Save volumes buffer the remote copy data transmitted between the primary or secondary file system volume and the IP network, in order to ensure independence between the replication process, the IP transport method, and the primary file system being replicated.

12 Claims, 31 Drawing Sheets

U.S. PATENT DOCUMENTS

| | | | | |
|---|---|---|---|---|
| 5,341,493 | A | 8/1994 | Yanai et al. | 395/425 |
| 5,367,698 | A | 11/1994 | Webber et al. | 395/800 |
| 5,379,418 | A | 1/1995 | Shimazaki et al. | 395/575 |
| 5,434,994 | A | 7/1995 | Shaheen et al. | 395/500 |
| 5,487,160 | A | 1/1996 | Bemis | 395/441 |
| 5,535,381 | A | 7/1996 | Kopper | 395/600 |
| 5,590,320 | A | 12/1996 | Maxey | 395/619 |
| 5,594,863 | A | 1/1997 | Stiles | 395/182.13 |
| 5,596,706 | A | 1/1997 | Shimazaki et al. | 395/182.04 |
| 5,611,069 | A | 3/1997 | Matoba | 395/441 |
| 5,615,329 | A | 3/1997 | Kern et al. | 395/182.04 |
| 5,673,382 | A | 9/1997 | Cannon et al. | 395/182.04 |
| 5,680,640 | A | 10/1997 | Ofek et al. | 395/839 |
| 5,701,516 | A | 12/1997 | Cheng et al. | 395/842 |
| 5,742,792 | A * | 4/1998 | Yanai et al. | 711/162 |
| 5,758,149 | A | 5/1998 | Bierma et al. | 395/608 |
| 5,819,292 | A * | 10/1998 | Hitz et al. | 707/203 |
| 5,829,047 | A | 10/1998 | Jacks et al. | 711/162 |
| 5,835,953 | A | 11/1998 | Ohran | 711/162 |
| 5,835,954 | A | 11/1998 | Duyanovich et al. | 711/162 |
| 5,852,715 | A | 12/1998 | Raz et al. | 395/200.31 |
| 5,857,208 | A | 1/1999 | Ofek | 707/204 |
| 5,870,746 | A | 2/1999 | Lo et al. | 707/203 |
| 5,873,116 | A | 2/1999 | Van Fleet | 711/147 |
| 5,875,478 | A | 2/1999 | Blumenau | 711/162 |
| 5,893,140 | A * | 4/1999 | Vahalia et al. | 711/118 |
| 5,901,327 | A * | 5/1999 | Ofek | 710/5 |
| 5,909,483 | A | 6/1999 | Weare et al. | 379/88.18 |
| 5,923,878 | A | 7/1999 | Marsland | 395/704 |
| 5,974,563 | A | 10/1999 | Beeler, Jr. | 714/5 |
| 5,978,951 | A | 11/1999 | Lawler et al. | 714/758 |
| 6,016,501 | A * | 1/2000 | Martin et al. | 707/203 |
| 6,029,175 | A | 2/2000 | Chow et al. | 707/104 |
| 6,035,412 | A | 3/2000 | Tamer et al. | 714/6 |
| 6,052,797 | A | 4/2000 | Ofek et al. | 714/6 |
| 6,076,148 | A | 6/2000 | Kedem | 711/162 |
| 6,078,929 | A | 6/2000 | Rao | 707/200 |
| 6,081,875 | A | 6/2000 | Clifton et al. | 711/162 |
| 6,088,796 | A * | 7/2000 | Cianfrocca et al. | 713/152 |
| 6,092,066 | A | 7/2000 | Ofek | 707/10 |
| 6,101,497 | A | 8/2000 | Ofek | 707/10 |
| 6,108,748 | A | 8/2000 | Ofek et al. | 711/112 |
| 6,192,408 | B1 * | 2/2001 | Vahalia et al. | 709/229 |
| 6,324,654 | B1 * | 11/2001 | Wahl et al. | 714/6 |
| 6,353,878 | B1 | 3/2002 | Dunham | 711/162 |
| 6,401,239 | B1 * | 6/2002 | Miron | 707/203 |
| 6,434,681 | B1 * | 8/2002 | Armangau | 711/162 |
| 6,496,908 | B1 | 12/2002 | Kamvysselis et al. | 711/162 |
| 6,502,205 | B1 | 12/2002 | Yanai et al. | 714/7 |
| 6,564,229 | B1 * | 5/2003 | Baweja et al. | 707/200 |
| 6,578,120 | B1 * | 6/2003 | Crockett et al. | 711/162 |
| 6,694,447 | B1 * | 2/2004 | Leach et al. | 714/6 |
| 6,732,124 | B1 * | 5/2004 | Koseki et al. | 707/202 |
| 6,823,336 | B1 | 11/2004 | Srinivasan et al. | 707/8 |
| 6,938,039 | B1 | 8/2005 | Bober et al. | 707/8 |
| 7,010,553 | B2 * | 3/2006 | Chen et al. | 707/203 |
| 2002/0163910 | A1 * | 11/2002 | Wisner et al. | 370/389 |
| 2004/0030951 | A1 * | 2/2004 | Armangau | 714/6 |
| 2006/0242182 | A1 | 10/2006 | Palaniappan et al. | 707/101 |
| 2007/0033236 | A1 * | 2/2007 | Kaneko et al. | 707/204 |

FOREIGN PATENT DOCUMENTS

| | | |
|---|---|---|
| EP | 0 674 263 A1 | 9/1995 |
| EP | 0674263 * | 9/1995 |

OTHER PUBLICATIONS

IBM Research Report "L5: A Self Learing Layer-5 Switch" IBM Research Division, RC21461, Apr. 29, 1999 pp. 1-19.*
Answers.com, definition of "extend".*
Black "Layer 5 Switch Project @ Watson" May 2, 2002.*
Steere et al., "Efficient User-Level File Cache Management on the Sun Vnode Interface," USENIX Summer Conference, Jun. 11-15, 1990, Anaheim, California, pp. 325-331.
Uresh Vahalia, *UNIX Internals: The new frontiers, Chapter 9, "File System Implementations,"* Prentice-Hall, Inc., Upper Saddle River, New Jersey, 1996, pp. 261-289.
Sun Microsystems, Inc., "NFS: Network File System Protocol Specification," Network Working Group, http://www.attrition.org/~modify/texts/rfc/rfc1094.txt, Mar. 1989, 23 pages.
D.L. Burkes and R.K. Treiber, "Design Approaches for Real-Time Transaction Processing Remote Site Recovery," Digest of Papers in Spring COMPCON90, Feb. 26-Mar. 2, 1990, *Thirty-Fifth IEEE Computer Society International Conference,* San Francisco, CA, pp. 568-572.
"Filesystem *Manager*—VxFS," http://www.fujitsu-computers.com/Servers/software/ds-mgw-12.html, published at least as early as Oct. 28, 2000, 2 pages.
"VERITAS Volume Manager," http://www.sun.com/stor.../volumemgr.html;$sessionid$QEOQTDQAAC2QHAMTA1FU5Y, published at least as early as Oct. 28, 2000, 3 pages.
"VERITAS NetBackup and Storage Migrator," http://www.sun.com/stora.../netbackup.html;$sessionid$QEOQTDQAAC2QHAMTA1FU5Y, published at least as early as Oct. 28, 2000, 5 pages.
"VERITAS® File System™ System Administrator's Guide," Release 3.2, VERITAS® Software Corporation, Introduction, Index, Performance and Tuning (Chapter 5), fsadm_vxfs(1M)—resize or reorganize a VERITAS File System (http://uw7doc.sco.com/ODM_FSadmin/fssag-1.html, fssag-13.html, fssag-8.html, and http://uw7doc.sco.com/cgi-bin/man/man?fsadm_vxfs+1M) published at least as early as Oct. 28, 2000, 31 pages.
"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www-ftp.legata.com/News/Press/PR209.html; published at least as early as Oct. 11, 1999, 17 pages.
R. Stager and D. Hitz, Internet Draft filename "draft-stager-iquard-netapp-backup-05.txt," *Network Data Management Protocol (NDMP),* last update Oct. 12, 1999, pp. 1-73.
ISO/OSI Network Model, jttp://www.uwsg.indiana.edu/usail/network/nfs/networs_layers.html, published at lest as early as Apr. 10, 2002, 3 pages.
Jeremy Buhler, "The Fox Project—A Language-Structured Approach to Networking Software," ACM Crossroads Student Magazine, http://www.acm.org/crossroads/xrds2-1/foxnmet.html, Issue 2.1 Sep. 1995, 15 pgs.
Charles L. Hendrick, What is TCP/IP?, Rutgers University, htttp://oac3.hsc.uth.tmc.edu/staff/snetwon/tcp-tutorial/sec1.html, published at least as early as Jul. 11, 2002.
RFC 791, Internet Protocol, DARPA Internet Program Protocol Specification, Information Sciences Institute, University of Southern California, Marina del Rey, California, Sep. 1981, http://rfc.sunsite.dk/rfc/rfc791.html, 53 pgs.
RFC 793, Transmission Control Protocol, DARPA Internet Program Protocol Specification, Information Sciences Institute, University of Southern California, Marina del Rey, California, Sep. 1981, http://rfc.sunsite.dk/rfc/rfc793.html, 91 pgs.
J.K. Reynolds & J. Postel, RFC 1011, Official Internet Protocols, May 1987, http://rfc.sunsite.dk/rfc/rfc1011.html, 53 pgs.
Andy Watson & Paul Benn, Multiprotocol Data Access: NFS, CIFS, and HTTP, TR3014, Network Appliance, Inc,., http://www.netapp.com/tech_library/3014.html, published at least as early as Jul. 12, 2002, 29 pgs.
Paul J. Leach and Dilip C. Naik, Internet draft filename "draft-leach-cifs-v1-spec-01.txt," *A Common Internet File System (CIFS/1.0) Protocol,* Network Working Group, Dec. 19, 1997, pp. 1-121.
John Larmouth, Understanding OSI, International Thompson Computer Press 1996, http://www.isi.salford.ac.uk//books/osi.html, figures and 150 pgs. text.

EMC TimeFinder Product Description Guide, EMC Corporation, Hopkinton, MA, 1998, pp. 1-31.

Leveraging SnapView/IP in Oracle8i Environments with the CLARiiON IP4700 File Server, Engineering White Paper, EMC Corporation, Hopkinton, MA, Feb. 13, 2002, pp. 1-16.

Using EMC CLARiiON FC4700 and SnapView with Oracle 8i, Engineering White Paper, EMC Corporation, Hopkinton, MA, Mar. 4, 2002, pp. 1-22.

Disaster Recovery Guidelines for using HP SureStore E XP256, Continuous Access XP with Oracle Databased Rev 1.03, Hewlett-Packard Company, Palo Alto, CA, May 2000, pp. 1-28.

Enterprise Volume Manager and Oracle8 Best Practices, Compaq White Paper, Compaq Computer Corporation, Dec. 1999, pp. 1-11.

VERITAS Database Edition for Oracle, Guidelines for Using Storage Checkpoint and Storage Rollback with Oracle Databases, Veritas Software Corporation, Mountain View, CA, Aug. 2001, pp. 1-16.

VERITAS Volume Replication and Oracle Databases, A Solutions White Paper, Veritas Software Corporation, Mountain View, CA, May 29, 2000, pp. 12-31.

Nabil Osorio and Bill Lee, Guidelines for Using Snapshot Storage Systems for Oracle Databases, Oracle Corporation, Oct. 2001, pp. 12.

Koop, P., "Replication at Work. (four companies use Oracle and Sybase replication servers to solve business problems)," DBMS, vol. 8, No. 3, p. 54(4), Mar. 1995.

King and Halim, "Management of a Remote Backup Copy for Disaster Recovery," ACM Transactions on Database Systems, vol. 16, No. 2, Jun. 1991, pp. 338-368.

Polyzois, C.A., and Garcia-Molina, H., "Processing of Read-Only Queries at a Remote Backup," Proceedings of the 13th Symposium on Reliable Distributed Systems, Oct. 25-27, 1994, Dana Point, CA, IEEE Computer Society Press, Los Alamitos, CA, pp. 192-201.

Remote Mirroring Technical White Paper, Copyright 1994-2002 Sun Microsystems, published at least as early as May 17, 2002 at sun.com, 25 pages.

Thanhardt, E., and Harano, G., "File Migration in the NCAR Mass Storage System," Digest of Papers 9th IEEE Symposium on Mass Storage Systems (Editors, Friedman, K., and O'Lear, B.T.), 1988, Storage Systems: Perspectives, Nov. 1988, pp. 114-121 (also submitted is a one-page ieeexplore.ieee.org abstract).

Gorelik et al., "Sybase Replication Server," International Conference on Management of Data and Symposium on Principles of Database Management 1994 SIGMOD, pp. 469 (also submitted is a two-page portal.acm.org abstract).

Internet Routing Registry home page, irr.net, Merit Network Inc., Ann Arbor, MI, Jan. 3, 2006 (1 page).

RPSL Reference Guide, irr.net, Merit Network Inc., Ann Arbor, MI, Jan. 3, 2006 (2 pages.

Joe Klemencic, "Securing Windows 2000 Communications with IP Security Filters, Part 1," securityfocus.com, SecurityFocus Semantec Corporation, Cupertino, CA, Mar. 21, 2002 (12 pages).

Joe Klemencic, "Securing Windows 2000 Communications with IP Security Filters, Part 2," securityfocus.com, SecurityFocus Semantec Corporation, Cupertino, CA, Apr. 10, 2002 (11 pages).

George Apostolopoulos, et al., "Design, Implementation and Performance of a Content-Based Switch," IEEE Infocom 2000, IEEE, New York, NY, 2000 (10 pages).

"TrafficDirector," Cisco Systems, San Jose, CA, 1999, Chapter 1 (pp. 1-1 to 1-28) and Chapter 8 (pp. 8-1 to 8-24).

Ariel Cohen et al., "On the Performance of TCP Splicing for URL-aware Redirection," USENIX Symposium on Internet Technologies and Systems, usenix.org, Berkeley, CA, 1999 (9 pages).

Ron Rivest, "6.915 Computer and Network Security," Lecture 22, Nov. 28, 1995, MIT, Cambridge, MA (9 pages).

"Port Numbers," iana.org, The Internet Corporation for Assigned Names and Numbers, Dec. 22, 2005, pp. 1-10 and 234-236.

Laura Darcy and Louise Bolston, Webster's New World Dictionary of Computer Terms, 1983, p. 101, Simon & Schuster, Inc., New York, NY.

Steven M. Kaplan, Wiley Electrical and Electronics Engineering Dictionary, 2004, p. 270, John Wiley & Sons, Inc., Hoboken, NJ.

"Extent (file systems)," *Wikipedia,* May 29, 2007, 2 pages, Wikimedia Foundation Inc., St. Petersburg, FL.

Uresh Vahalia, *UNIX Internals, The New Frontiers,* Chapter 11, Sec. 11.3, File System Clustering (Sun-FFS), 1996, pp. 343-344, Prentice-Hall, Inc., NJ.

L. W. McVoy & S. R. Kleiman, "Extent-like Performance from a UNIX File System," USENIX—Winter '91, Jan. 21-25, 1991, 12 pages, Dallas, TX, Sun Microsystems, Santa Clara, CA.

Frank Kyne et al., "Parallel Sysplex—Software Management for Availability," Dec. 1999, 470 pages, IBM Corporation, Armonk, NY.

*HP JFS 3.3 and HP OnLineJFS 3,3 VERITAS File System 3.3 System Administrator's Guide for HP-UX 11.00 and HP-UX 11i.,* Nov. 2000, 166 pages, Hewlett Packard, Palo Alto, CA.

"Sun StorEdge 990 Flash Copy 2.0 Software for Sun StorEdge 9970 and 9980 Systems," *Storage,* Article #14148, vol. 84, Issue 4, Feb. 21, 2005, System News, Inc., Coral Springs, FL.

Apostolopoulos, et al., "Design, implementation and performance of a content-based switch," INFOCOM 2000, Nineteenth Annual Joint Conference of the IEEE Computer and Communications Societies, Proceedings, IEEE, vol. 3, Mar. 26-30, 2000, pp. 1117-1126, IEEE, New York, NY.

Apostolopoulos, et al., "L5: A Self Learning Layer-5 Switch," IBM Research Report, RC 21461 (96667) Apr. 29, 1999, 18 pages, IBM Corporation, Armonk, NY.

\* cited by examiner

REPLICATION OF REMOTE COPY DATA FOR INTERNET PROTOCOL (IP) TRANSMISSION

BACKGROUND OF THE INVENTION

1. Limited Copyright Waiver

A portion of the disclosure of this patent document contains computer code listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to data storage systems, and more particularly to network file servers. The present invention specifically relates to a network file server distributing remote copy data over a network using the Internet Protocol (IP).

3. Description of the Related Art

Remote copy systems have been used for automatically providing data backup at a remote site in order to insure continued data availability after a disaster at a primary site. Such a remote copy facility is described in Ofek, U.S. Pat. No. 5,901,327 issued May 4, 1999, entitled "Bundling of Write Data from Channel Commands in a Command Chain for Transmission over a Data Link Between Data Storage Systems For Remote Data Mirroring," incorporated herein by reference. This remote copy facility uses a dedicated network link and a link-layer protocol for 1:1 replication between a primary storage system and a secondary storage system.

More recently there has arisen a need for wide-area distribution of read-only data. This need typically arises when wide-area distribution of the read-only data would prevent remote users from overloading a local server, and would reduce signal transmission delay because the remote users could access remote copies nearer to them. The wide-area distribution of the read-only data is complicated by the need for consistent updates to the remote copies. It is desired for these updates to be made automatically over the wide-area network, and concurrently with read-only access to the remote copies.

SUMMARY OF THE INVENTION

In accordance with a first aspect, the invention relates to a method used in a data processing system having a plurality of host computers linked by an-Internet Protocol (IP) network to a plurality of data storage systems. Each of the data storage systems has data storage and at least one data mover computer for moving data between the data storage and the IP network. The method distributes remote copy data over the IP network from a primary data mover computer to a plurality of secondary data mover computers. The method includes the primary data mover computer sending the remote copy data over the IP network to at least one forwarder data mover computer, and the forwarder data mover computer routing the remote copy data over the IP network to the plurality of secondary data mover computers.

In accordance with another aspect, the invention provides a data processing system. The data processing system includes a plurality of data storage systems linked by an Internet Protocol (IP) network for access by a plurality of host computers. Each of the storage systems has data storage and at least one data mover computer for moving data between the data storage and the IP network. Moreover, the data mover computers include means for distributing remote copy data over the IP network from a primary data mover computer to a plurality of secondary data mover computers by the primary data mover computer sending the remote copy data over the IP network to at least one forwarder data mover computer, and the forwarder data mover computer routing the remote copy data over the IP network to the plurality of secondary data mover computers.

In accordance with yet another aspect, the invention provides a server for an Internet Protocol (IP) network. The server is programmed with a routing table, a TCP/IP layer, and a replication control protocol (RCP) session layer over the TCP/IP layer. The routing table identifies destinations in the network for remote copy data. The replication control protocol session layer is programmed to produce an inbound session in response to the file server receiving remote copy data from a source in the IP network, and at least one outbound session for transmitting the remote copy data to a plurality of destinations identified in the routing table as destinations for the remote copy data from the source.

In accordance with still another aspect, the invention provides a primary data storage system for distributing remote copy data over an Internet Protocol (IP) network to at least one secondary data storage system in the IP network. The primary data storage system includes data storage and a data mover computer for moving data between the IP network and the data storage. The data storage includes a primary volume including a primary copy of the remote copy data, and a save volume used as a buffer between the primary volume and the IP network. The data mover computer is programmed with a TCP/IP layer, a replication control protocol (RCP) layer over the TCP/IP layer for transmitting blocks of data from the save volume over the IP network, and a replication module for writing modified blocks of the primary volume to the save volume.

In accordance with yet still another aspect, the invention provides a secondary data storage system for receiving remote copy data distributed over an Internet Protocol (IP) network from a primary data storage system. The remote copy data includes modified blocks of a primary volume in the primary data storage system. The secondary data storage system includes data storage and a data mover computer for moving data between the IP network and the data storage, wherein the data storage includes a secondary volume including a secondary copy of the primary volume, and a save volume used as a buffer between the IP network and the secondary volume for buffering the modified blocks in the remote copy data. The data mover computer is programmed with a TCP/IP layer, a replication control protocol (RCP) layer over the TCP/IP layer for transmitting the modified blocks of remote copy data from the IP network to the save volume, and a playback module for writing the modified blocks of the remote copy data from the save volume to the secondary volume.

In accordance with a final aspect, the invention provides a network file server for use in an Internet Protocol (IP) network. The network file server has data storage including a file system volume for storing a file system, and a TCP port for connection to the IP network to permit access from the IP network to the file system. The network file server is programmed with a series of protocol layers including a TCP/IP layer, a replication control protocol (RCP) layer, and a volume multicast layer. The TCP/IP layer provides access to the IP network through the TCP port in accordance with the standard Transmission Control Protocol. The replication control protocol (RCP) session layer is over the TCP/IP layer for transmission, forwarding, and reception of blocks of remote copy data in accordance with a replication control protocol in which the blocks of remote copy data are transmitted and forwarded to specified groups of destinations in the IP network. The network file server also has a routing table configured with the groups of destinations, and the RCP layer accesses the routing table to determine the destinations in the specified groups for transmission or forwarding. The volume multicast layer is over the RCP layer for transmission or reception of specified volume extents of blocks between the file system volume and the IP network.

BRIEF DESCRIPTION OF THE DRAWINGS

Other objects and advantages of the invention will become apparent upon reading the following detailed description with reference to the accompanying drawings wherein.

Figure 1:
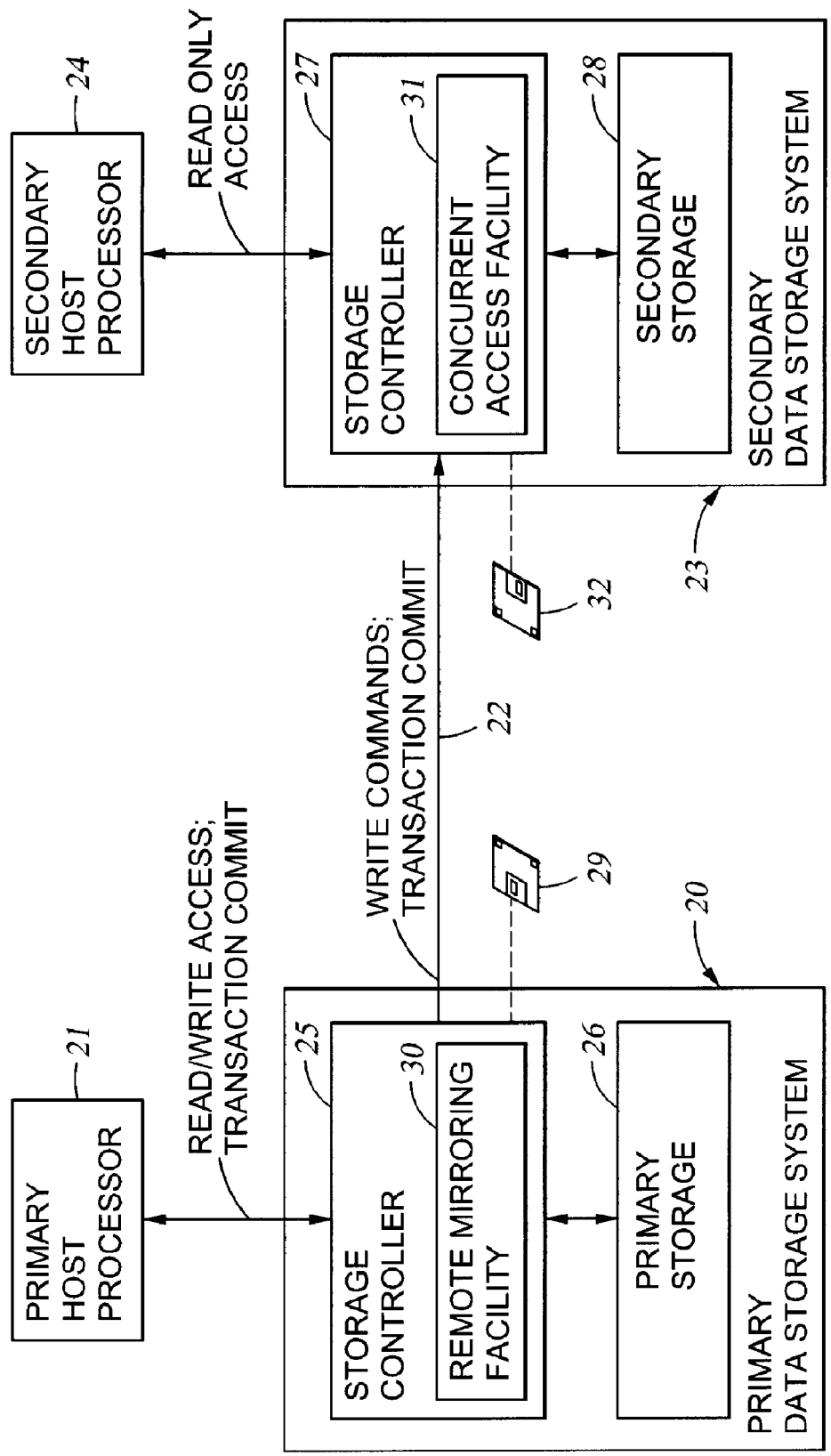
FIG. 1 is a block diagram of a data processing system in which a primary data storage system servicing a primary host processor is linked to a secondary storage system servicing a secondary host processor to provide the secondary host processor uninterrupted read-only access to a consistent dataset concurrent with read-write access by the primary host processor.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

The present invention relates to replication of remote copy data for Internet Protocol (IP) transmission. One application of the present invention is wide-area distribution of read-only data. For this application, it is desired to provide uninterrupted read-only access to remote copies of a consistent file system concurrent with read-write updating of the file system. The preferred method of providing such uninterrupted read-only access is to use a "delta set" mechanism described in Srinivasan et al., U.S. patent application Ser. No. 09/669,939, filed Sep. 26, 2000, which is commonly owned by the assignee of the present application. FIGS. 1 to 14 and the corresponding written description in the present application have been reproduced from Ser. No. 09/669, 939.

Uninterrupted Read-Only Access to a Remote Copy of a Consistent File System Concurrent with Read-Write Updating of a Primary Copy of the File System.

With reference to FIG. 1, there is shown a data processing system in which a primary data storage system 20 servicing a primary host processor 21 is connected via a transmission link 22 to a secondary storage system 23 servicing a secondary host processor 24. The primary data storage system 20 includes a storage controller 25 controlling access to primary storage 26, and the secondary data storage system 23 has a storage controller 27 controlling access to secondary storage 28. The storage controller 25 is programmed, via a program storage device such as a floppy disk 29, with a remote mirroring facility 30, which transmits write commands from the primary host processor 21 over the link 22 to the storage controller 27 in the secondary storage system. The storage controller 27 receives the write commands and executes them to maintain, in the secondary storage 28, a copy of data that appears in the primary storage 26 of the primary data storage system. Further details of a suitable remote mirroring facility are disclosed in Ofek et al., U.S. Pat. No. 5,901,327 issued May 4, 1999, incorporated herein by reference.

In accordance with an aspect of the present invention, the storage controller 27 in the secondary data storage system is programmed with a concurrent access facility for providing the secondary host processor 24 uninterrupted read-only access to a consistent dataset in the secondary storage 28 concurrent with read-write access by the primary host processor. For example, the concurrent access facility 31 is loaded into the storage controller 27 from a program storage device such as a floppy disk 32. The concurrent access facility 31 is responsive to the write commands from the primary data storage system, and read-only access commands from the secondary processor 24. The concurrent access facility 31 is also responsive to transaction commit commands, which specify when the preceding write commands will create a consistent dataset in the secondary storage 28. The transaction commit commands originate from the primary host processor 21, and the storage controller 25 forwards at least some of these transaction commit commands over the link 22 to the storage controller 27.

Figure 2:
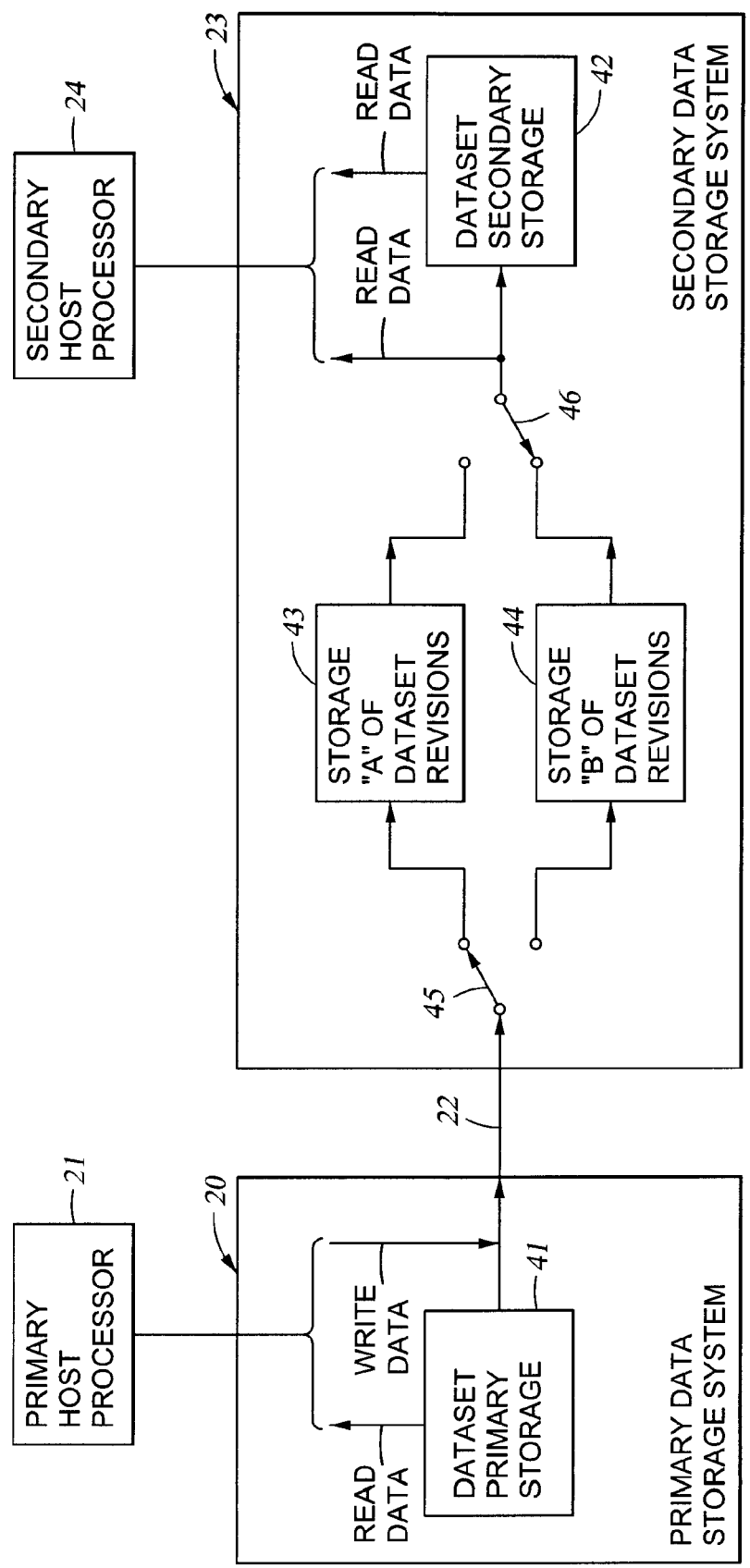
FIG. 2 is a block diagram showing data flow through the data processing system of FIG. 1.

FIG. 2 is a block diagram showing data flow through the data processing system of FIG. 1. The primary data storage system 20 stores a dataset 41 in primary storage, and the secondary data storage system 23 maintains a copy of the dataset 42 in secondary storage. The dataset, for example, could be a set of volumes, a single volume, a file system, a set of files, or a single file. Initially, each of the datasets 41 and 42 are empty, or they are identical because they are loaded from the same external source, or the dataset 42 is copied from the dataset 41 before any write operations are permitted upon the dataset 41. Subsequently, write operation by the primary host processor 21 cause write data to be written to the dataset 41 in primary storage, and read operations by the primary host processor 21 cause read data to be read from the dataset 41 in primary storage. In addition, the primary data storage system forwards the write data from the primary host processor 21 over the link 22 to the secondary data storage system 23. A first switch 45 directs write data from the link 22 alternately to either a first storage "A" of dataset revisions 43, or a second storage "B" of dataset revisions 44. A second switch 46 alternately directs write data to the dataset secondary storage 42 from either the first storage "A" of dataset revisions 43, or the second storage "B" of dataset revisions. The switches 45 and 46 are linked so that when the first switch 45 selects the first storage "A" of dataset revisions for receiving write data from the link 22, the second switch 46 selects the second storage "B" of dataset revisions for transmitting write data to the dataset secondary storage 42. Conversely, when the first switch 45 selects the second storage "A" of dataset revisions for receiving write data from the link 22, the second switch 46 selects the first storage "B" of dataset revisions for transmitting write data to the dataset secondary storage 42.

To provide the secondary host processor with uninterrupted read-only access to a consistent dataset, the switches 45 and 46 are toggled in response to receipt of a transaction commit command received over the link 22 from the primary data storage system. Moreover, the switches 45 and 46 are not toggled unless all of the revisions in the read-selected storage "A" or "B" of dataset revisions have been transferred to the dataset secondary storage 42, and unless all of the updates since the last transaction commit command have actually been written from the link 22 into the write-selected storage "A" or "B" of dataset revisions. (For the switch positions in FIG. 2, the storage "A" of dataset revisions 43 is write-selected, and the storage "B" of dataset revisions is read-selected.) Therefore, the combination of the dataset revisions in the read-selected storage "A" or "B" of dataset revisions with the dataset in the dataset secondary storage represents a consistent dataset. Just after the switches 45 and 46 are toggled, the secondary data storage system begins a background process of reading dataset revisions from the read-selected storage "A" or "B" of dataset revisions, and writing the updates into the dataset secondary storage. Moreover, at any time the secondary host processor 24 may read any dataset revisions from the read-selected storage "A" or "B" of dataset revisions. If a dataset revision is not found in the read-selected storage "A" or "B" of dataset revisions for satisfying a read command from the secondary host processor 24, then read data is fetched from the dataset secondary storage 42.

One advantage to the present invention is that the concurrent access facility 31 can provide the secondary host processor with substantially uninterrupted and concurrent read-only access to a consistent dataset regardless of the rate at which the dataset secondary storage 42 is updated to a consistent state by the completion of integration of a set of revisions into the dataset secondary storage. Therefore, the dataset in the dataset secondary storage 42 can be updated at a relatively low rate, and the storage controller 25 of the primary data storage system 20 can send transaction commit commands to the storage controller 27 of the secondary data storage system 23 at a much lower rate than the rate at which the storage controller 25 receives transaction commit commands from the primary host processor 21. Moreover, the transaction commit commands can be encoded in the write commands sent over the link. For example, the write commands can write alternate sets of revisions to alternate dataset revision storage, as will be described below with respect to FIG. 9. In such a case, the storage controller 27 in the secondary data storage system 23 can regenerate the transaction commit commands by detecting that the addresses of the write commands have switched from one area of dataset revision storage to the other. Moreover, each write command can be tagged with a corresponding sequence number so that the storage controller 27 in the secondary data storage system 23 can verify that a complete set of write commands has been received prior to the switch of the write command addresses from one area of the dataset revision storage to the other.

Figure 3:
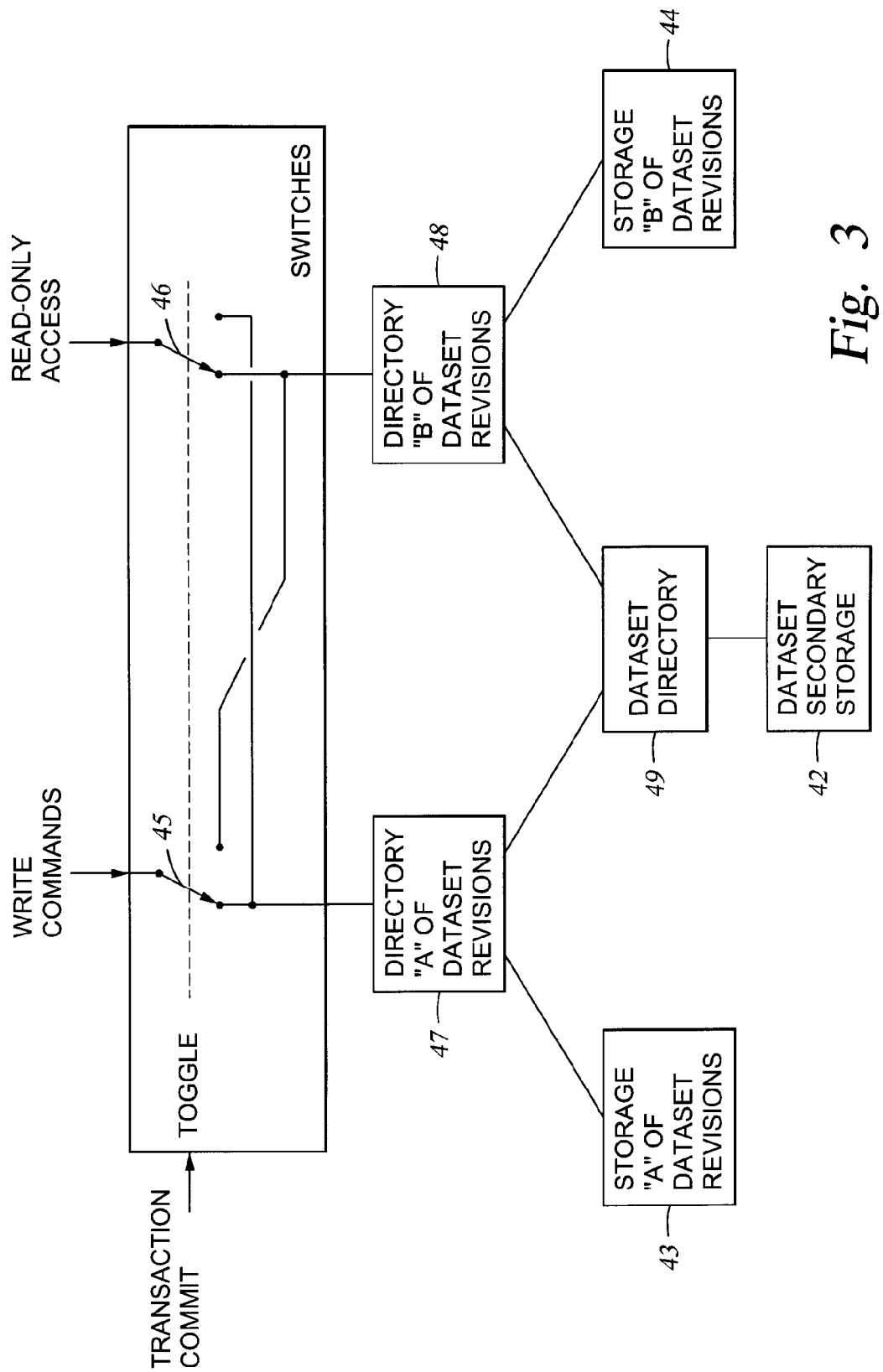
FIG. 3 is a block diagram showing control flow through the secondary data storage system of FIG. 1.

FIG. 3 is a block diagram showing control flow through the secondary data storage system of FIG. 1. Upon receipt of a write command (from the link 22 in FIGS. 1 and 2), the secondary data storage system accesses a directory 47 or 48 for the write-selected storage "A" or "B" of dataset revisions. The directory is accessed to determine whether or not the write command is accessing the same data item or data storage location as an update existing in the write-selected storage "A" or "B" of dataset revisions. If so, then the directory provides the location of the update in the write-selected storage "A" or "B" of dataset revisions, and the write command is executed upon that pre-existing update. If not, then storage is allocated in the write-selected storage "A" or "B" of dataset revisions for the update of the write command, the update of the write command is written into the allocated storage, and the directory 47 or 48 of the write-selected storage "A" or "B" of dataset revisions is updated to associate the allocated storage for the storage location or data item accessed by the write command.

Upon receipt of a read-only access command from the secondary host processor, the secondary data storage system accesses the directory 47 or 48 for the read-selected storage "A" or "B" of dataset revisions. The directory is accessed to determine whether or not the read-only access command is accessing the same data item or data storage location as an update existing in the read-selected storage "A" or "D" of dataset revisions. If so, then the directory provides the location of the update in the read-selected storage "A" or "B" of dataset revisions, and the read-only access command is executed upon that pre-existing update. If not, then the secondary data storage system accesses a dataset directory 49 for the dataset secondary storage 42, in order to locate the requested data in the dataset secondary storage 42.

Figure 4:
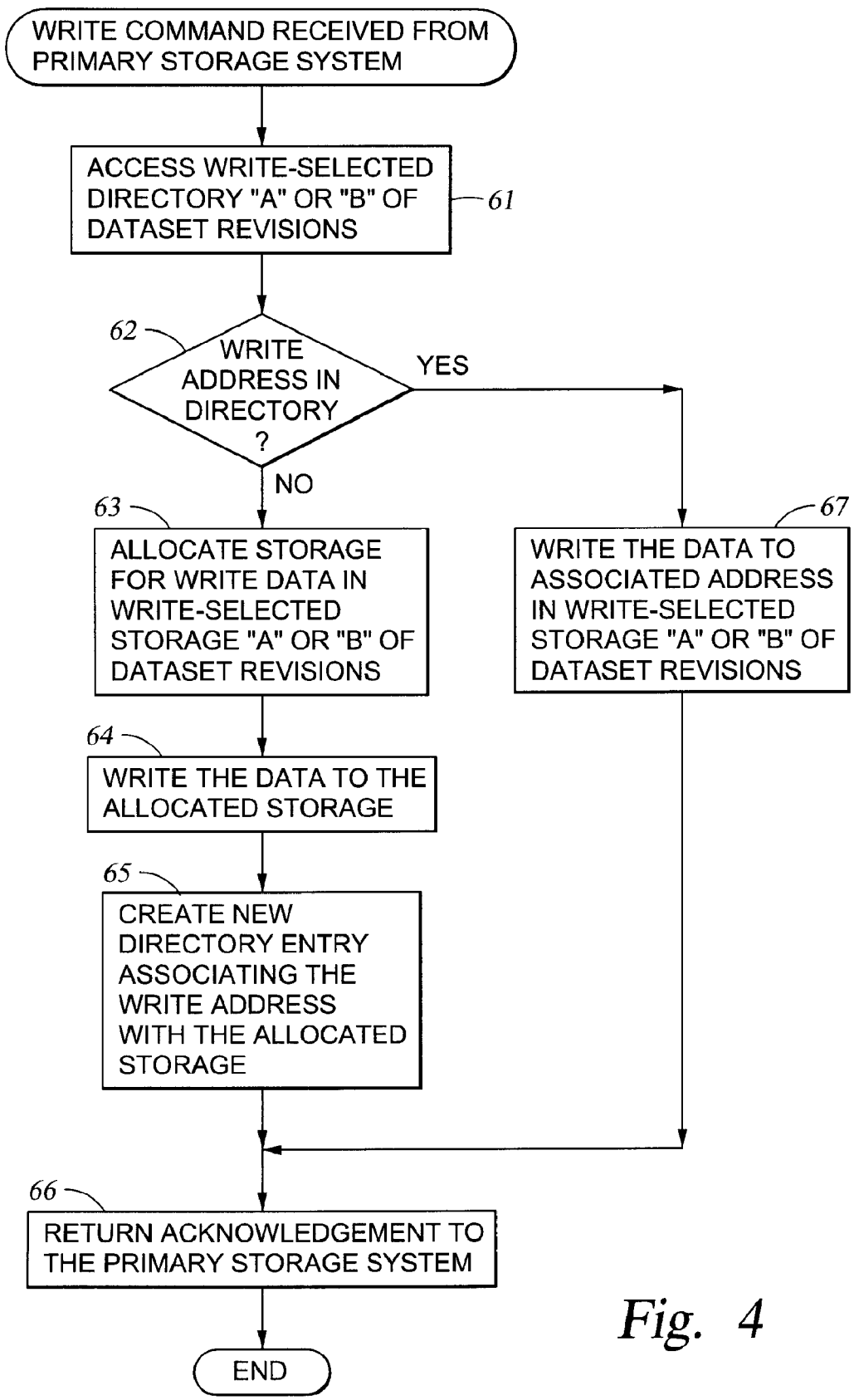
FIG. 4 is a flowchart showing how the secondary data storage system in FIG. 1 is programmed to respond to a write command received from the primary data storage system.

FIG. 4 is a flowchart showing how the secondary data storage system in FIG. 1 is programmed to respond to a write command received from the primary data storage system. The write command specifies an address of a data item or storage location, and data to be written to the data item or storage location. In the first step 61, the storage controller accesses the write-selected directory "A" or "B" of dataset revisions (47 or 48) for the address specified by the write command. Next, in step 62, execution branches depending on whether or not the address is in the directory. If not, then in step 63, the storage controller allocates storage for the write data in the write-selected storage "A" or "B" of dataset revisions (43 or 44). Then in step 64, the storage controller writes the data to the allocated storage. Then in step 65, the storage controller creates a new directory entry (in the write-selected directory "A" or "B" of dataset revisions 47 or 48) associating the write address with the allocated storage. Then in step 66, the storage controller returns an acknowledgement over the link to the primary storage system, and the task is finished.

In step 62, if the write address is in the directory, then execution branches to step 67. In step 67, the storage controller writes the data of the write command to the associated address in the write-selected storage "A" or "B" of dataset revisions (43 or 44). Execution continues from step 67 to step 66 to return an acknowledgement to the primary storage system, and the task is finished.

Figure 5:
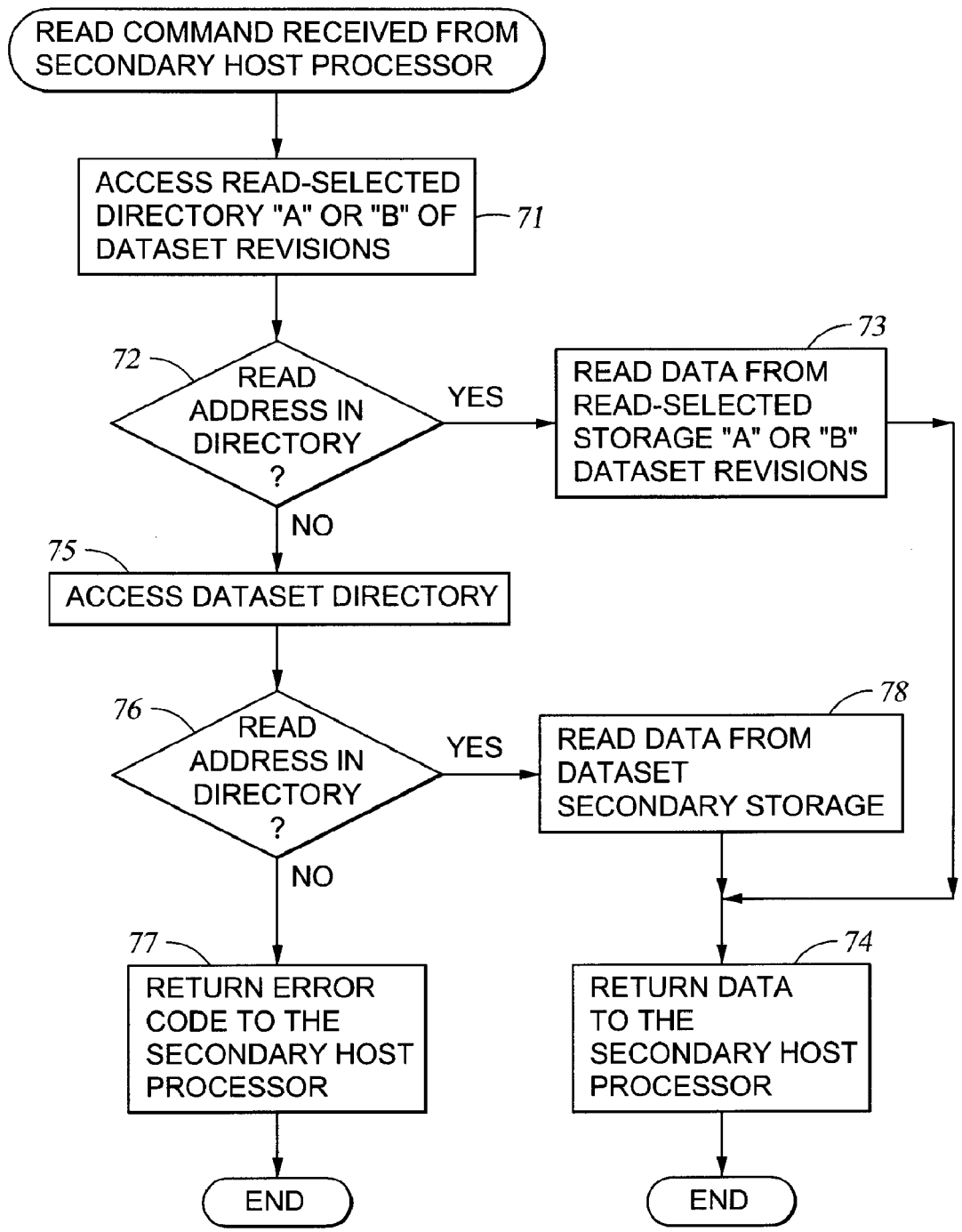
FIG. 5 is a flowchart showing how the secondary data storage system in FIG. 1 is programmed to respond to a read command received from the secondary host processor.

FIG. 5 is a flowchart showing how the storage controller of the secondary data storage system in FIG. 1 is programmed to respond to a read command received from the secondary host processor. The read command specifies an address of a data item or storage location. In a first step 71, the storage controller accesses the read-selected directory "A" or "B" of dataset revisions (47 or 48). Then in step 72, execution branches depending on whether the address in the read command is found in the directory. If so, then execution branches from step 72 to step 73. In step 73, the storage controller reads data from the read-selected storage "A" or "B" of dataset revisions. Execution continues from step 73 to step 74, to return the data to the secondary host processor, and then the task is finished.

If in step 72 the read address is not in the directory accessed in step 71, then execution continues from step 72 to step 75. In step 75, the storage controller accesses the dataset directory (48 in FIG. 3). Then in step 76, execution branches depending on whether the address of the read command is in the dataset directory. If not, execution continues to step 77, to return an error code to the secondary host processor, and then the task is finished. Otherwise, if the address of the read command is found in the dataset directory, execution branches from step 76 to step 78. In step 78, the storage controller reads data from the dataset secondary storage (42 in FIG. 3). Execution continues from step 78 to step 74, to return the data to the secondary host processor, and the task is finished.

Figure 6:
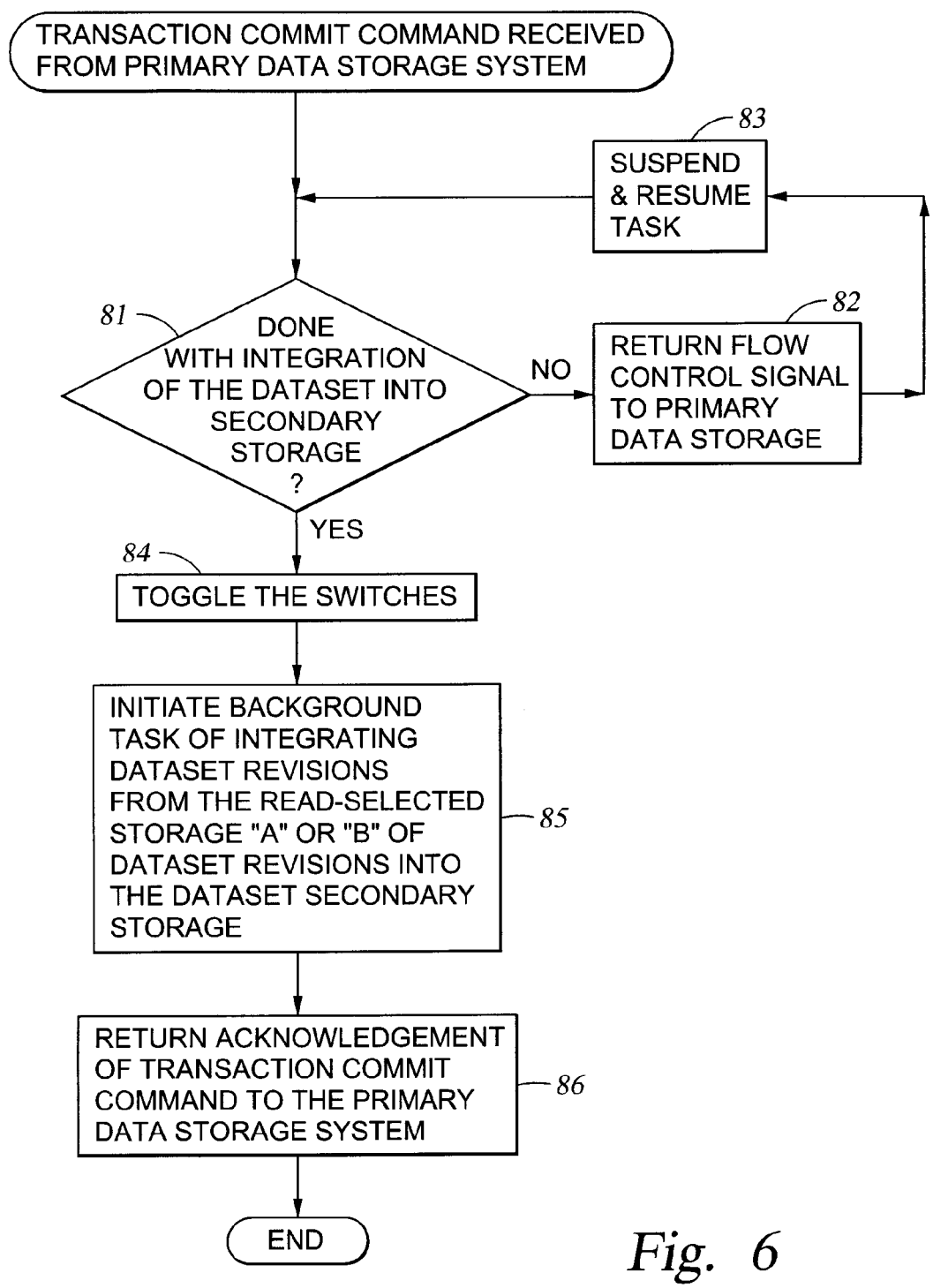
FIG. 6 is a flowchart showing how the secondary data storage system in FIG. 1 is programmed to respond to a transaction commit command from the primary data storage system.
Figure 7:
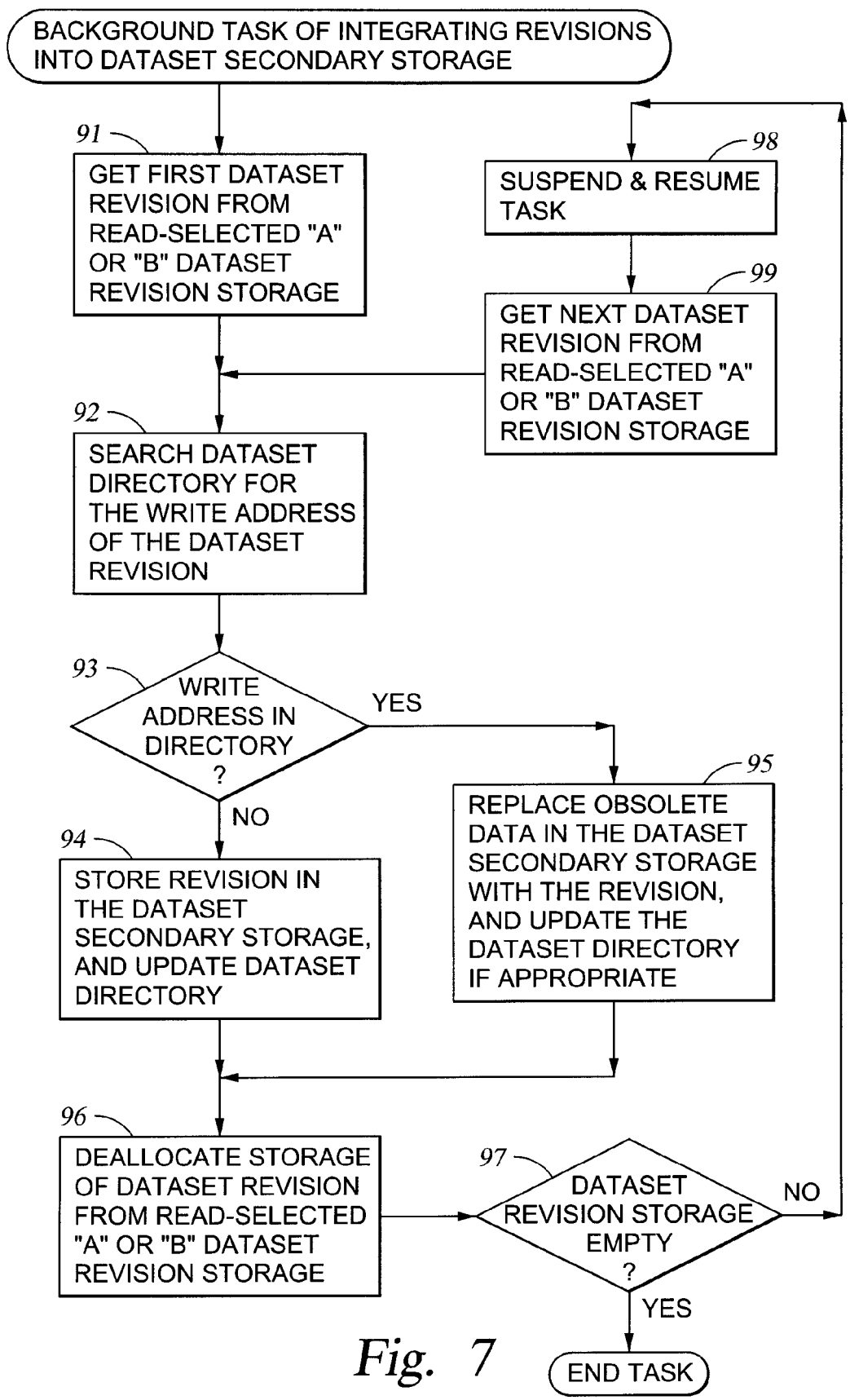
FIG. 7 is a flowchart showing how the secondary data storage system in FIG. 1 is programmed to perform a background task of integrating revisions into secondary dataset storage in the secondary data storage system.

FIG. 6 is a flowchart showing how the storage controller of the secondary data storage system in FIG. 1 is programmed to respond to a transaction commit command from the primary data storage system. In a first step 81, the storage controller checks whether or not the background task of FIG. 7 is done with integration of the dataset into the dataset secondary storage. For example, this background task is done when the read-selected directory "A" or "B" of dataset revisions is empty. If not, then in step 82, the storage controller returns a flow control signal to the primary data storage system, because subsequent write commands from the link should not be placed in the storage "A" or "B" of dataset revisions until completion of the integration of the dataset revisions into secondary storage. Any such subsequent write commands could be placed in a temporary buffer until completion of the integration of the dataset revisions into the secondary storage, and a preferred buffering technique will be described below with reference to FIGS. 8 to 11. Execution continues from step 82 to step 83. In step 83, the task of FIG. 6 is suspended for a time to permit the background task to continue with integration of the dataset into secondary storage, and then the task is resumed. After step 83, execution loops back to step 81. Once the dataset has been integrated into secondary storage, execution continues from step 81 to step 84.

In step 84, the switches (45 and 46 in FIGS. 2 and 3) are toggled. This is done by complementing a logical variable or flag, which indicates what storage of dataset revision is selected for read and write operations. For example, when the flag has a logical value of 0, the storage "A" of dataset revisions 43 is read-selected, and the storage "B" of dataset revisions 44 is write-selected. When the flag has a logical value of 1, the storage "A" of dataset revisions 43 is write-selected, and the storage "B" of dataset revisions is read-selected. Next, in step 85, the storage controller initiates the background task of integrating dataset revisions from the read-selected storage "A" or "B" of dataset revisions into the dataset secondary storage. Then, in step 86, the storage controller returns an acknowledgement of the transaction commit command to the primary data storage system, and the task of FIG. 6 is done.

FIG. 7 is a flowchart showing how the storage controller of the secondary data storage system in FIG. 1 is programmed to perform a background task of integrating revisions into the dataset secondary storage. In a first step 91, the first dataset revision is obtained from the read-selected "A" or "B" dataset revision storage (43 or 44 in FIG. 3). Next, in step 92, the storage controller searches the dataset directory (49 in FIG. 3) for the write address of the dataset revision. Then, in step 93, execution branches depending on whether the write address is found in the directory. If not, execution continues from step 93 to step 94. In step 94, the storage controller stores the revision in the dataset secondary storage (42 in FIG. 3), and the storage controller updates the dataset directory (49 in FIG. 3). Execution continues from step 94 to step 96.

In step 93, if the address of the dataset revision is found in the dataset directory, then execution branches to step 95 to replace the obsolete data in the dataset secondary storage with the dataset revision, and the dataset directory is updated if appropriate. The dataset directory is updated, for example, if the information in the directory for the obsolete data is no longer applicable to the revision. After step 95, execution continues in step 96.

In step 96, the storage controller de-allocates storage of the dataset revision from the read-selected "A" or "B" dataset revision storage (43 or 44 in FIG. 3). Execution continues from step 96 to step 97. In step 97, the task is finished if the dataset revision storage is found to be empty. Otherwise, execution continues from step 97 to step 98. In step 98, the task is suspended to permit any higher priority tasks to begin, and once the higher priority tasks are completed, the background task is resumed. Execution then continues to step 99. In step 99, the storage controller obtains the next dataset revision from the read-selected "A" or "B" dataset revision storage. Execution loops back to step 92 from step 99, in order to integrate all of the revisions from the read-selected "A" or "B" dataset revision storage into the dataset secondary storage.

Figure 8:
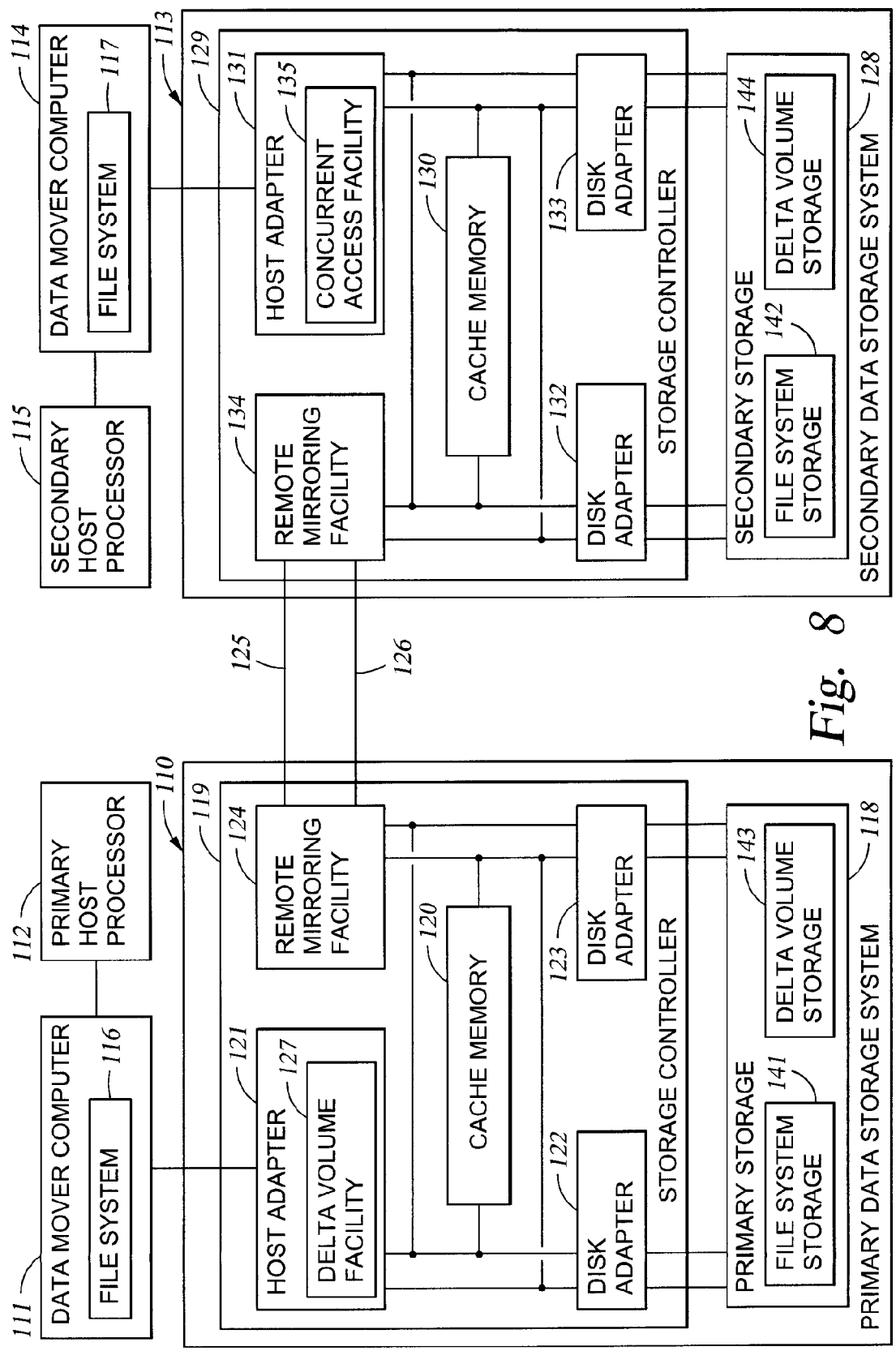
FIG. 8 is a block diagram of a preferred construction for the data processing system of FIG. 1, in which a pair of "delta volumes" are mirrored between a primary data storage system and a secondary data storage system in order to buffer transmission of write commands from the primary data storage system to the secondary data storage system.

The above description with respect to FIGS. 1 to 5 has not been limited to any particular form of dataset structure or directory structure. For example, the dataset revisions could operate upon direct mapped, numerically addressed storage, or they could operate upon dynamically allocated, symbolically addressed storage. For example, FIG. 8 is a block diagram of one preferred construction for a data processing system in which the write commands for the dataset revisions access direct mapped, numerically addressed storage. The data processing system includes a primary data storage system 110, a data mover computer 111, a primary host processor 112, a secondary data storage system 113, a data mover computer 114, and a secondary host processor 115. The data mover computer 111 includes a file system 116 that translates file system read and write commands from the primary host processor 112 to logical block read and write commands to the primary data storage system. Therefore, the combination of the data mover computer 111 and the primary data storage system 110 functions as a file server. Further details regarding the programming of the data mover computer 111 and the file system 116 are disclosed in Vahalia et al., U.S. Pat. No. 5,893,140, issued Apr. 6, 1999, and entitled "File Server Having A File System Cache And Protocol For Truly Safe Asynchronous Writes," incorporated herein by reference. In a similar fashion, the combination of the secondary data storage system 113 and the data mover computer 114 also functions as a file server.

The primary data storage system has primary storage 118, and a storage controller 119. The storage controller includes a semiconductor random access cache memory 120, a host adapter 121 interfacing the data mover computer 111 to the cache memory, disk adapters 122, 123 interfacing the cache memory to the primary storage 118, and a remote mirroring facility 124 for interfacing the cache memory 120 to dual redundant data transmission links 125, 126 interconnecting the primary data storage system 110 to the secondary data storage system 113. The remote mirroring facility is constructed and operates as described in the above-cited Ofek et al., U.S. Pat. No. 5,901,327 issued May 4, 1999. This remote mirroring facility mirrors file system storage 141 in the primary storage 118. However, the file system storage 141 is mirrored by mirroring delta volume storage 143 that is used to buffer the updates to file system storage 141 of the primary storage 118. The host adapter 121 is programmed with a "delta volume facility" 127 that loads the updates into the delta volume storage 143 of the primary storage 118. The remote mirroring facility transmits the updates over the dual redundant links 125, 126 to mirrored delta volume storage 144 in secondary storage 128 in the secondary data storage system 113, as further shown and described below with reference to FIGS. 9 to 12.

The delta volume facility 127 is located at a volume manager level in data processing system of FIG. 8. The volume manager level lies between the level of the files system 116 and the level of the primary storage 110. The file system 116 addresses logical blocks in logical volumes. In other words, each logical volume appears as an array of blocks having contiguous logical block numbers. The volume manager maps the logical block number into an appropriate basic storage volume and physical offset within the basic volume. In addition, the volume manager permits a number of the basic storage volumes to be combined in various ways to construct a single metavolume that can be used to build a file system. The file system views the metavolume as a single, contiguous array of blocks that is accessible by specifying a logical block number within this array.

The secondary data storage system 113 also includes a storage controller 129. The storage controller 129 includes a semiconductor cache memory 130, a host adapter 131, disk adapters 132 and 133, and a remote mirroring facility 134. The host adapter 131 is programmed with a concurrent access facility 135 that is similar to the concurrent access facility (31 in FIG. 1) described above with respect to FIGS. 1 to 7, except that the concurrent access facility 135 obtains updates from the mirrored delta volume storage 144 in the secondary storage 128 (as further described below with reference to FIGS. 9 to 11) instead of directly from the primary data storage system.

Figure 9:
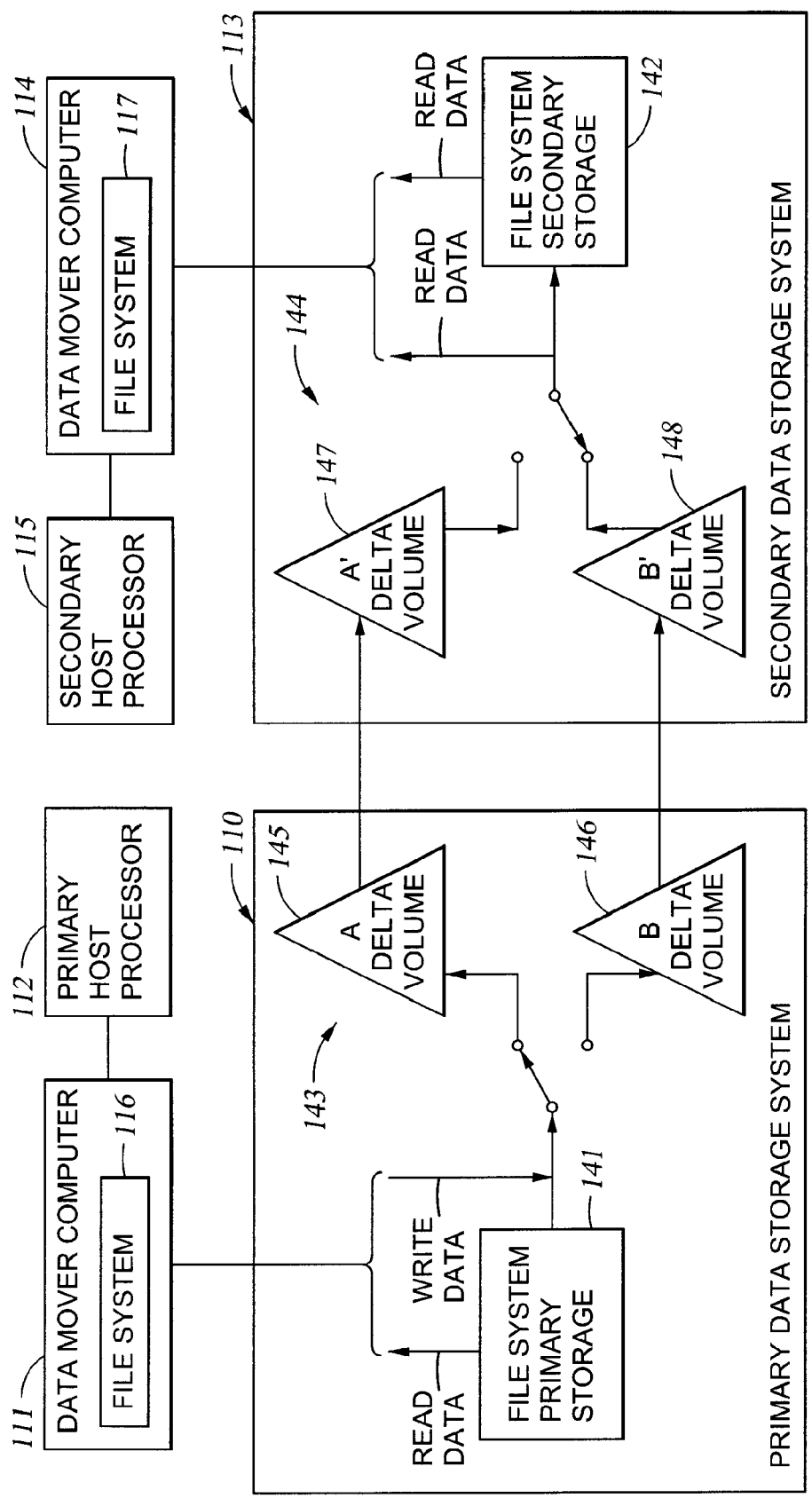
FIG. 9 is a block diagram showing data flow in the data processing system of FIG. 8.

FIG. 9 is a block diagram showing data flow in the data processing system of FIG. 8. When the primary host processor 112 requests file system access from the data mover computer 111, the file system 116 performs read and write operations upon the file system primary storage 141. Write data for sets of sequential transactions are alternately written to an "A" delta volume 145 and a "B" delta volume 146 in the delta volume storage 143 of the primary data storage system 110. The remote mirroring facility transfers the write data to a mirrored "A'" delta volume 147 and a mirrored "B'" delta volume 148 in the delta volume storage 144 of the secondary data storage system 113. When the secondary host processor requests read-only file system access from the data mover computer 114, the data mover computer reads file system data from a read-selected one of the "A'" delta volume 147 or the "B'" delta volume 148 in the delta volume storage 144 of the secondary data storage system 113, and if the required file system data are not found in the read-selected one of the delta volumes, then the data mover computer reads the file system data from the file system secondary storage 142.

Figure 10:
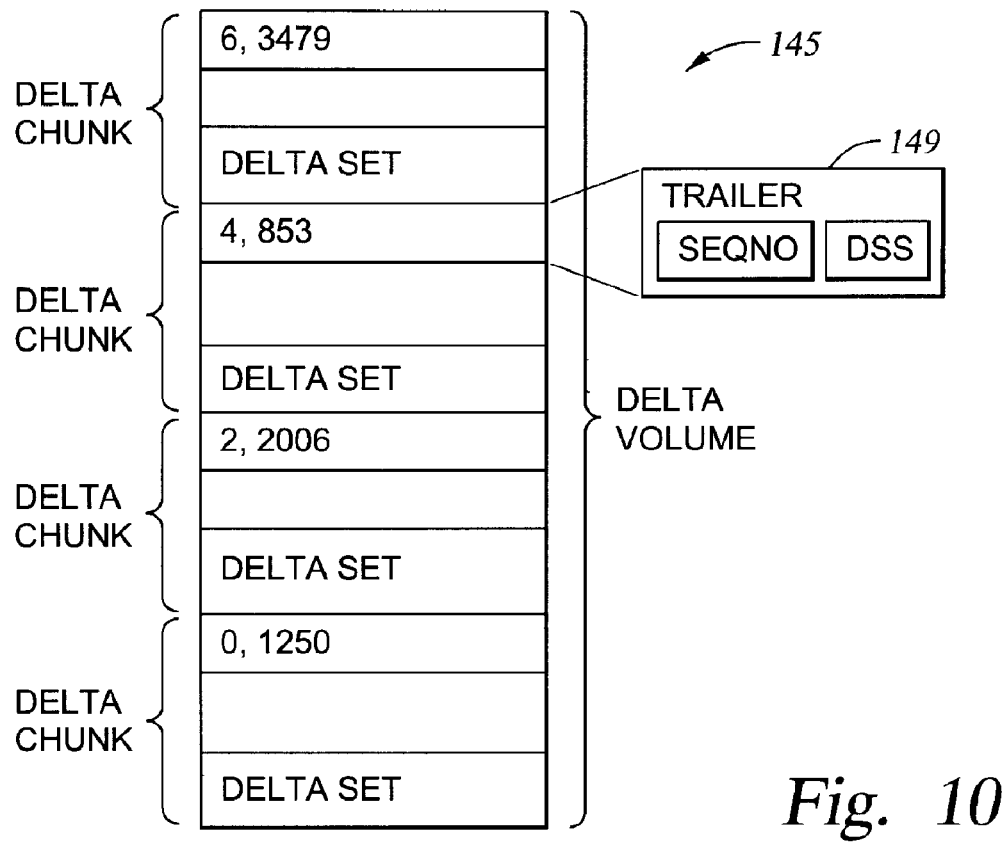
FIG. 10 is a block diagram of a delta volume in the data processing system of FIG. 8.

FIG. 10 is a block diagram of a delta volume in the data processing system of FIG. 8. Each delta volume is logically divided into delta chunks of a fixed size. The fixed size is preselected depending on various factors such as the serving capacity of the primary site and the write activity at the primary site. The fixed size is large enough to contain all of the updates for any single transaction. During initialization of the data processing system, file system access by the primary host processor is temporarily suspended and the file system primary storage 141 is copied to the file system secondary storage 142. Thereafter, file system access by the primary host processor is enabled, and the primary captures changes to the file system in delta sets. Each delta set is a set of changes to the file system blocks that, when viewed as a whole, leave the file system in a consistent state. The delta sets are identified by a sequence number (SEQNO) and written to the delta volume (and thus propagated to the replica sites). A new delta set begins at the start of a delta chunk and the size of a delta set cannot exceed the size of a delta chunk. The sequence number (SEQNO) and also the delta set size (DSS) can be written to a header or trailer 149 of the delta chunk. The delta volume therefore functions as a transaction log for updates to the file system, and also as a buffer for transmitting the updates between the primary data storage system and the secondary data storage system. In case of a system crash, the sequence numbers can be inspected to find the last valid delta volume. The block updates in each delta set can also have a fixed size, to facilitate asynchronous transmission of the updates over the data link between the primary and secondary data storage systems. In this case, each block update can have its own sequence number. If a transmission error is detected, such as a failure of the secondary data storage system to receive a block update in sequence, the block update can be retransmitted, and written into its delta set in proper sequence when received.

The specific format shown for the delta volume has been selected to minimize computational overhead for accessing the delta volume rather than to minimize storage requirements. In contrast, a conventional transaction log has a format selected to minimize storage requirements rather than to minimize computational overhead for accessing the log. Depending on the availability of computational resources in the primary data storage system and the secondary data storage system, the delta volume could use a conventional transaction log data structure. To reduce the computational overhead for accessing such a conventional transaction log, the delta volume could also include a delta set directory overlaid upon the conventional transaction log data structure.

It should also be apparent that a single delta volume, rather than two delta volumes, could be used for buffering the transmission of file system updates between the primary data storage system and the secondary data storage system. If a single delta volume were used, then alternate delta chunks in the delta volume could be read-selected and write-selected. It should also be apparent that more than two delta volumes could be used for buffering file system updates. For example, the primary data storage system could store data for multiple file systems, and each file system to be accessed from the secondary data storage system could have its updates buffered in one, two, or more delta volumes used for buffering the updates of only one file system.

Figure 11:
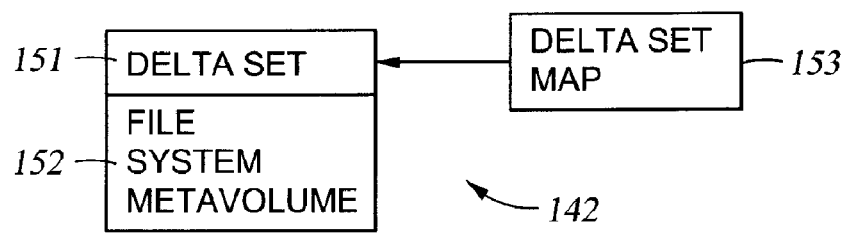
FIG. 11 is a block diagram of data structures in the secondary storage of the secondary data storage system in FIG. 8.

FIG. 11 is a block diagram of data structures in the file system secondary storage (128 in FIG. 8) of the secondary data storage system (113 in FIG. 8). The concurrent access facility (135 in FIG. 8) in the secondary data storage system uses a volume manager utility that inserts the read-selected delta set 151 as an overlay on top of the file system metavolume 152. At the time of insertion, a delta set map 153 is created of the block entries in the delta set 151. This map is then used to route a block read request to either the delta set or the file system metavolume depending on whether there is a block entry in the delta set for the requested block or not. Therefore, the read-selected delta set 151 corresponds to the read-selected storage "A" or "B" of dataset revisions 43 or 44 in FIG. 2 and FIG. 3, and the delta set map 153 corresponds to the directory 47 or 48 in FIG. 3 for the dataset revisions. The time of insertion of the read-selected delta set and the creation of the delta set map corresponds to the time between steps 84 and 85 of FIG. 6. In other words, after the read selection of the delta set and before initiation of the background task of integrating file system revisions from the read-selected delta set into the file system volume 143 in the secondary storage. The integration of the file system revisions involves copying the updates into the corresponding blocks of the file system metavolume 152. The routing of a block read request to either the delta set or the file system metavolume corresponds to steps 71 and 72 in FIG. 5.

Figure 12:
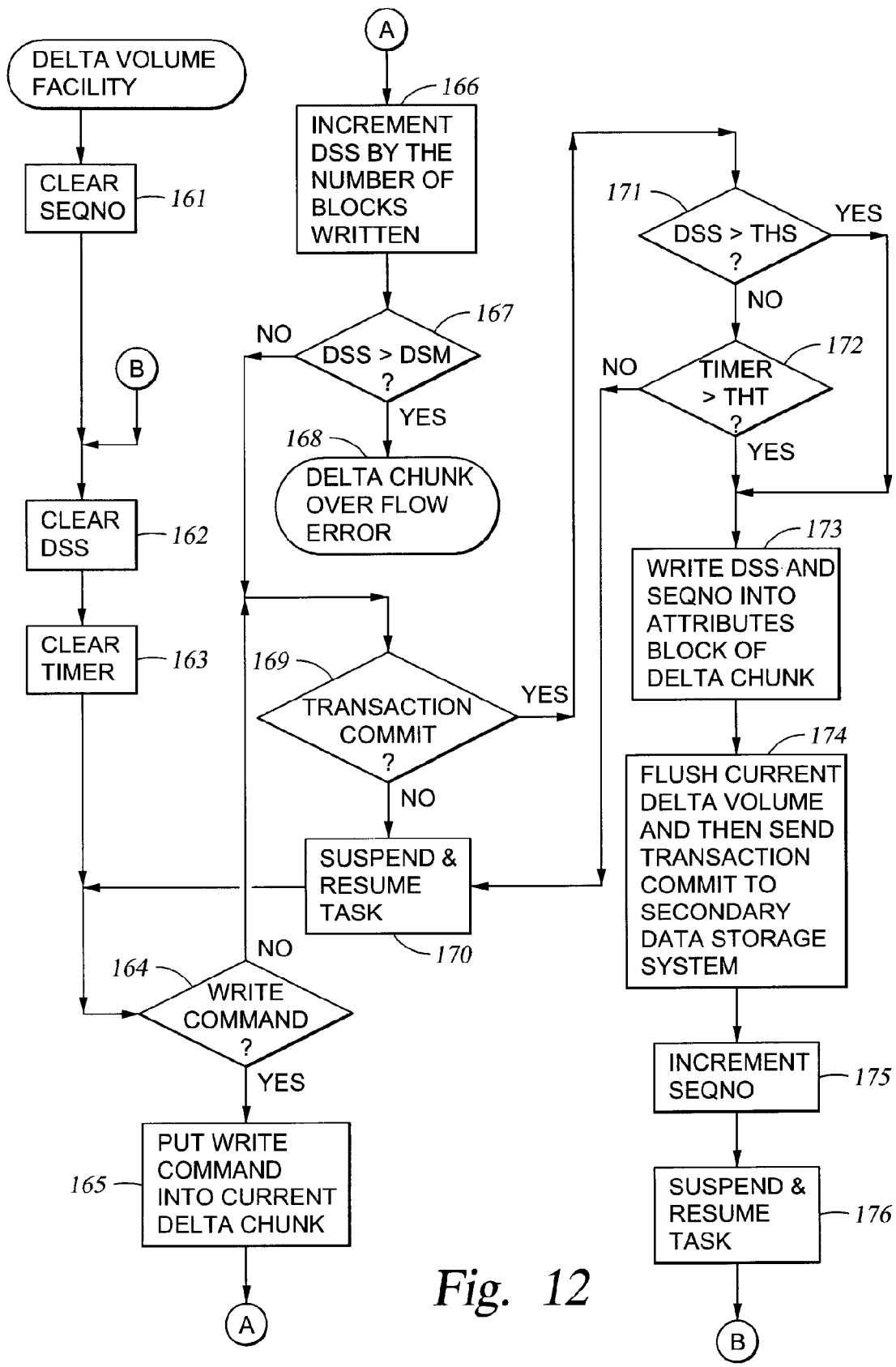
FIG. 12 is a flowchart of programming in a delta volume facility of the primary data storage system of FIG. 8 for remote transmission of write commands to the secondary data storage system.

FIG. 12 is a flowchart of programming in a delta volume facility of the primary data storage system of FIG. 8 for remote transmission of write commands to the secondary data storage system. In a first step 161, the storage controller of the primary data storage system clears the sequence number (SEQNO). The sequence number is used to map the current delta chunk into either the "A" delta volume or the "B" delta volume. For example, if the sequence number is even, then the current delta chunk is in the "A" delta volume, and if the sequence number is odd, then the current delta chunk is in the "B" delta volume. For the case of four delta chunks per delta volume, for example, the position of the delta chunk in the corresponding delta volume is computed by an integer division by two (i.e., a right shift by one bit position), and then masking off the two least significant bits (i.e., the remainder of an integer division by four).

Next, in step 162, the storage controller clears a variable indicating the delta set size (DSS). Then in step 163, the storage controller clears a timer. The timer is a variable that is periodically incremented. The timer is used to limit the frequency at which transaction commit commands are forwarded from the primary data storage system to the secondary storage system unless the transaction commit commands need to be transmitted at a higher rate to prevent the size of the delta sets from exceeding the size of the delta chunk.

In step 164, execution continues to step 165 if the storage controller receives a write command from the primary host processor. In step 165, the storage controller places the write command in the current delta chunk. This involves writing a number of data blocks to the delta volume selected by the sequence number (SEQNO), beginning at an offset computed from the sequence number and the current delta set size (DSS). Then in step 166, the storage controller increments the delta set size (DSS) by the number of blocks written to the delta chunk. In step 167, the storage controller compares the delta set size to a maximum size (DSM) to check whether a delta chunk overflow error has occurred. If so, then execution branches to an error handler 168. Otherwise, execution continues to step 169. In step 169, execution continues to step 170 unless a transaction commit command is received from the primary host processor. If not, execution continues to step 170, to temporarily suspend, and then resume, the delta volume facility task of FIG. 12. Otherwise, if a transaction commit command is received, execution continues to step 171. It should be noted that once step 171 has been reached, the data mover computer (111 in FIG. 8) has already flushed any and all file system updates preceding the transaction commit command from any of its local buffer storage to the primary data storage system. Write operations by the primary host processor subsequent to the transaction commit command are temporarily suspended until this flushing is finished. Therefore, once step 171 has been reached, the updates in the delta set of the current delta chunk represent a change of the file system from one consistent state to another consistent state.

In step 171, the storage controller compares the delta set size (DSS) to a threshold size (THS) that is a predetermined fraction (such as one-half) of the maximum size (DSM) for a delta chunk. If the delta set size (DSS) is not greater than this threshold, then execution continues to step 172. In step 172, the timer is compared to a predetermined threshold (THT) representing the minimum update interval for the file system secondary storage unless a smaller update interval is needed to prevent the size of the delta set from exceeding the size of the delta chunk. The minimum update interval (THT) should depend on the particular application. A value of 5 minutes for THT would be acceptable for many applications. If the timer is not greater than the threshold (THT), then execution loops back to step 170. Otherwise, execution continues to step 173. Execution also branches from step 171 to step 173 if the delta set size (DSS) is greater than the threshold size (THS).

In step 173, the storage controller writes the delta set size (DSS) and the sequence number (SEQNO) into an attributes block of the delta chunk (e.g., the trailer 199 in FIG. 10.) The updating of the sequence number in the delta chunk validates the delta set in the delta chunk. Then, step 174, the storage controller flushes the current delta volume to ensure that all updates in the delta set of the current delta chunk will be transmitted to the secondary data storage system, and then sends a transaction commit command to the secondary data storage system. The secondary data storage system should have received all of the updates in the delta set of the current delta chunk before receipt of the transaction commit command. For example, the remote data mirroring facility can be operated in an asynchronous or semi-synchronous mode for the current delta volume until step 174, and switched in step 174 to a synchronous mode to synchronize the current delta volume in the primary data storage system with its mirrored volume in the secondary data storage system, and then the transaction commit command can be sent once the remote mirroring facility indicates that synchronization has been achieved for the current delta volume. In step 175, the storage controller increments the sequence number (SEQNO). In step 176, the storage controller temporarily suspends the delta volume facility task of FIG. 12, and later resumes the task. Execution then loops back from step 176 to step 162.

By using delta volumes as buffers for transmission of updates from the primary data storage system to the secondary data storage system, there is no need for the delta volume facility to wait for receipt of an acknowledgement of the transaction commit command sent in step 174, before continuing to step 175. Instead, flow control of the updates can be based upon the sequence numbers and the use of sufficiently large delta volumes. Starting at initialization, the delta sets are numbered in an increasing sequence. At each site (primary and one or more secondaries), the delta sets are loaded and unloaded in the order of this sequence. If any delta sets are corrupted during transmission between the sites, they can be retransmitted and then reordered in terms of their sequence numbers. Thus, the primary data storage system will start by producing set number 1, followed by set number 2 and so on. Similarly, each secondary data storage system will integrate the file system secondary storage with the delta sets by unloading and integrating set number 1, followed by set number 2 and so on. The primary does not wait for an immediate acknowledgement from the secondaries when moving from one delta set to the next. This is made feasible by having a sufficiently large delta volume so that there is enough buffer space to allow the secondaries to be a few delta sets behind the primary without having an overflow. An overflow happens when a primary reuses a delta chunk to write a new delta set before one or more of the secondaries have completely processed the old delta set residing on that delta chunk. The primary data storage system can prevent such an overflow condition by suspending the processing of delta sets if there is a failure to receive an acknowledgement of a transaction commit command over the production of a certain number of the delta sets, such as seven delta sets for the example of four delta per delta volume and two delta volumes per file system. The overflow condition can also be detected at a secondary data storage system by inspecting the delta set sequence numbers. An overflow is detected if the SEQNO in the delta chunk exceeds the next number in sequence when the secondary data storage system read-selects the next delta chunk for integration of the updates into the file system secondary storage. When the secondary data storage system detects such an overflow condition, a flow control error recovery procedure is activated. This error recovery procedure, for example, involves suspending write operations by the primary host processor, re-synchronizing the file system secondary storage with the file system primary storage, and restarting the delta volume facility.

By using two delta volumes per file system instead of one, it is easy to use the conventional remote mirroring facility (124 in FIG. 8) in such a way to ensure that all of the updates to the delta set in the current delta chunk will be flushed and received by the secondary data storage system, prior to sending the transaction commit to secondary storage, with a minimal impact on continued host processing in the primary data storage system. Normally, the remote mirroring facility operates to transmit updates from the primary data storage system to the secondary data storage system concurrently with writing to the volume. During the flushing and synchronization of a remotely mirrored volume, however, the writing to a volume is temporarily suspended. By using two delta volumes, one of the delta volumes can be flushed in step 174 while the subsequent processing in FIG. 12 (steps 175, 176 et seq.) continues concurrently for the next delta set, which is mapped to the other of the two delta volumes.

An approach similar to the mirroring of delta volumes can be used for signaling between the primary data storage system and the secondary data storage system. A transmit message volume can be allocated in the primary and mirrored to a similar receive message volume in the secondary data storage system. Also a transmit message volume can be allocated in the secondary data storage system and mirrored to a similar receive message volume in the secondary. The remote mirroring facility will then automatically copy messages deposited in the transmit volume of one data storage system to a receive volume of another data storage system. The volumes can be partitioned into a number of identical message regions (analogous to the delta chunks of FIG. 10), each having an associated sequence number, so that the message volumes also function as a message queue. Each data storage system could inspect the sequence numbers in the receive message volume to identify a new message that has been deposited in the message volume. Each block in each message region could be allocated to a predefined message type.

Figure 13:
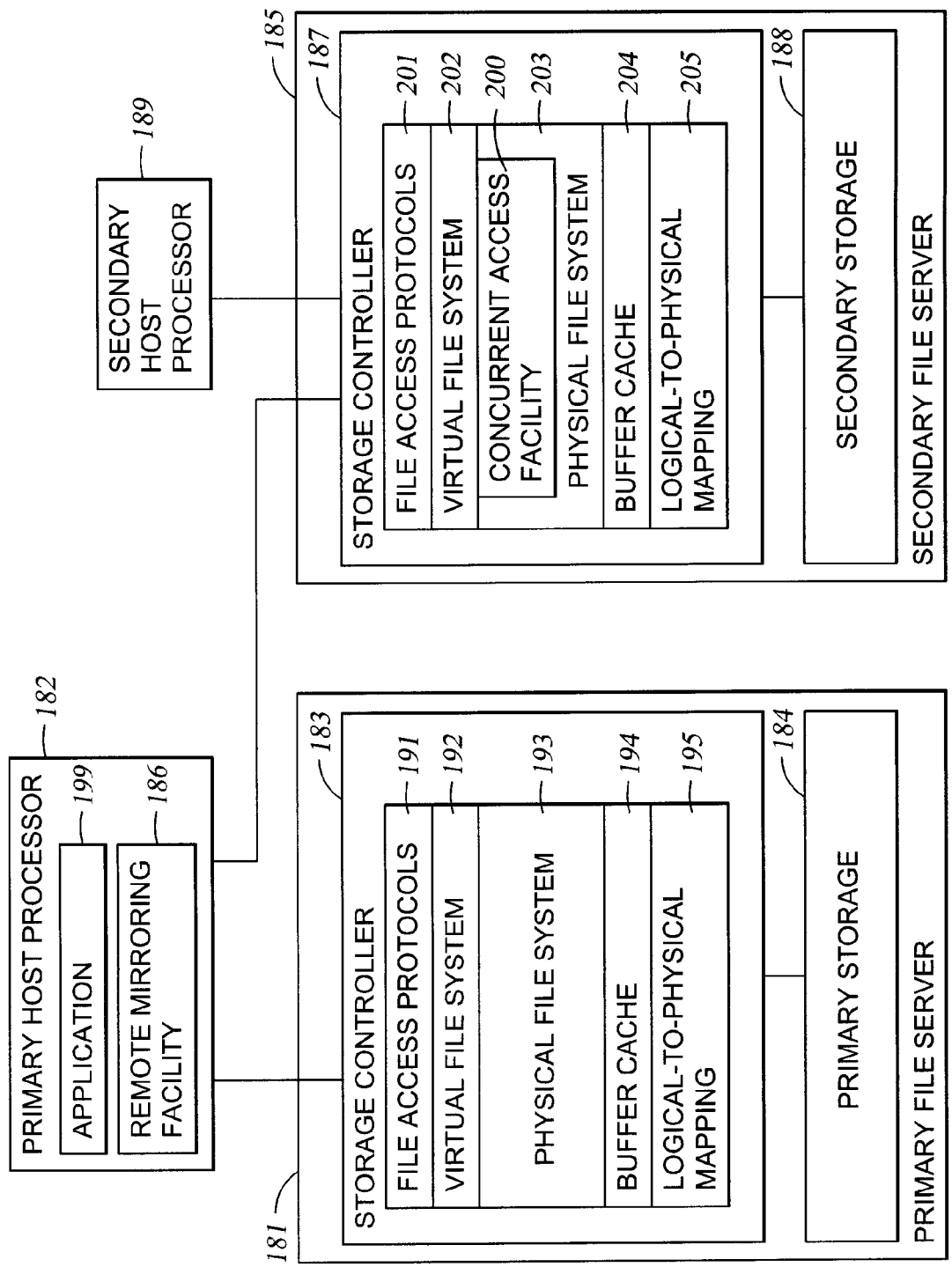
FIG. 13 is a block diagram of an alternative embodiment of the invention, in which the data storage systems are file servers, and the write commands include all file system access commands that modify the organization or content of a file system.

FIG. 13 is a block diagram of an alternative embodiment of the invention, in which the data storage systems are file servers, and the write commands include all file system access commands that modify the organization or content of a file system. The data processing system in FIG. 13 includes a conventional primary file server coupled to a primary host processor 182 for read-write access of the primary host processor to a file system stored in the file server. The conventional file server includes a storage controller 183 and primary storage 184. The storage controller 183 includes facilities for file access protocols 191, a virtual file system 192, a physical file system 193, a buffer cache 194, and logical-to-physical mapping 195. Further details regarding such a conventional file server are found in the above-cited Vahalia et al., U.S. Pat. No. 5,893,140, issued Apr. 6, 1999.

The data processing system in FIG. 13 also includes a secondary file server 185 coupled to the primary host processor 182 to receive copies of at least the write access commands sent from primary host processor to the primary file server. The secondary file server has a storage controller 187 and secondary storage 188. The storage controller 187 includes facilities for file access protocols 201, a virtual file system 202, a physical file system 203, a buffer cache 204, and logical-to-physical mapping 205. To this extent the secondary file server is similar to the primary file server.

In the data processing system of FIG. 13, the primary host processor 182 has a remote mirroring facility 186 for ensuring that all such write access commands are copied to the secondary file server 185. (This remote mirroring facility 186 could be located in the primary file server 181 instead of in the primary host processor.) The remote mirroring facility 186 also ensures that the primary host processor will receive acknowledgement of completion of all preceding write commands from an application 199 from both the primary file server 181 and the secondary file server 185 before the primary host processor will return to the application an acknowledgement of completion of a transaction commit command from the application 199. (This is known in the remote mirroring art as a synchronous mode of operation, and alternatively the remote mirroring facility 186 could operate in an asynchronous mode or a semi-synchronous mode.) The secondary file server 185 therefore stores a copy of the file system that is stored in the primary file server 181. Moreover, a secondary host processor 189 is coupled to the secondary file server 185 for read-only access of the secondary host processor to the copy of the file system that is stored in the secondary storage.

To provide the secondary host processor 189 with uninterrupted read-only access to a consistent version of the file system concurrent with read-write access by the primary host processor, the secondary file server 185 has a concurrent access facility 200 that is an interface between the virtual file system 202 and the physical file system 203. The physical file system layer 203, for example, is a UNIX-based file system having a hierarchical file system structure including directories and files, and each directory and file has an "inode" containing metadata of the directory or file. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261-289, of Uresh Vahalia, Unix Internals: The New Frontiers, 1996, Prentice Hall, Inc., Simon & Schuster, Upper Valley River, N.J. 07458.

The concurrent access facility 200 in FIG. 13 can be constructed as shown in FIGS. 2 to 7 above. In this case, the dataset is the file system. In addition, it is preferable for the directories of dataset revisions (47, 48 in FIG. 3) and the storage of data revisions (43, 44) to have a hierarchical inode structure to facilitate integration with the hierarchical inode structure of the UNIX-based file system directory corresponding to the dataset directory 49 in FIG. 3. In order to provide uninterrupted read-only access to all possible file system revisions, however, the hierarchical structure of the directories of dataset revisions, and the integration of the revisions with the UNIX-based file system directory, must consider some special types of file system modifications, such as file or directory deletions, and file or directory name changes.

Figure 14:
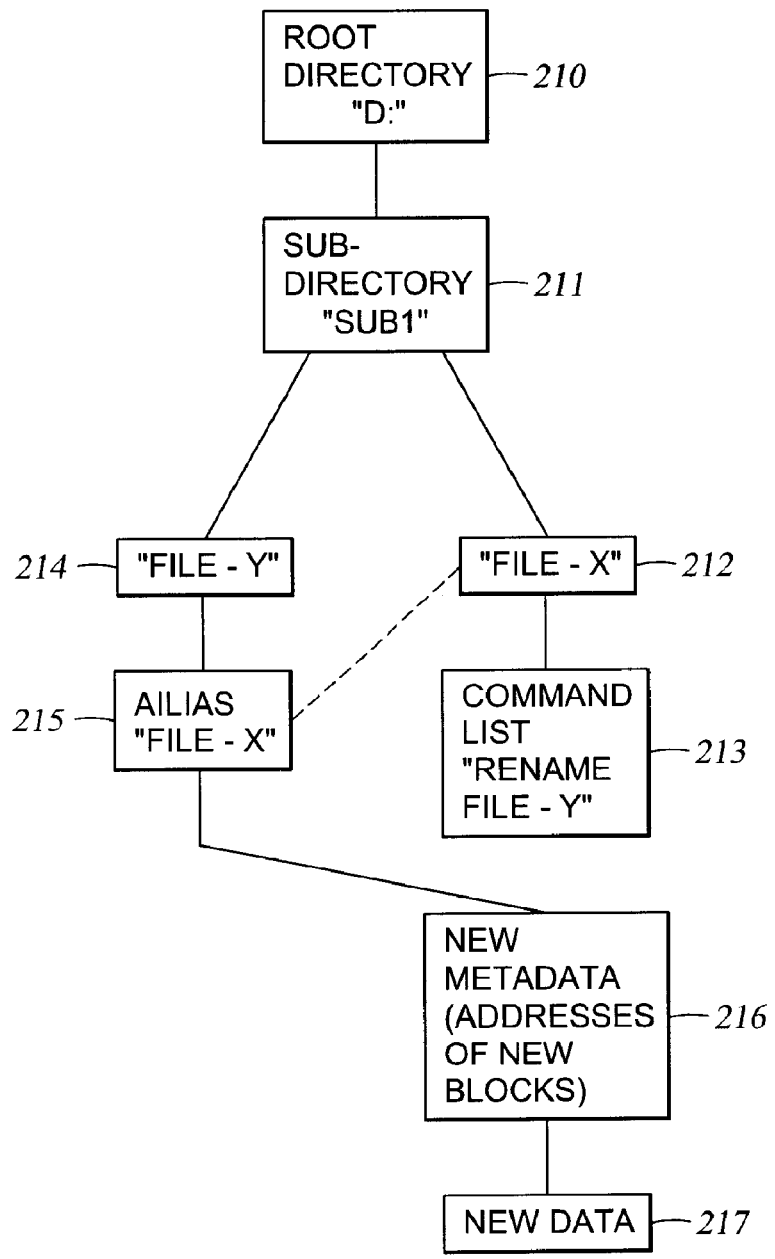
FIG. 14 is a block diagram of a directory of file system revisions and storage of file system revisions for the system of FIG. 13.

FIG. 14 shows a hierarchical structure of a directory of dataset revisions and storage of dataset revisions for a write to a file D:/SUB1/FILE-Y followed by a file rename operation RENAME D:/SUB1/FILE-X to D:/SUB1/FILE-Y. Assuming that these are the first two updates received by the secondary file server (185 in FIG. 13), the first update would be processed in steps 61 to 66 of FIG. 4 by creating a root directory 210 named "D:" in the write-selected directory of dataset revisions, as shown in FIG. 14, and then creating a subdirectory 211 named "SUB1", and then creating a file entry 210 named "FILE-X" in the subdirectory, and then creating a new metadata entry 216 linked to the file entry and including is a directory of the blocks of the new file data 217. The second update would be recognized and processed by the task of FIG. 4 as a special case. The task would process the second update by searching the root directory 210 and subdirectory 211 to find the "FILE-X" entry, and creating a new file entry 214 named "FILE-Y" in the subdirectory, and then linking an alias attribute pointing to the "FLEX" entry in the subdirectory, and then creating a command list linked to the "FILE-X" entry and including the command "RENAME [FILE-X to] FILE-Y", and then unlinking the new metadata 216 and new data 217 from the "FILE-X" entry and linking the new metadata 216 and new data 217 to the "FILE-Y" entry. The resulting data structure would then facilitate subsequent read-only access and integration of the new data of "FILE-Y" with any non-obsolete write data for "FILE-X" in the dataset secondary storage (42 in FIG. 3) for the file system "D:/".

It should be apparent that the remote mirroring aspect of the present invention could be implemented at an intermediate level in the file server below the file access command level (as in the system of FIG. 13) and above the logical block level (as in the system of FIG. 8). For example, the remote mirroring could operate at the physical file system inode level. In this case, the storage of dataset revisions could be implemented as a sequential transactional log of the file system modifications on the primary side, with sufficient information stored in the log, such as inode numbers and old values and new values, to allow the secondary concurrent access facility to "replay" the transactions into the "live" file system in the file system secondary storage.

Replication of Remote Copy Data for Internet Protocol (IP) Transmission.

More recently there has arisen a need for wide-area distribution of read-only data. Shown in FIG. 15, for example, is an IP network 220 including multiple network file servers 221, 222, and multiple hosts 223, 224, 225. The hosts and network file servers, for example, can be distributed world wide and linked via the Internet. Each of the network file servers 221, 222, for example, has multiple data movers 226, 227, 228, 232, 233, 234, for moving data between the IP network 220 and the cached disk array 229, 235, and a control station 230, 236 connected via a dedicated dual-redundant data link 231, 237 among the data movers for configuring the data movers and the cached disk array 229, 235. Further details regarding the network file servers 221, 222 are found in Vahalia et al., U.S. Pat. No. 5,893,140, incorporated herein by reference.

In operation, it is desired for each of the network file servers 221, 222 to provide read-only access to a copy of the same file system. For example, each of the network file servers could be programmed to respond to user requests to access the same Internet site. The IP network 220 routes user requests to the network file servers 221, 222 in the same continent or geographic region as the user. In this fashion, the user load is shared among the network file servers.

Figure 15:
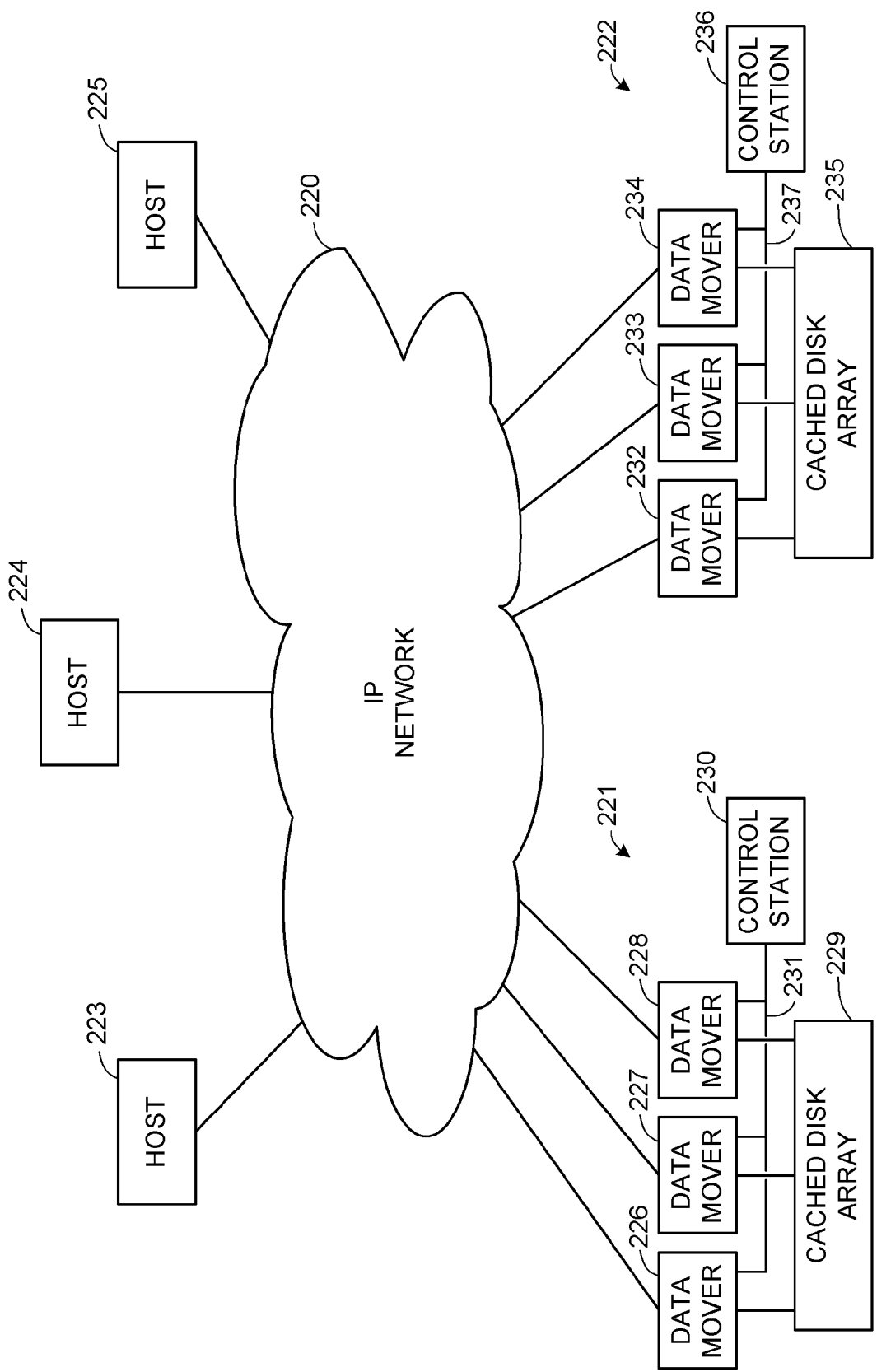
FIG. 15 is a block diagram of an IP network including multiple hosts and multiple data mover computers.

In the wide-area network of FIG. 15, it is desired to perform read-write updating of the respective file system copies in the network file servers 221, 222 while permitting concurrent read-only access by the hosts. It is also desired to distribute the updates over the IP network.

Figure 16:
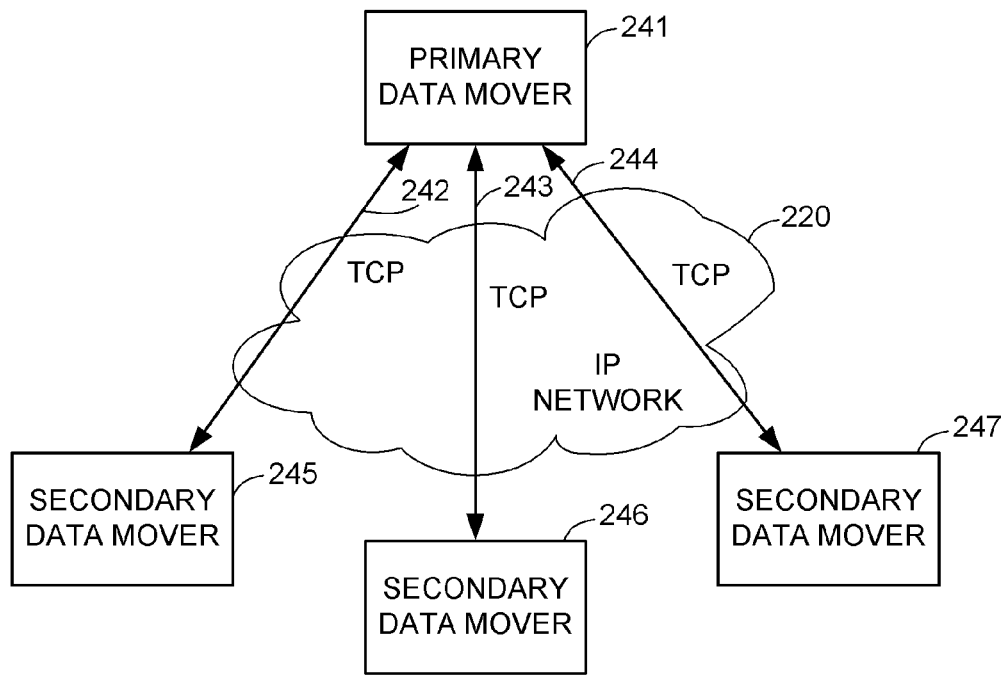
FIG. 16 is a block diagram showing a primary data rover distributing remote copy data to multiple secondary data movers in the IP network by establishing a Transmission Control Protocol (TCP) connection with each of the secondary data movers.

There are a number of ways that updates could be distributed over the IP network from a primary data mover to multiple secondary data movers. As shown in FIG. 16, for example, a primary data mover establishes a connection 242, 243, 244 in accordance with the industry-standard Transmission Control Protocol (TCP) over the IP network 220 to each secondary data mover 245, 246, 247, and then concurrently sends the updates to each secondary data mover over the TCP connection. When the updates need to be distributed to a large number of secondary data movers, however, the amount of time for distributing the updates may become excessive due to limited resources (CPU execution cycles, connection state, or bandwidth) of the primary data mover 241. One way of extending these limited resources would be to use existing IP routers and switches to implement "fan out" from the primary data mover 241 to the secondary data movers 245, 246, 247. Still, a mechanism for reliability should be layered over the Internet Protocol.

Figure 17:
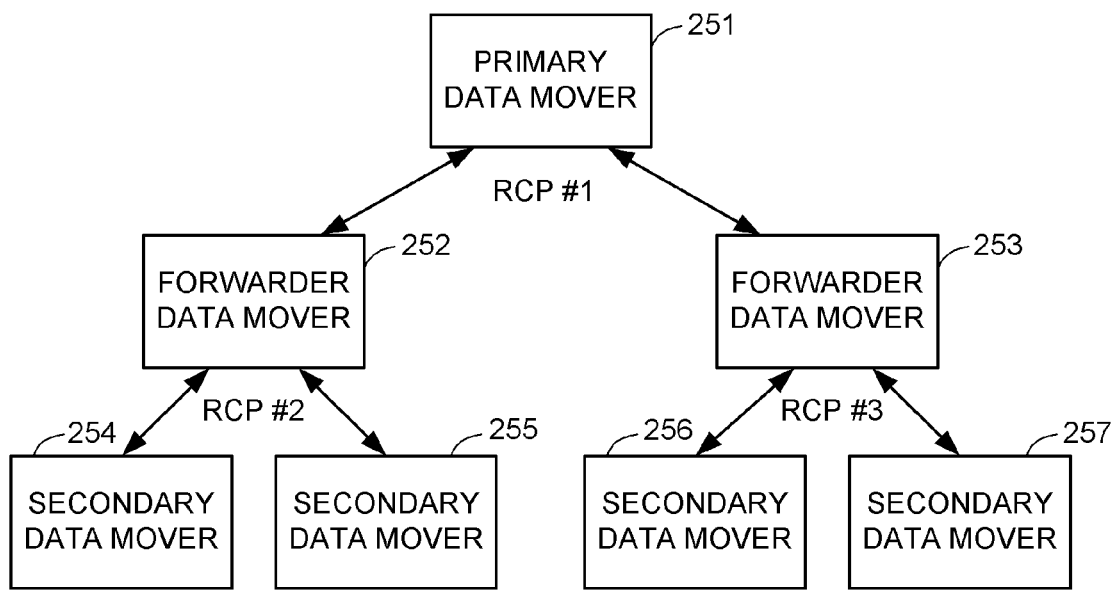
FIG. 17 is a block diagram showing a primary data mover distributing remote copy data to multiple data movers through forwarder data movers.

FIG. 17 shows that the time for distributing updates from a primary data mover 251 to a large number of secondary data movers 254, 255, 256, 257 can be reduced by using intermediate data movers 252, 253 as forwarders. The primary data mover 251 sends the updates to the forwarder data movers 252, 253, and each of the forwarder data movers sends the updates to a respective number of secondary data movers. The forwarder data movers 252, 253 may themselves be secondary data movers; in other words, each may apply the updates to its own copy of the replicated read-only file system. The distribution from the primary data mover 251 to the forwarder data movers 252, 253 can be done in a fashion suitable for wide-area distribution (such as over TCP connections). The forwarding method of replication of FIG. 17 also has the advantage that the distribution from each forwarder data mover to its respective data movers can be done in a different way most suitable for a local area or region of the network. For example, some of the forwarder data movers could use TCP connections, and others could use a combination of TCP connections for control and UDP for data transmission, and still other forwarders could be connected to their secondary data movers by a dedicated local area network.

For implementing the replication method of FIG. 17 over the Internet Protocol, there are a number of desired attributes. It is desired to maintain independence between the primary data mover and each of the secondary data movers. For example, a new secondary data mover can be added at any time to replicate an additional remote copy. The primary data mover should continue to function even if a secondary data mover becomes inoperative. It is also desired to maintain independence between the replication method and the IP transport method. Replication should continue to run even if the IP transport is temporarily inactive. It is desired to recover in a consistent fashion from a panic or shutdown and reboot. A record or log of the progress of the replication can be stored for recovery after an interruption. It is desired to build reusable program blocks for the replication function, so that the program blocks for the replication function can be used independent of the location of the primary file system or its replicas.

In a preferred implementation, independence between the replication process, the IP transport method, and the primary file system being replicated, is ensured by use of a save volume. The save volume is a buffer between the data producer (i.e., the host or application updating the primary file system), the replication process, and the data consumer (the secondary data movers). The save volume stores the progress of the replication over the Internet Protocol so as to maintain the consistency of the replication process upon panic, reboot, and recovery. The transport process need not depend on any "in memory" replication information other than the information in the save volume, so as to permit the replication process to be started or terminated easily on any data mover for load shifting or load balancing.

When a save volume is used, it can be shared between a primary data mover and a secondary data mover in the case of local file system replication, or a primary copy of the shared volume can be kept at the primary site, and a secondary copy of the shared volume can be kept at the secondary site, in the case of remote file system replication.

Figure 18:
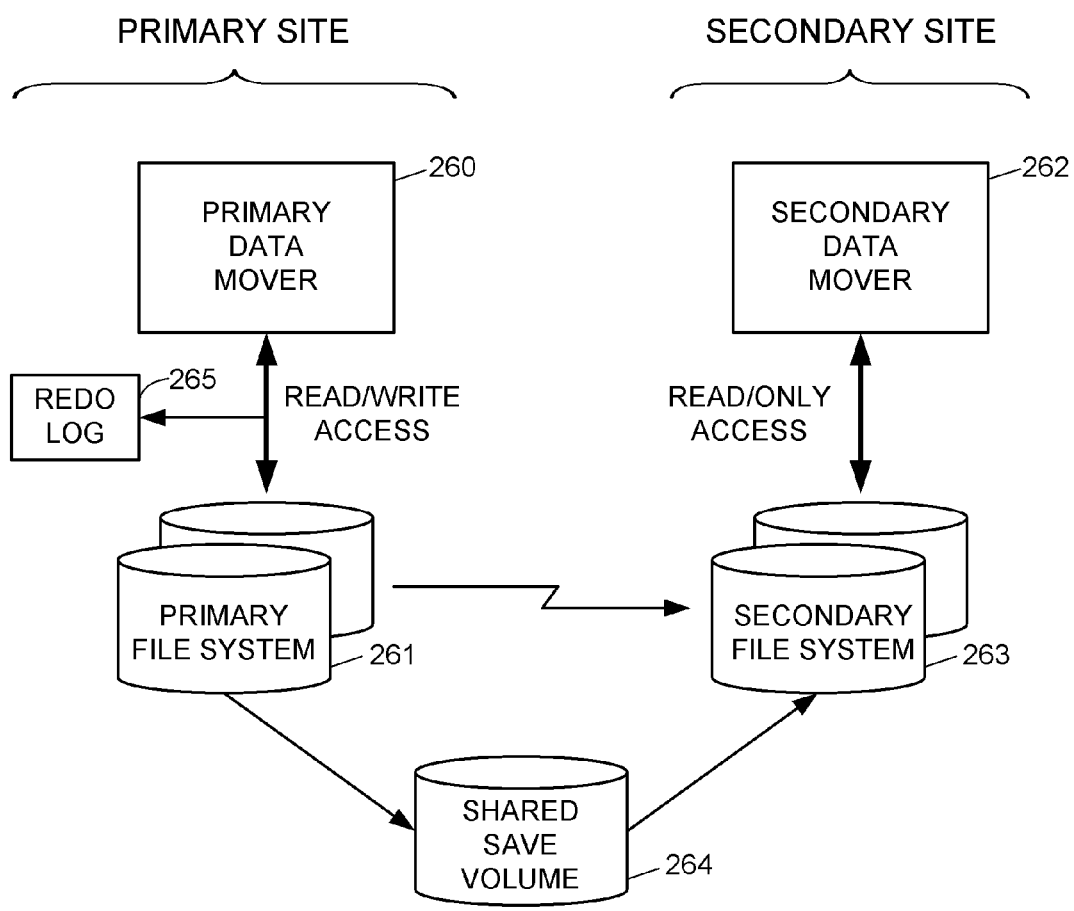
FIG. 18 is a block diagram showing a shared save volume used to buffer local copy data transmitted from a primary data mover to a secondary data mover.

For the case of local file system replication, FIG. 18 shows a primary site including a primary data mover 260 managing access to a primary file system 261, and a secondary data mover 262 managing access to a secondary file system 263 maintained as a read-only copy of the primary file system 261. A save volume 264 is shared between the primary data mover 260 and the secondary data mover 262. This sharing is practical when the secondary site is relatively close to the primary site. A redo log 265 records a log of modifications to the primary file system 261 during the replication process for additional protection from an interruption that would require a reboot and recovery.

Local replication can be used to replicate files within the same network file server. For example, in the network file server 221 in FIG. 15, the primary data mover could be the data mover 226, the secondary data mover could be the data mover 227, the save volume could be stored in the cached disk array 229, and replication control messages could be transmitted between the data movers over the data link 231.

Figure 19:
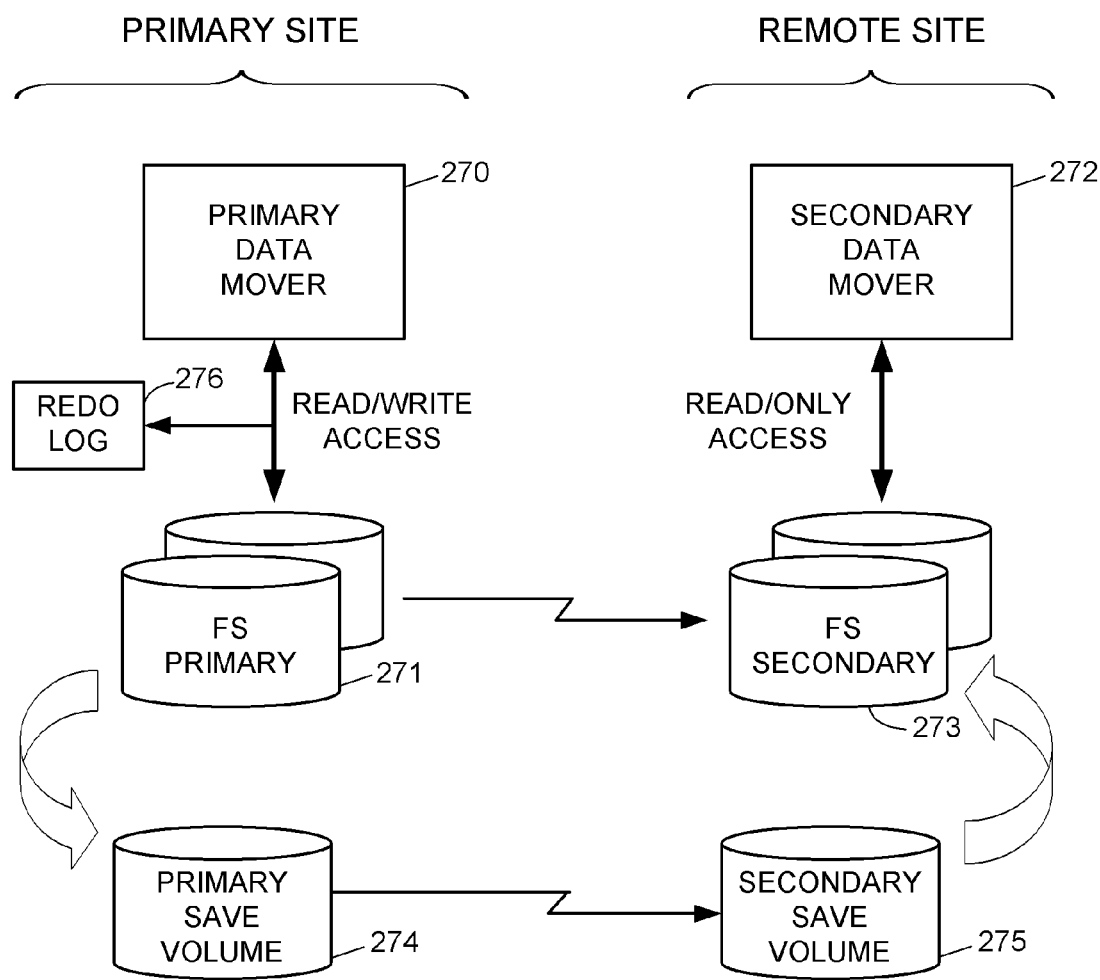
FIG. 19 is a block diagram showing a primary save volume and a secondary save volume.

For the case of remote file system replication, FIG. 19 shows a primary site including a primary data mover 270 managing access to a primary file system 271, and a secondary data mover 272 managing access to a secondary file system 273 maintained as a read-only copy of the primary file system 271. The primary site includes a primary save volume 274, and the remote site includes a secondary save volume 275. A redo log 276 records a log of modifications to the primary file system 271 during the replication process for additional protection from an interruption that would require a reboot and recovery.

Figure 20:
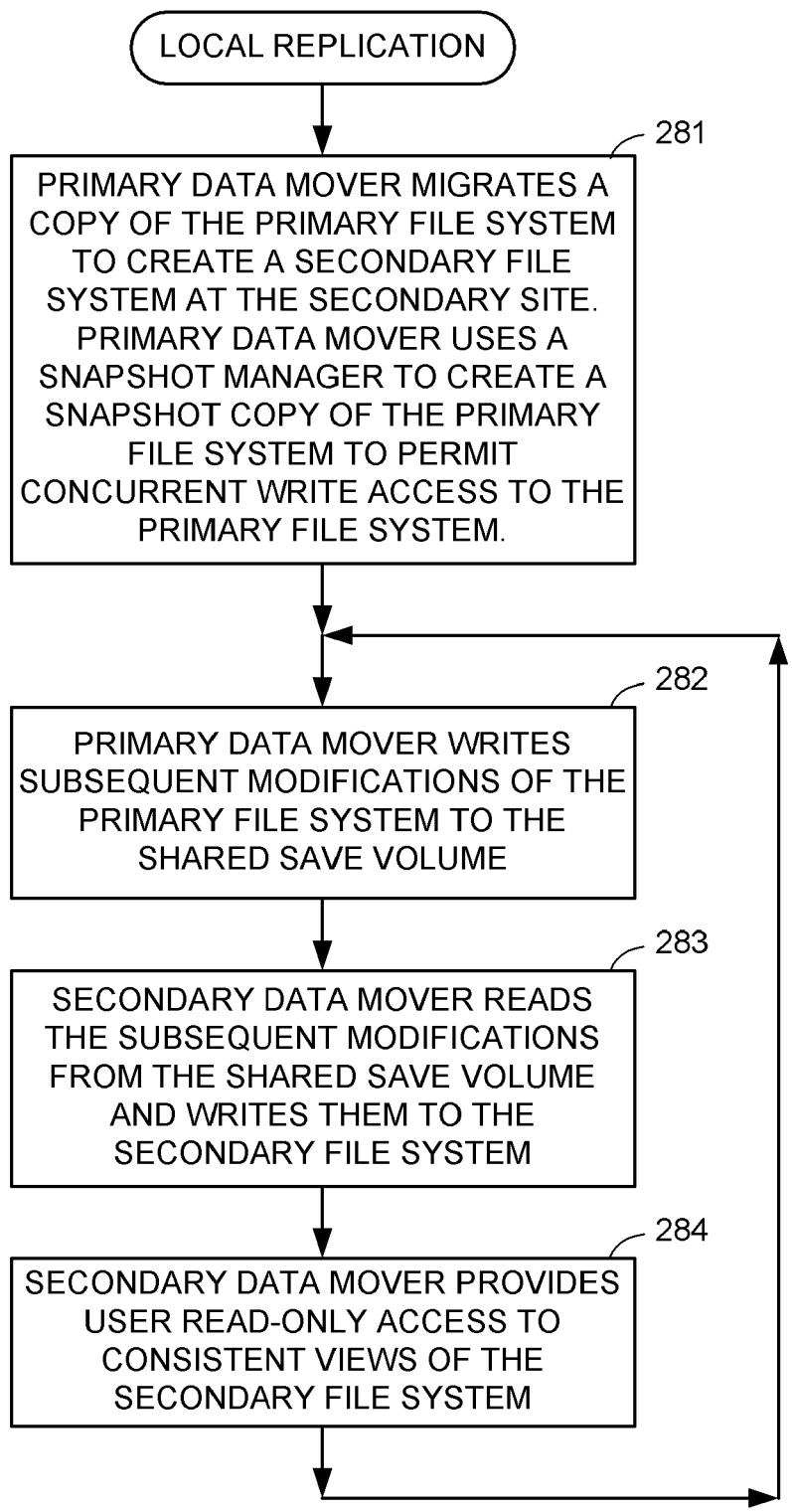
FIG. 20 is a flowchart showing local replication in the system of FIG. 18.

FIG. 20 shows a method of operating the system of FIG. 18 for local replication. In a first step 281, the primary data mover migrates a copy of the primary file system to create a secondary file system at the secondary site in such a way to permit concurrent write access to the primary file system. The migration, for example, may use the method shown in FIG. 17 of the above-cited Ofek U.S. Pat. No. 5,901,327, in which a bit map indicates remote write pending blocks. Alternatively, the migration may use a snapshot copy mechanism, for example, as described in Kedem, U.S. Pat. No. 6,076,148, in which a bit map indicates the blocks that have changed since the time of snap-shotting of the primary file system. The snapshot method is preferred, because it is most compatible with the delta set technique for remote copy of subsequent modifications. For example, a snapshot manager creates a snapshot copy of the primary file system, as will be further described below with reference to FIGS. 22 to 25. In any event, it is desired for the secondary file system to become a copy of the state of the primary file system existing at some point of time, with any subsequent modifications of the primary file system being transferred through the shared save volume.

In step 282, the primary data mover writes subsequent modifications of the primary file system to the shared save volume. In step 283, the secondary data mover reads the subsequent modifications from the shared save volume and writes them to the secondary file system. In step 284, the secondary data mover provides user read-only access to consistent views of the secondary file system. This can be done by integrating the subsequent revisions into the secondary file system and providing concurrent read-only access to the secondary file system in the fashion described above with reference to FIGS. 2 to 7. Execution loops from step 284 back to step 282. In this fashion, the secondary file system is updated from the primary site concurrently with read-only access at the secondary site.

Figure 21:
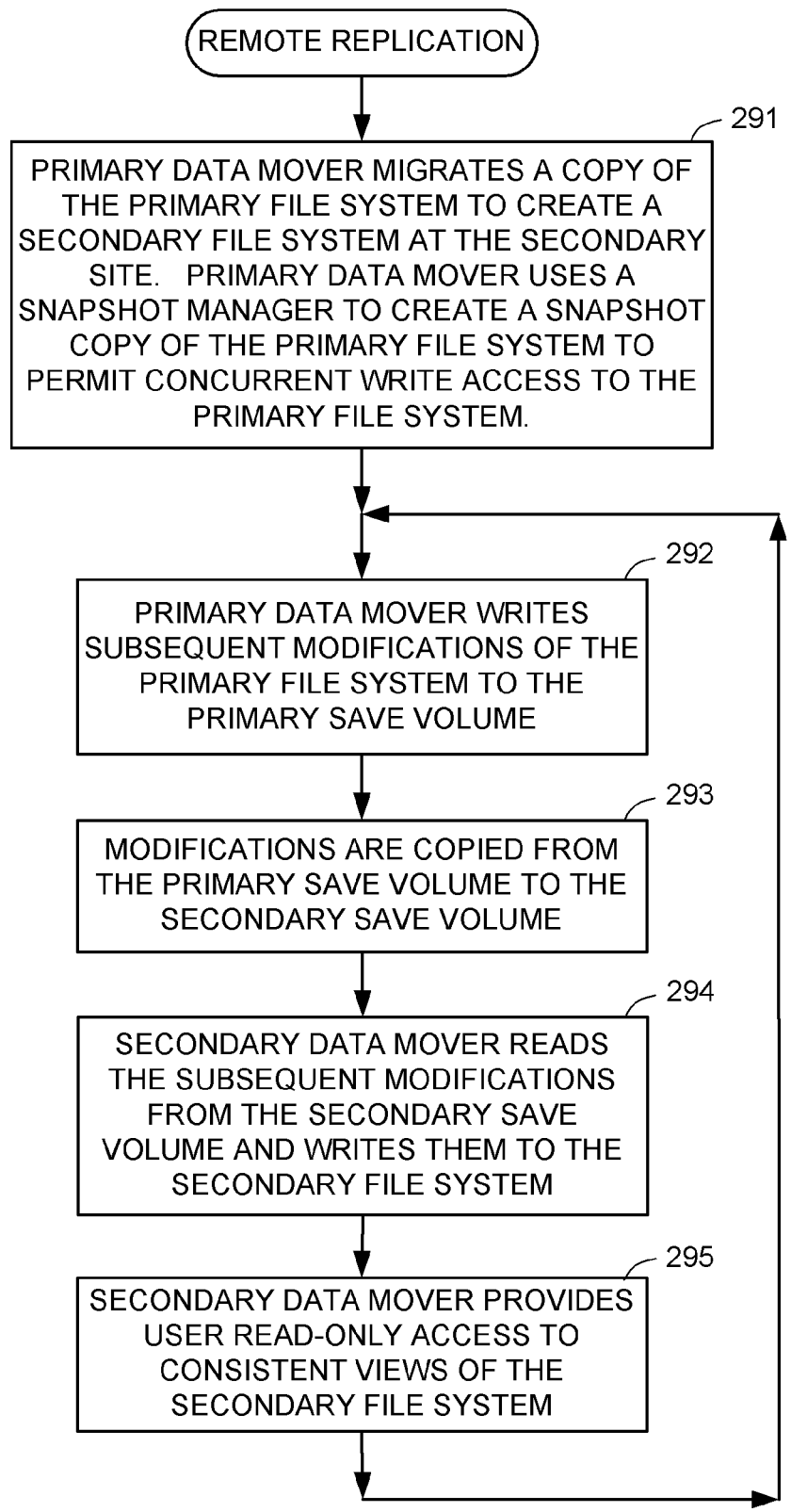
FIG. 21 is a flowchart showing remote replication in the system of FIG. 19.

FIG. 21 shows a method of operating the system of FIG. 19 for remote replication. In a first step 291, the primary data mover migrates a copy of the primary file system to create a secondary file system at the secondary site, in a fashion similar to step 281 in FIG. 20. In step 292, the primary data mover writes subsequent modifications of the primary file system to the primary save volume, in a fashion similar to step 282 in FIG. 20. In step 293, the modifications are copied from the primary save volume to the secondary save volume, for example, by using a delta volume facility for transmitting delta chunks as described above with reference to FIGS. 9 to 12. In step 294, the secondary data mover reads the modifications from the secondary save volume and writes them to the secondary file system. In step 295, the secondary data mover provides user read-only access to consistent views of the secondary file system, in a fashion similar to step 284 of FIG. 20. Execution loops from step 295 back to step 292. In this fashion, the secondary file system is remotely updated from the primary site concurrently with read-only access at the secondary site.

Figure 22:
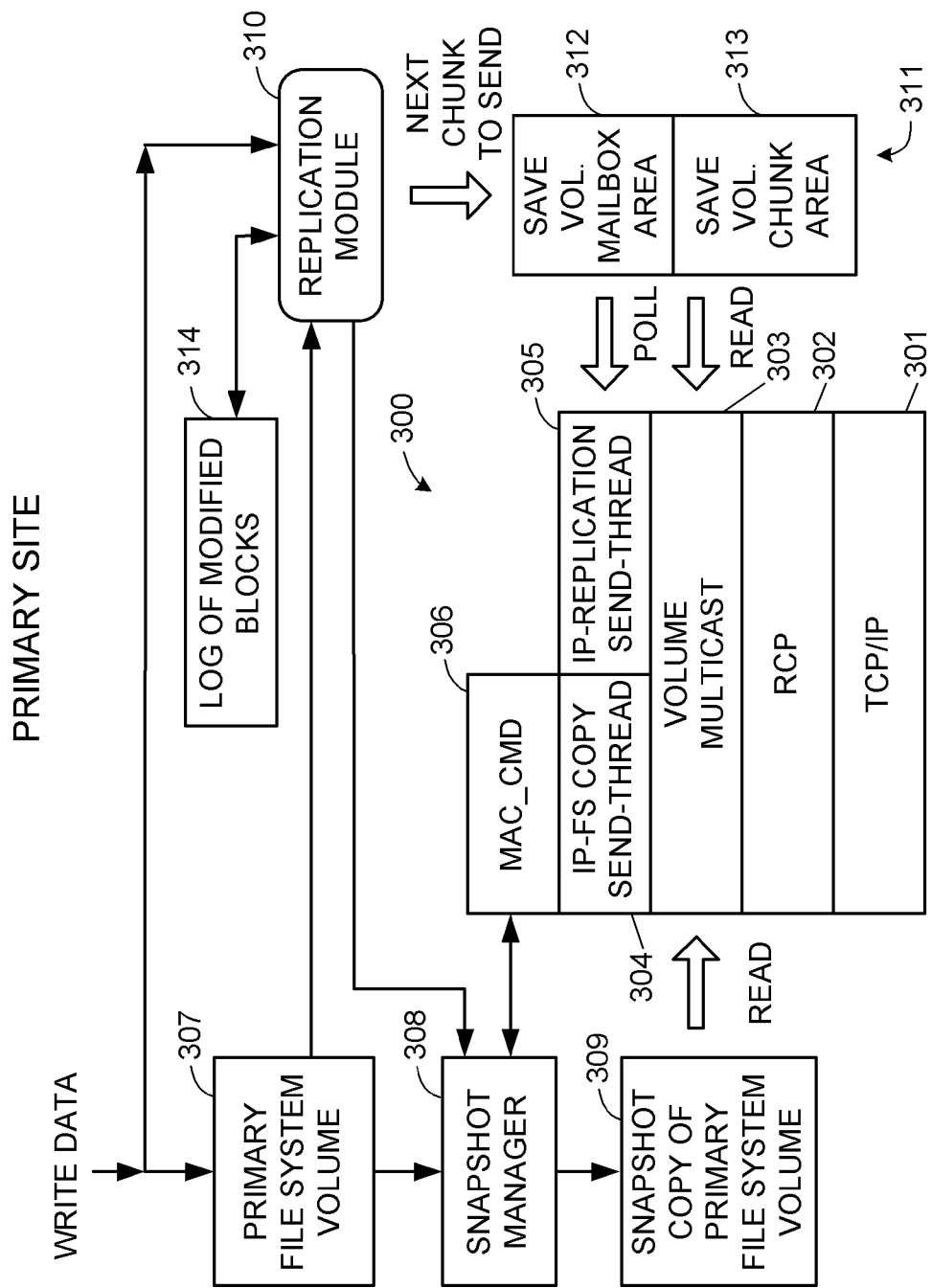
FIG. 22 is a block diagram of a primary site, including layered programming in a primary data mover.

FIG. 22 shows layered programming 300 for a primary data mover. It is desired to use layered programming in accordance with the International Standard Organization's Open Systems Interconnection (ISO/OSI) model for networking protocols and distributed applications. As is well known in the art, this OSI model defines seven network layers, namely, the physical layer, the data link layer, the network layer, the transport layer, the session layer, the presentation layer, and the application layer.

As shown in FIG. 22, the layered programming 300 includes a conventional TCP/IP transport layer 301. The layers above the TCP/IP transport layer 301 include a replication control protocol (RCP) session layer 302, a volume multicast presentation layer 303, and an IP-FS (file system) copy send-thread 304 and an IP-replication send-thread 305 at the program layer level. Over these program layers is a management and configuration command interpreter (MAC_CMD) 306 for system operator set-up, initiation, and supervisory control of the replication process.

In operation, the RCP layer 302 provides an application program interface (API) for multicasting data over TCP/IP. RCP provides callback, acknowledgement (ACK), and resumption of aborted transfers.

RCP provides the capability for a remote site to replicate and rebroadcast remote copy data. The remote site functions as a router when it rebroadcasts the remote copy data. RCP can also be used to replicate data locally within a group of data movers that share a data storage system.

To create a new remote copy in response to a supervisory command, the command interpreter 306 initiates execution of a replication module 310 if the replication module is not presently in an active mode. Then, the command interpreter 306 invokes a snapshot manager 308 to create a snapshot copy 309 of a primary file system volume 307. When the snapshot copy is created, the snapshot manager 308 obtains a current delta set number from the replication module 310 and inserts the current delta set number into the metadata of the snapshot. The current delta set number for the snapshot is all that the secondary needs to identify modifications that are made subsequent to the creation of the snapshot. In this fashion, any number of new remote copies can be created at various times during operation of the replication module, with the snapshot process operating concurrently and virtually independent of the replication module. For example, whenever synchronization of a remote copy is lost, for example due to a prolonged disruption of network traffic from the primary site to the remote site, a new remote copy can be created to replace the unsynchronized remote copy.

Once the snapshot copy 309 is accessible, the command interpreter 306 initiates execution of an instance of the IP-FS copy send-thread 304. The instance of the IP-FS copy send-thread 304 reads data from the snapshot copy 309 and calls upon the volume multicast layer 303 to multicast the remote copy data to all of the secondary data movers where the remote copies are to be created. This can be a copy by extent, so there is no copying of invalid or unused data blocks. For example, the volume multicast layer 303 is given a copy command (@vol., length) specifying a volume and an extent to be copied, and may also specify a group of destinations (an RCP group). The snapshot copy 309 of the primary file system identifies the next valid block to be copied, and the number of valid contiguous blocks following the next block. These blocks are copied at the logical level, so it does not matter what physical structure is used for storing the secondary file system at the secondary site. The copying is done locally, or by remote copy, for example by transporting the data block over IP. The volume multicast layer 303 invokes the RCP layer 302 to transport each data block.

During the remote copy process, whenever a modification is made to a block of the primary file system volume 307, the replication module 310 logs an indication of the modified block in a log 314 and later assembles the modification into a delta set chunk written to a primary save volume 311. The replication module 310 logs the indications in the log 314 on a priority or foreground basis as data is written to the primary file system volume 307, and also logs boundaries between delta sets. The replication module 310 later reads the log 314 to read the indicated modifications from the primary file system volume 307, assemble the indicated modifications into delta set chunks on a background basis, and store the delta set chunks in a save volume chunk area of the save volume 311. For example, the log is in the form of a queue of two bit-map tables, a new one of the tables being written to coincident with write operations upon the primary file system volume 307, and an old one of the tables being read to determine blocks to copy from the primary file system to create a new delta set in the save volume 311. When the delta set chunks become available for distribution from the save volume 311, the replication module 310 updates the save volume mailbox area 312 by storing each delta set chunk definition (@vol., length).

The IP-replication send-thread instance 305 polls the save volume mailbox area 312 to see if any delta set chunks have been stored in the save volume chunk area 313. If so, then the thread instance calls upon the volume multicast layer 303 to multicast the delta set chunks to the data movers that manage the storage of the respective remote file system copies. For example, for each delta set chunk, the IP-replication send-thread instance 305 issues a volume multicast command to the volume multicast layer 303. When the chunk multicast is completed, the IP-replication send-thread instance 305 updates its context on the save volume 311 in the mailbox area 312. At reboot after an interruption of multicast of a chunk, the IP-replication send-thread instance is able to restart the multicast of the chunk. The IP-replication send-thread instance also is responsible for retrying transmission of the chunk whenever the connection with the secondary is interrupted.

Figure 23:
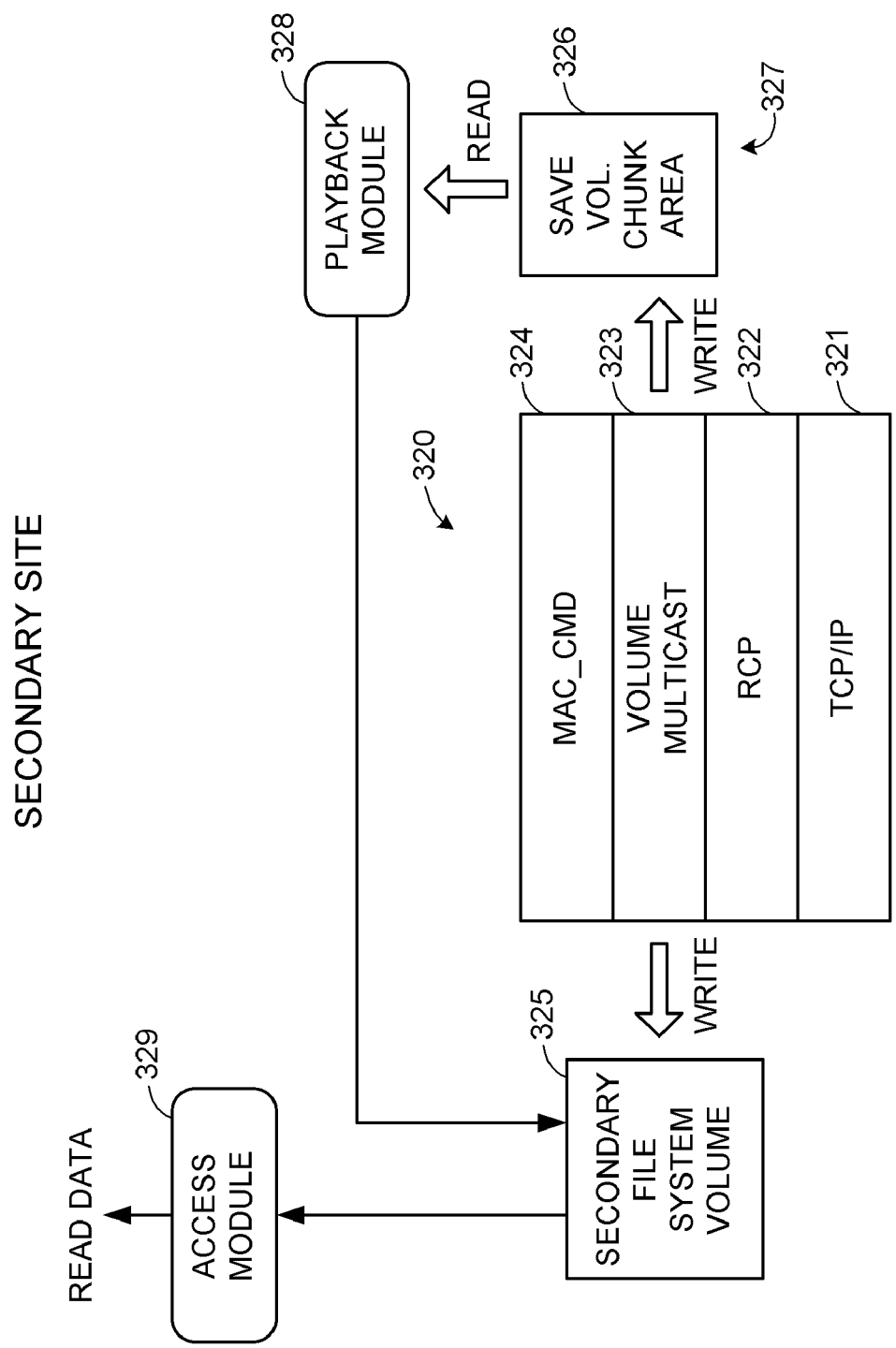
FIG. 23 is a block diagram of a secondary site, including layered programming in a secondary data mover.

FIG. 23 shows the layered programming 320 for a secondary data mover. The programming includes a TCP/IP layer 321, an RCP layer 322, a volume multicast layer 323, and a management and configuration command interpreter (MAC_CMD) 324. During creation of a new remote copy in a secondary file system volume 325, the volume multicast layer 323 writes remote copy data from the primary data mover to the secondary file system volume 325, and concurrently writes modifications (delta set chunks) from the primary data mover to a save volume chunk area 326 of a secondary save volume 327. For example, the volume multicast layer performs the steps in FIG. 4 described above to write the modifications to the save volume chunk area 326.

A header for the changes in a next version of the delta set is sent last, because there is no guarantee of the order of receipt of the IP packets. The header of the delta set includes a generation count, the number of delta blocks for the next version of the delta set, a checksum for the header, and a checksum for the data of all the delta blocks. The receiver checks whether all of the changes indicated in the header have been received.

Once a complete remote snapshot copy has been reconstructed in the secondary file system volume 325, a playback module 328 is activated to read the modifications from the save volume chunk area 326 and integrates them into the secondary file system volume 325. The playback module 328, for example, performs the steps in FIGS. 6 to 7 as described above. From each delta-set chunk in the save volume area 326, the playback module 328 gets the block address and number of contiguous blocks to be written to the secondary file system volume.

An access module 329 provides read-only access to a consistent view of the secondary file system in the secondary file system volume 325. The access module 329, for example, performs the steps shown in FIG. 5 as described above.

Figure 24:
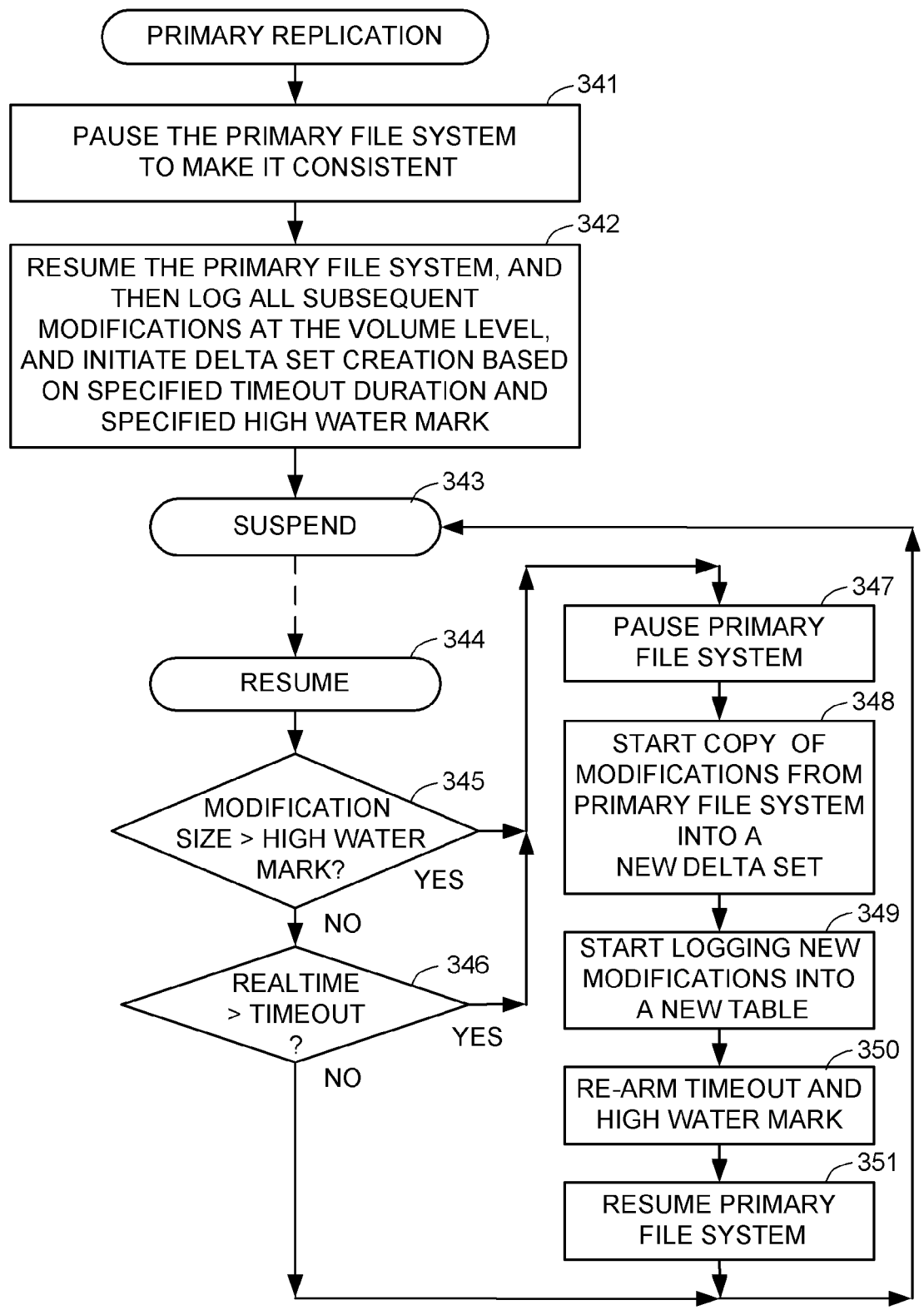
FIG. 24 is a flowchart of a process of replication at the primary site of FIG. 22.

FIG. 24 shows a procedure executed by the primary site of FIG. 22 to perform replication of the primary file system. When replication is started in a first step 341, the primary file system is paused to make it consistent. Migration of the primary file system to the secondaries can then be started using a remote copy facility or snapshot manager. Then, in step 342, concurrent write access to the primary file system is resumed, and all modifications made on the primary file system are logged at the volume level on a priority or foreground basis when each modification is made. In addition, a background process of delta-set creation is initiated.

Two configurable triggers specify the rate of delta set creation: a timeout parameter and a high water mark parameter. Whenever delta set creation is initiated, the current time, as indicated by a real-time clock, is added to a configurable timeout interval to produce the timeout parameter. The high water mark specifies an amount of modified data, in megabytes. The first trigger that occurs will trigger the creation of a delta set. The replication module creates the delta set by pausing the primary file system, copying the modified blocks from the primary file system to the delta set volume, and then resuming the primary file system. By logging indications of the modified blocks and later copying the modified blocks, multiple modifications to the same block are represented and transported once during a single delta set.

In step 343, the background process of delta set creation is temporarily suspended, for example, by placing the process on a task queue that is periodically serviced. In step 344, execution of the delta set creation process is resumed. In step 345, the modification size is compared to the high water mark. If the high water mark is not exceeded, then execution continues to step 346. In step 346, the present value of the real-time clock is compared to the timeout parameter. If the timeout parameter has not been exceeded, then execution loops back to step 343. Otherwise, execution continues to step 347. Execution also branches to step 347 from step 345 if the modification size is greater than the high water mark.

In step 347, the primary file system is paused. In step 348, a new delta set is created by starting the copying of modified blocks from the primary file system volume to the new delta set. In step 349, the logging of new modifications into a new table is started. In step 350, the time-out and high water mark is re-armed. In other words, a new value for the timeout parameter is computed as the current real time plus the configurable timeout interval, and the modification size is reset to indicate the size of the new modifications. In step 351, the primary file system is resumed. Execution loops from step 351 back to step 343 to suspend the background process of delta set creation.

To maintain the consistency of the delta set created in the primary save volume, the primary file system could remain paused and not resumed in step 351 until the copy process begun in step 348 is completed. Preferably, however, the copy process begun in step 348 is a snapshot copy process, so that write access to the primary file system may resume in step 351 before the copy process has been completed. For the example of the modification log being a queue of two bit-map tables, when a write access to a block in the primary file system is requested, the old bit map is accessed on a priority basis. If the corresponding bit in the old bit map indicates a modified block in the primary file system volume not yet copied to the save volume, then it is copied on a priority basis to the save volume before the new write data is written to the primary file system volume. As soon as a modified block has been copied from the primary file system volume to the save volume, the corresponding bit in the old bit map is cleared. In this fashion, at the completion of the copy process, the entire old table will be in a reset state, ready to be used as the next new table.

When the copy process started in step 348 is completed, the replication module sets the save volume mailbox area to show that a new delta set is ready for transmission. Upon polling the mailbox area, the IP-replication send-thread finds that the new delta set is ready for transmission, and invokes the volume multicast layer to transmit the delta set to the secondary sites. After step 351, execution loops back to step 343.

Figure 25:
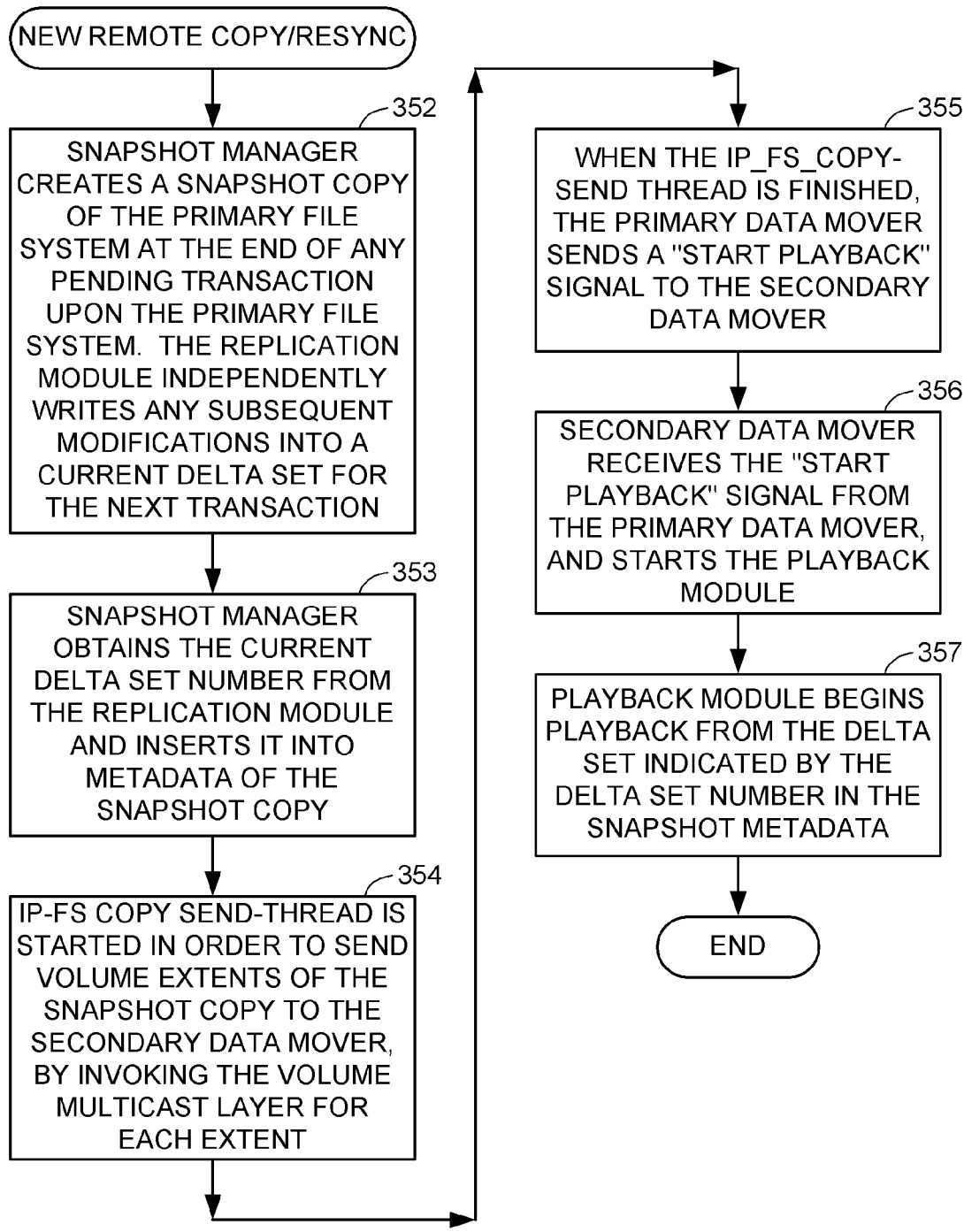
FIG. 25 is a flowchart of a procedure for producing a new remote copy of a primary file system concurrent with ongoing replication and multicasting of modifications to the primary file system.

FIG. 25 shows a flow chart of the overall procedure of creating a new remote copy, either for the first time at a secondary site or as a replacement for a remote copy that needs to be resynchronized with the primary file system. In a first step 352, the snapshot manager creates a snapshot copy of the primary file system at the end of any pending transaction upon the primary file system (e.g., when the primary file system becomes consistent after it is paused in step 341 of FIG. 24 or in step 347 of FIG. 24.) The replication module independently writes any subsequent modifications into a current delta set for the next transaction.

In step 353, the snapshot manager obtains the current delta set number from the replication module and inserts it into metadata of the snapshot copy. In step 354, the IP-FS copy send-thread is started in order to send volume extents of the snapshot copy to the secondary data mover, by invoking the volume multicast layer for each extent.

In step 355, when the IP-FS copy send-thread is finished, the primary data mover sends a "start playback" signal to the secondary data mover. In step 356, secondary data mover receives the "start playback" signal from the primary data mover, and starts the playback module. In step 357, playback module begins playback from the delta set indicated by the delta set number in the snapshot metadata.

The playback module (328 in FIG. 23) at the secondary site integrates the delta set modifications into secondary file system. Each time that a new delta set appears in the secondary save volume, the modifications can be integrated into the secondary file system, for example, by pausing the secondary file system, copying the modifications from the secondary save volume into the secondary file system, and resuming the secondary file system. Alternatively, a timeout interval and a high water mark value can be configured for the secondary site, so that the modifications may be integrated into the secondary file system at a rate less frequent than the rate at which the new delta sets appear in the secondary save volume. In this case, the modifications from the secondary save volume would not be integrated into the secondary file system until the timeout time is reached unless the amount of modifications in the save volume reaches the high water mark. The integration of the modifications can be performed concurrently with read-only access to a consistent view of the secondary file system as show in FIGS. 3, 6, and 7, as described above.

Figure 26:
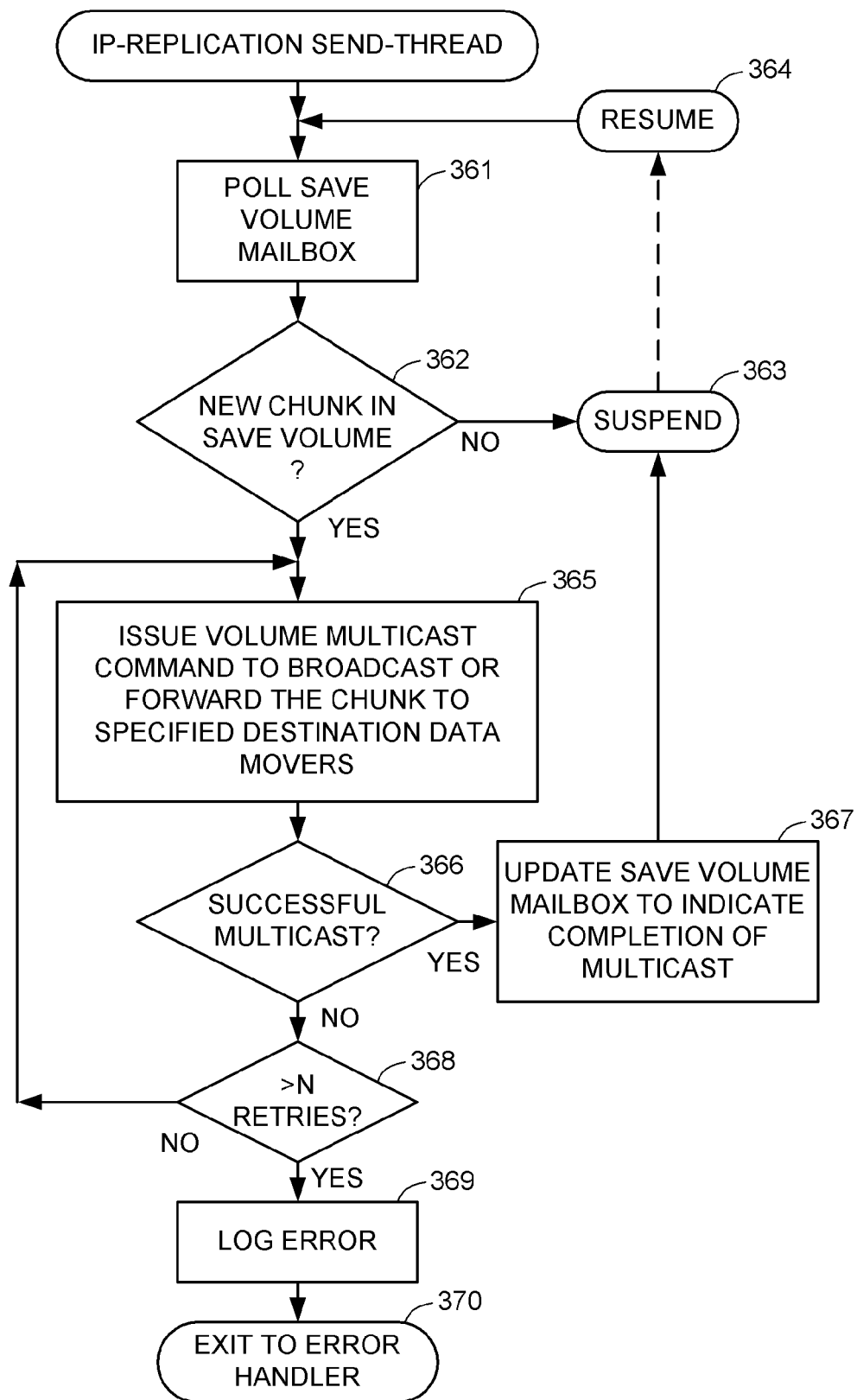
FIG. 26 is a flowchart of an IP-replication send-thread introduced in FIG. 22.

FIG. 26 shows a flowchart of the IP-replication send-thread (305 in FIG. 22). In a first step 361, the thread polls the primary save volume mailbox area. If the mailbox area indicates that there is not a new delta set chunk in the primary save volume area, then the thread is finished for the present task invocation interval. Execution of the thread is suspended in step 363, and resumed in step 364 at the next task invocation interval.

If the mailbox area indicates that there is a new delta set chunk in the primary save volume, then execution continues from step 362 to step 365. In step 365, the IP-replication send-thread issues a volume multicast command to broadcast or forward the delta set chunk to specified destination data movers. In step 366, if the multicast has been successful, then execution branches to step 367. In step 367, the IP-replication send-thread updates the primary save volume mailbox to indicate completion of the multicast, and execution continues to step 363 to suspend execution of the thread until the next task invocation interval.

In step 366, if the multicast is not successful, the execution continues to step 368 to test whether more than a certain number (N) of retries have been attempted. If not, then execution loops back to step 365 to retry the multicast of step 365. If more than N retries have been attempted, then execution continues from step 368 to step 369. In step 369, the IP-replication send-thread logs the error, and then in step 370, passes execution to an error handler.

Figure 27:
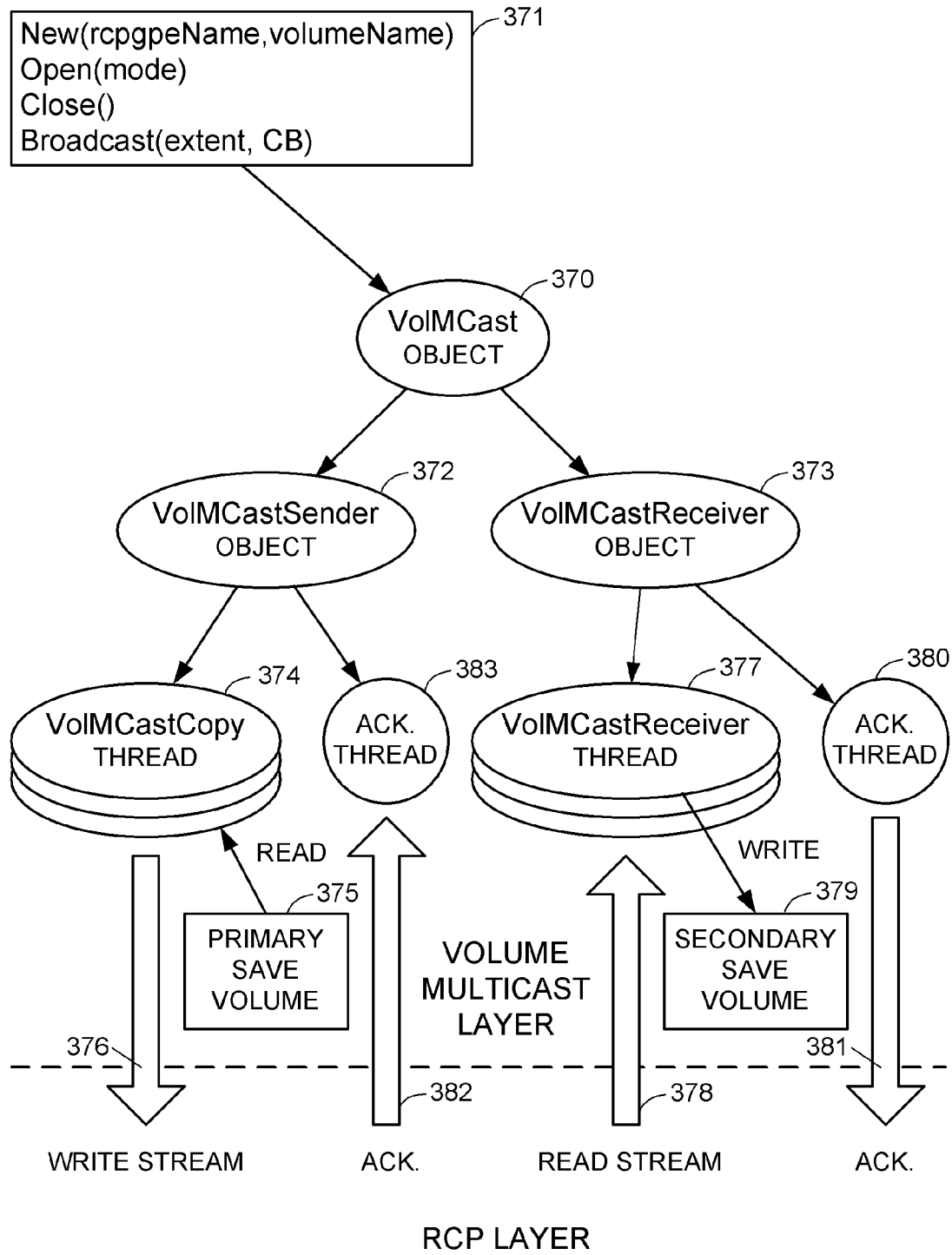
FIG. 27 is a block diagram of a volume multicast level in the data mover programming of FIG. 22 and FIG. 23.

FIG. 27 shows various objects defined by the volume multicast layer. The volume multicast layer provides multicast service to instances of a VolMCast object 370 representing a volume multicast relationship between a respective primary file system volume specified by a volume name (volume-Name) and a respective group of secondary data movers specified by an RCP group name (rcpgpeName). For example, at configuration time, one or more RCP groups are defined in response to configuration commands such as:

.RCP_config<server_name>add<IP>

This configuration command adds the IP address (IP) of a specified destination data mover (server_name) to an RCP group.

Also at configuration time, a specified data mover can be defined to be a primary data mover with respect to the RCP group (a relationship called a MultiCastNode) in response to a configuration command such as:

.server_config<server_name>rep<groupname>add<IP> where "server_name" is the name for the primary data mover, "groupname" is the name of a configured RCP group, and "IP" is the IP address of the primary data mover. When configuration of the MultiCastNode object is finished, the MultiCastNode object will have its own name, a name for the primary data mover, an RCP group name, and a list of IP addresses to which the primary server should broadcast in order to transmit IP packets to all the secondary data movers in the RCP group.

The VolMCast object can then be built on top of a MultiCastNode object. The additional information required for the VolMCast object is, on the sender side, the primary or source file system volume and on each receiver side, the secondary or destination file system volume. For flexibility, it is permitted to specify a different volume name on each secondary data mover. By specifying the destination volume names during creation of the VolMCast object, it is not necessary to specify the destination volume names at each copy time. For example, the VolMCast object is defined by configuration commands to the primary data mover such as:

.server_config<server_name>"volmcast MultiCast-
        NodeName>[−src|−dest]volume"

where <server_name> is the name of the MultiCast Node.

Once the VolMCast object has been defined, an IP-replication service can be configured for the object upon the primary data mover. Then the primary data mover will respond to commands for starting the replication service and stopping the replication service upon the VolMCast object. When replication is stopped on a secondary, the secondary file system is left in a consistent state. In other words, if a replay was in progress, the stop will complete when the replay is finished.

The primary data mover may respond to additional commands for create a new delta set on demand, updating the replication policy (high water mark and timeout interval parameters) on the primary file system or secondary file systems, and defining persistency of the replication process upon remount or reboot of the primary file system or any one of the secondary file systems. For example, at reboot the replication service is re-started on the primary file system and the secondary file system in the state it was at unmount or shutdown. A recovery of the replication context happens at reboot or on remount. The replica recovery is executed before the primary and secondary file systems are made available for user access. This allows all modifications during the recovery of the primary file system to be logged by the replication service.

As shown in FIG. 27, the volume multicast layer is responsive to a number of commands 371 from higher layers in the protocol stack. In addition to the configuration commands for defining a new VolMCast object relating a specified primary file system volume to a specified RCP group, an existing VolMCast object can be opened for either a sender mode or a receiver mode. An opened VolMCast object can be closed.

Once a VolMCast object has been opened in a sender mode, it can be called upon to broadcast a control block (CB) to the secondary volumes of the VolMCast object, such as a control block specifying a remote copy of a specified extent of the primary volume.

Control blocks may specify various operations upon the secondary volumes of the VolMCast object, such as cluster file system commands for performing operations such as invalidations, deletions, renaming, or other changes in the configuration of the objects of the file system upon all copies (local or remote) of the file system. In this case, RCP is used for the broadcast or forwarding of the cluster file system commands to all the data movers that are to operate upon the local or remote copies of the file system, and for returning acknowledgement of completion of the operations upon all of the copies of the file system.

With reference to FIG. 27, the volume multicast layer defines a VolMCastSender object 372 instantiated when a VolMCast instance is opened in the sending mode, and a VolMCastReceiver object 373 instantiated when a VolMCast instance is opened in a receiving mode. The VolMCastSender object class and the VolMCastReceiver object class inherit properties of the VolMCast object class. When the volume multicast layer is called upon in a primary data mover to maintain remote copies of a specified extent of a VolMCastSender instance, an instance of a VolMCastCopy thread 374 is created and executed. The VolMCastCopy thread instance accesses the delta sets from a primary save volume 375 to produce a write stream 376 of blocks sent down to the RCP layer. At the secondary data mover, an instance of a VolMCastReceiver thread 377 is instantiated and executed to receive a read stream 378 of blocks and write the copied delta sets into a secondary save volume 379. An instance of an acknowledgement thread 380 returns an acknowledgement 381 of completion of copying of a delta-set for an extent to the secondary file system. The acknowledgement is sent down to the RCP layer of the secondary data mover. At the primary, the RCP layer sends the acknowledgement 382 to an instance of an acknowledgement thread 383.

RCP is a session-layer protocol, for replication from one primary to multiple secondary sites. Control is initiated by the primary, except when recovering from aborted transfers. RCP uses TCP between the primary and secondary for control and data. Network distribution is by an application-level multicast (ALM) using the RCP as a forwarder. Port sharing with HTTP is used for crossing firewalls.

RCP may support other replication applications in addition to 1-to-N IP-based replication for wide-area distribution of read-only data. These other applications include 1-to-N volume mirroring, cluster file system commands, remote file system replication, and distribution and replication of other commands that may be recognized by the data movers.

The 1-to-N volume mirroring is a simplification of to 1-to-N IP-based replication for wide-area distribution of read-only data, because the volume mirroring need not synchronize a remote volume with any consistent version of the primary volume until the remote volume needs to be accessed for recovery purposes.

Remote file system replication also uses RCP for broadcast or forwarding an application command to a remote data mover to initiate a replication of a file system managed by the remote data mover. In a similar fashion, RCP may broadcast or forward other commands recognized by data movers, such as iSCSI or remote-control type commands for archival storage. For example, RCP could broadcast or forward remote control commands of the kind described in Dunham, U.S. Pat. No. 6,353,878 issued Mar. 5, 2002 entitled "Remote Control of Backup Media in a Secondary Storage Subsystem Through Access to a Primary Storage Subsystem," incorporated herein by reference.

The RCP forwarder is composed of two RCP sessions, an outbound session at the primary, and an inbound session at the secondary The inbound RCP session receives a group name and looks up the group in a routing table. If routes for the group exist in the routing table, then an RCP forwarder is created at the secondary, including a data path by pointer passing from an "in" session to an "out" session.

An RCP group may be configured to include application-level multicast (ALM) topology. For example, ALM route configuration commands begin with an identifier number for the network file server ("cel") that contains the forwarder data mover, and an identifier number ("ser") for the forwarder data mover in the network server. The configuration commands end with a "nexthop" specification of an immediate destination data mover:

cel1-ser2: rcproute add group=g1 nexthop=cell2-ser2 cel2-ser2: rcproute add group=g1 nexthop=cell2-ser3 cel2-ser2: rcproute add group=g1 nexthop=cell2-ser4

In effect, the forwarder data mover adds the "nexthop" specification to an entry for the RCP group in the routing table in the forwarder data mover. This entire entry can be displayed by the following configuration command:

cel2-ser2: rcproute display

The entry is displayed, for example, as a list of the "nexthop" destination data movers. The entry can be deleted by the following configuration command:

cel2-ser2: rcproute delete

Each immediate destination data mover may itself be configured as a forwarder in the RCP group. In this case, RCP commands and data will be forwarded more than once, through a chain of forwarders. The set of possible RCP routes from a primary or forwarder in effect becomes a tree or hierarchy of destinations.

The ALM commands may also include commands for creating sessions and sending control blocks or data. For example, the following ALM command creates a session and sends application data to all destinations in group "g1" from cell 1-ser2 from a file (named "filename") using a test application (named "rcpfiletest").

cell-ser2: rcpfiletest data=filename group=g1

Figure 28:
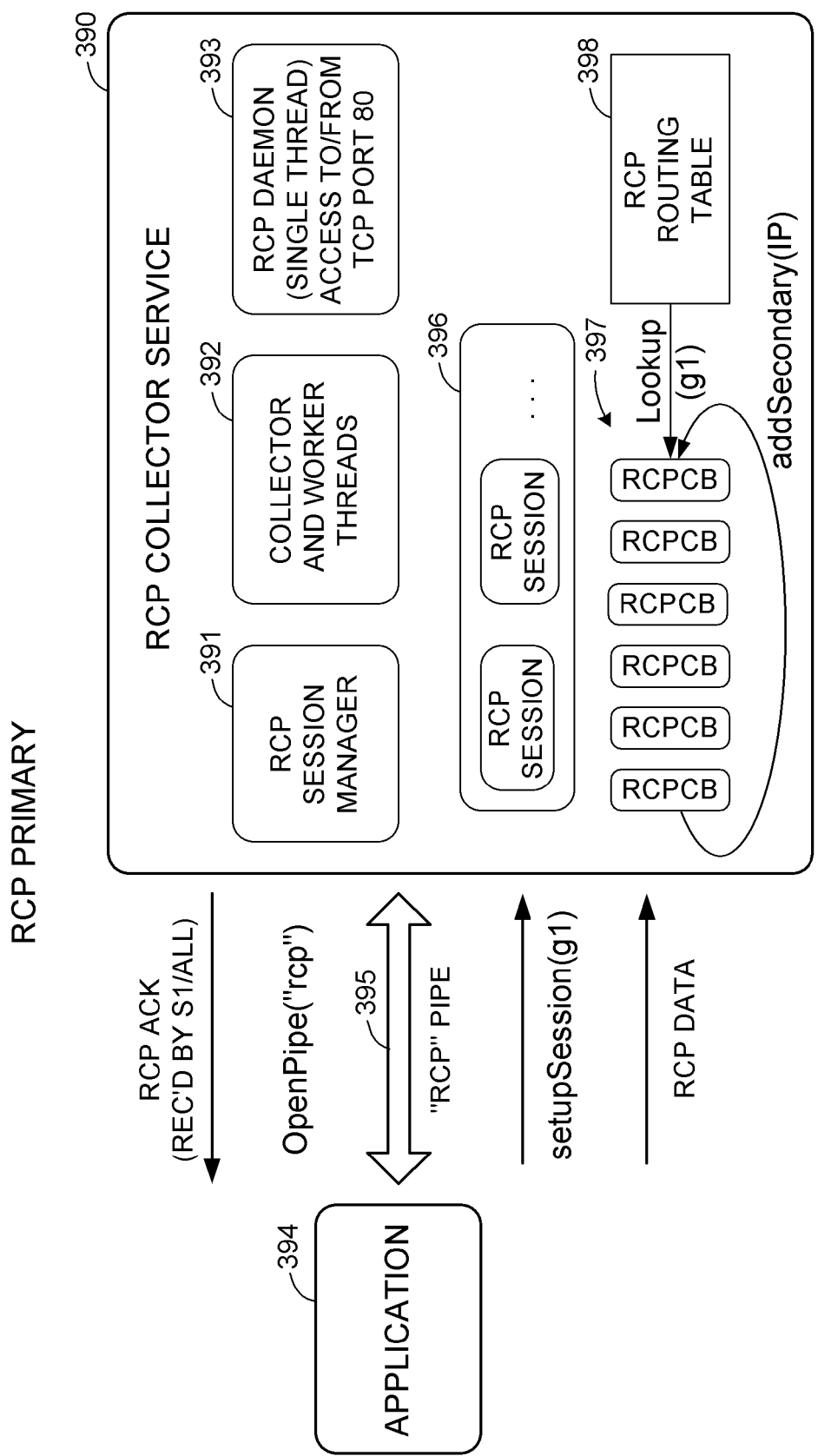
FIG. 28 is a block diagram of the RCP level in the primary data mover programming of FIG. 22.

FIG. 28 shows the RCP collector service 390 at a primary site. The programming for the RCP collector service includes an RCP session manager 391, collector and worker threads 392, and a single-thread RCP daemon 393. The RCP session manager 391 responds to requests from higher levels in the protocol stack, such as a request from an application 394 to open an RCP pipe 395 between the application 394 and the RCP collector service 390. The application 394 may then send to the session manager 391 requests to setup sessions with RCP groups. A session queue 396 stores the state of each session, and a control block queue 397 keeps track of control blocks sent via TCP/IP to the secondary data movers in the RCP groups. An RCP routing table 398 identifies the immediate destinations of each RCP group to which the TCP/IP messages from the RCP collection service are to be sent, as well as any other destinations to which the messages will be forwarded. For communication of the TCP/IP messages between the RCP service and the network, TCP port :80 is opened in both directions (i.e., for input and output). The single thread RCP daemon 393 is used for interfacing with this TCP port :80.

Figure 29:
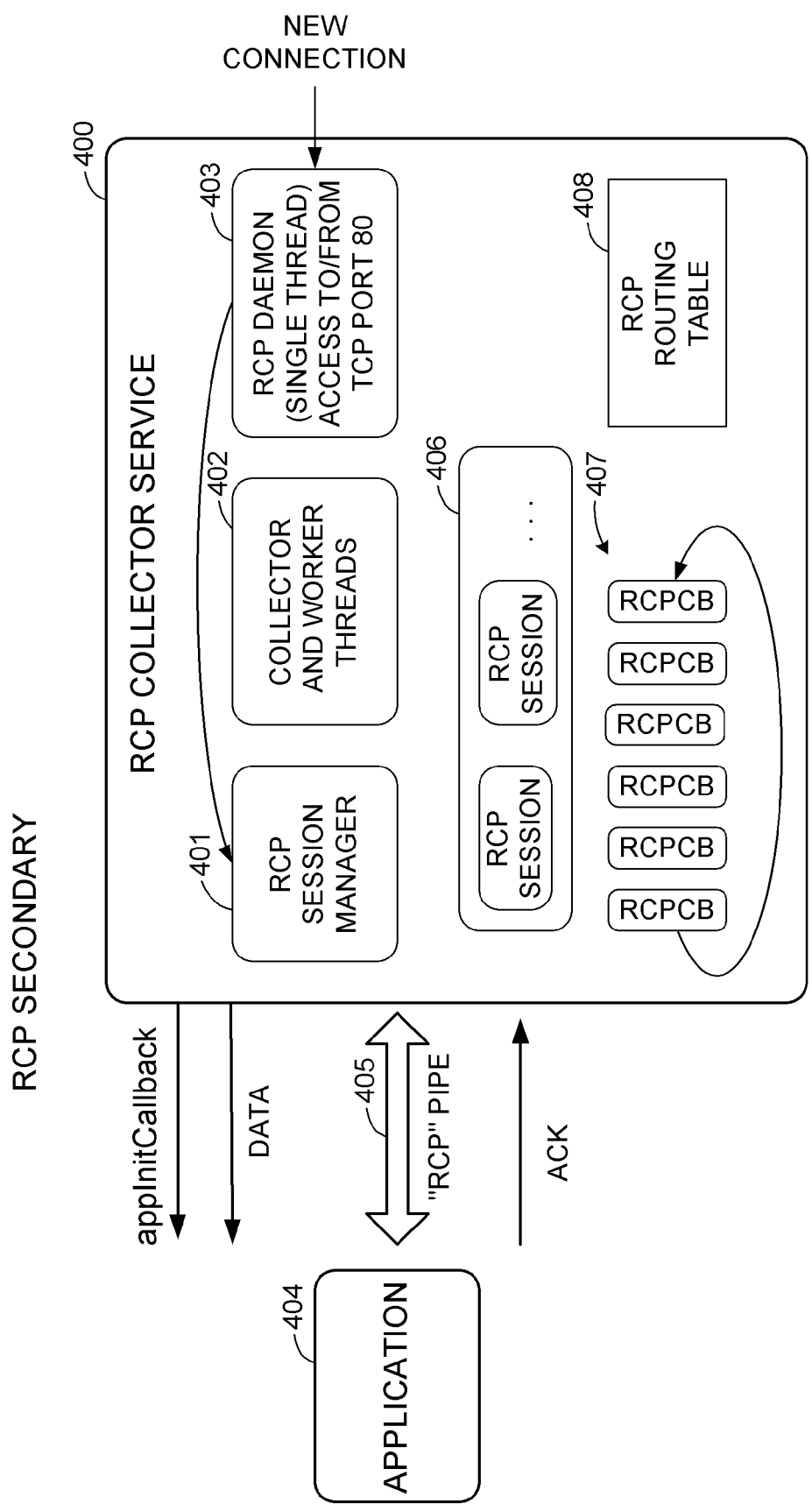
FIG. 29 is a block diagram of the RCP level in the secondary data mover programming of FIG. 23.

FIG. 29 shows the RCP collector service 400 at a secondary site. The RCP collector service at the secondary site is similar to the RCP collector service at the primary site, in that it includes an RCP session manager 401, collector and worker threads 402, a single thread RCP daemon 403 for access to/from TCP port :80, an RCP session state queue 406, an RCP control block queue 407, and an RCP routing table 408. The primary difference between the RCP collector service at the secondary site from the RCP collector service at the primary site is in the collector and worker threads 402. At the RCP secondary, the RCP commands and data are received from the TCP port :80 instead of from the application 404. The application 404 is the consumer of the RCP data, instead of a source for RCP data. The RCP collector service 400 at the secondary site may also serve as a forwarder for RCP commands, and therefore the RCP collector service and worker threads 402 at the secondary site include a forwarder thread that does not have a similar or complementary thread in the RCP collector service at the primary site.

In operation, an application 404 can initialize the RCP collector service so that the RCP collector service will call back the application upon receipt of certain RCP commands from TCP port :80. For example, if a new connection command is received from TCP port :80, then the RCP daemon 403 forwards the new connection command to the RCP session manager. The RCP session manager 401 recognizes that this connection command is associated with an application 404 at the secondary site, opens an RCP pipe 405 to this application, and calls the application 404 indicating that the RCP pipe 405 has been opened for the RCP session. (The volume multicast receiver thread 377 of FIG. 27 is an example of such an application.) The application 404 returns an acknowledgement. If the new connection is for a new RCP session, then the session manager creates a new RCP session, and places state information for the new session on the RCP session queue 406. RCP control blocks and data may be received for the session from the TCP port :80. The data may be forwarded to the application, or to a file specified by the application. RCP control blocks to be executed by the RCP collector service 400 may be temporarily placed on the control block queue 407. RCP control blocks or data intended for other secondary site may be forwarded to the intended secondary sites.

Figure 30:
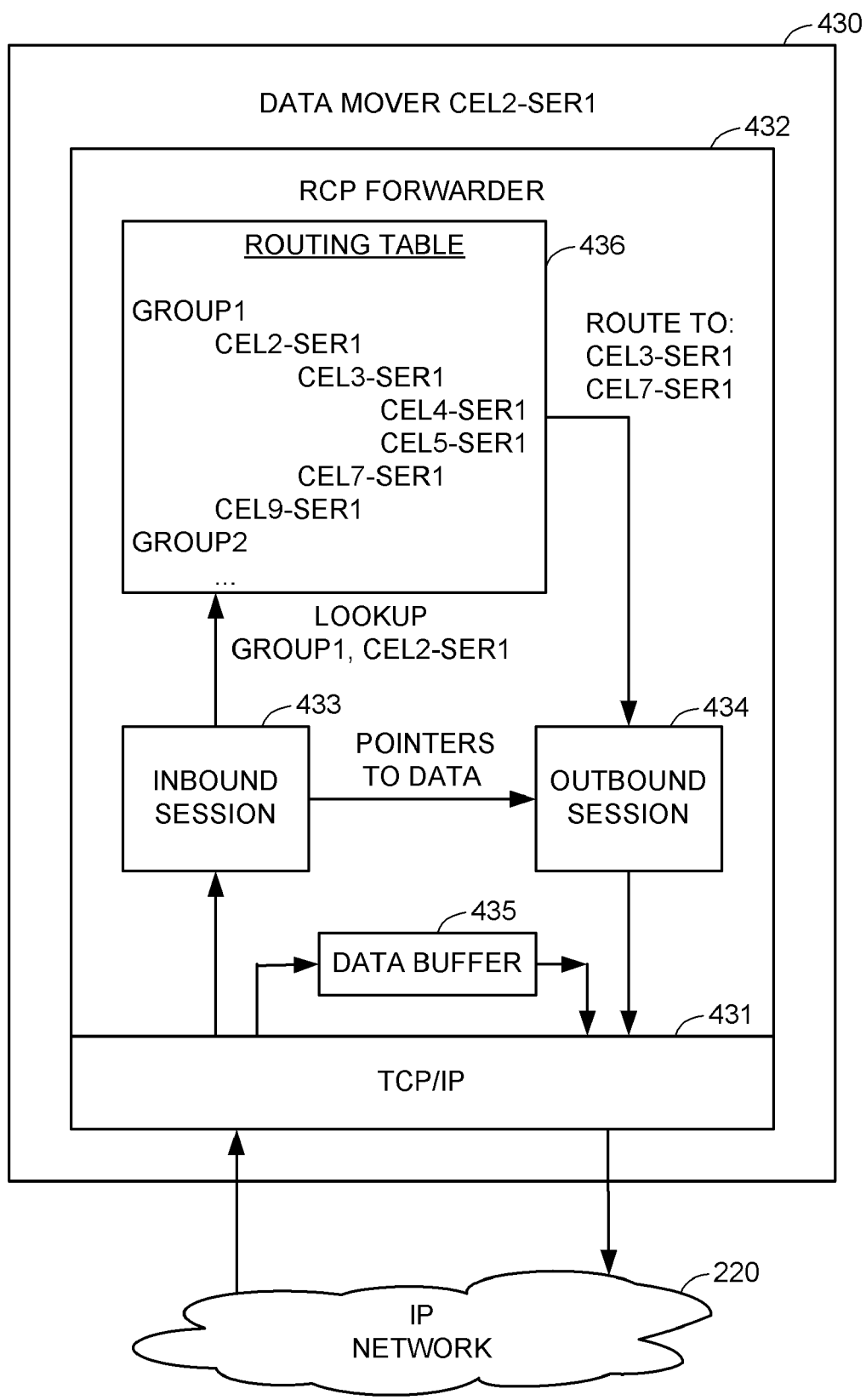
FIG. 30 is a block diagram of a RPC forwarder at the RPC level in a forwarder data mover.

FIG. 30 shows further details of the forwarding of RCP commands and data by a data mover 430 identified as Cel2-Ser1. The data mover 430 is programmed with a TCP/IP layer 431 for communication with the IP network 220, and an RCP layer 432 over the TCP/IP layer. For forwarding the RCP commands and data, the RCP layer 432 creates an inbound session 433 and an outbound session 434. The inbound session 433 receives RCP commands from the TCP/IP layer 431. The TCP/IP data stream is retained in a data buffer 435. When an RCP command calls for the forwarding of RCP commands or data to another data mover in a specified RCP group, the inbound session 433 performs a lookup for the group in a routing table 436.

In the example of FIG. 30, the routing table 436 includes a copy of all of the routing information for each group of which the data mover 430 is a member. In this case, for GROUP1, the primary data mover sends RCP commands to at least data movers CEL2-SER1 and CEL9-SER1. CEL2-SER1 (i.e., the data mover 430) forwards the RCP commands and RCP data to data movers CEL3-SER1 and CEL7-SER1. In particular, the inbound session 433 creates an outbound session 434 and creates a TCP/IP data path from the inbound session 433 to the outbound session 434 by passing pointers to the data in the data buffer. The outbound session 434 invokes the RCP/IP layer 431 to multicast the TCP data stream in the data buffer 435 over the IP network 220 to the data movers CEL3-SER1 and CEL7-SER1.

The data mover CEL3-SER1 in succession forwards the RCP commands to data movers CEL4-SER1 and CEL5-SER1. Normally, the data mover CEL2-SER1 (430) does not need to know that the data mover CEL3-SER1 forwards the RCP commands to data movers CEL4-SER1 and CEL5-SER1, but if the data mover CEL2-SER1 (430) would fail to receive an acknowledgement from CEL3-SER1, then the data mover CEL2-SER1 could minimize the impact of a failure of CEL3-SER1 by forwarding the RCP commands to CEL4-SER1 and CEL5-SER1 until the failure of CEL3-SER1 could be corrected.

Figure 31:
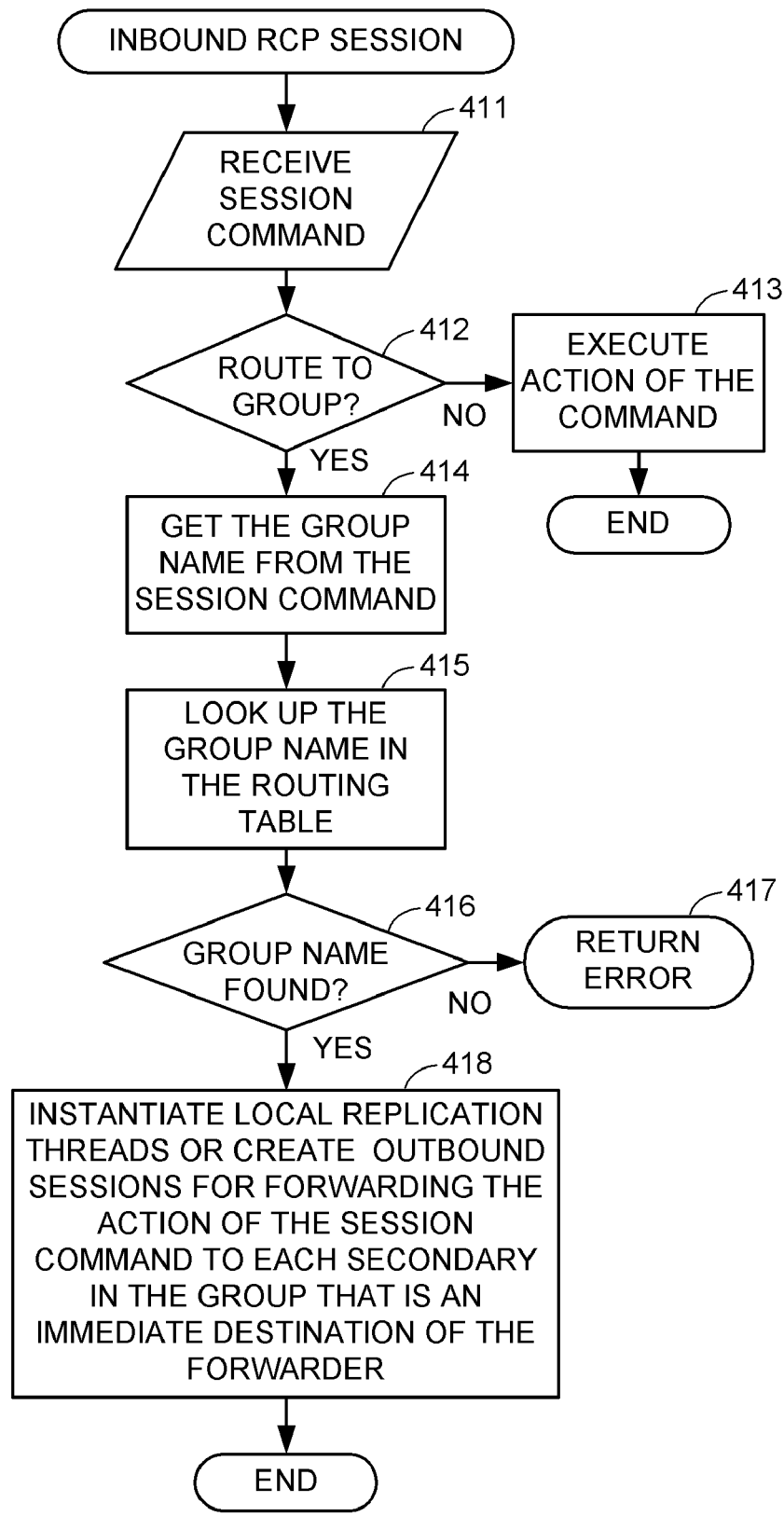
FIG. 31 is a flowchart of an inbound RCP session in the secondary data mover.

FIG. 31 shows a flowchart of how the RCP collector service at the secondary site processes an inbound RCP session command. In a first step 411, the RCP collector service receives a session command. In step 412, if this session command is not a command to be forwarded to other secondary sites, then execution branches to step 413 to execute the action of the command, and the processing of the session command is finished.

In step 412, if the session command is a command to be forwarded to other secondary sites, then execution continues from step 412 to step 414. In step 414, the RCP collector service gets the RCP group name from the session command. Then, in step 415, the RCP collector service looks up the group name in the RCP routing table (408 in FIG. 29). If the group name is not found, then execution branches from step 416 to step 417. In step 417, the RCP collector service returns an error message to the sender of the session command.

In step 416, if the group name is found in the RCP routing table, then execution continues from step 416 to step 418. In step 418, the RCP collector service forwards the action of the session command to each secondary in the group that is an immediate destination of the forwarder (i.e., the data mover that is the secondary presently processing the RCP session command). This is done by instantiating local replication threads or creating outbound sessions for forwarding the action of the session command to each secondary in the group that is an immediate destination of the forwarder. After step 418, processing of the RCP session command is finished.

Figure 32:
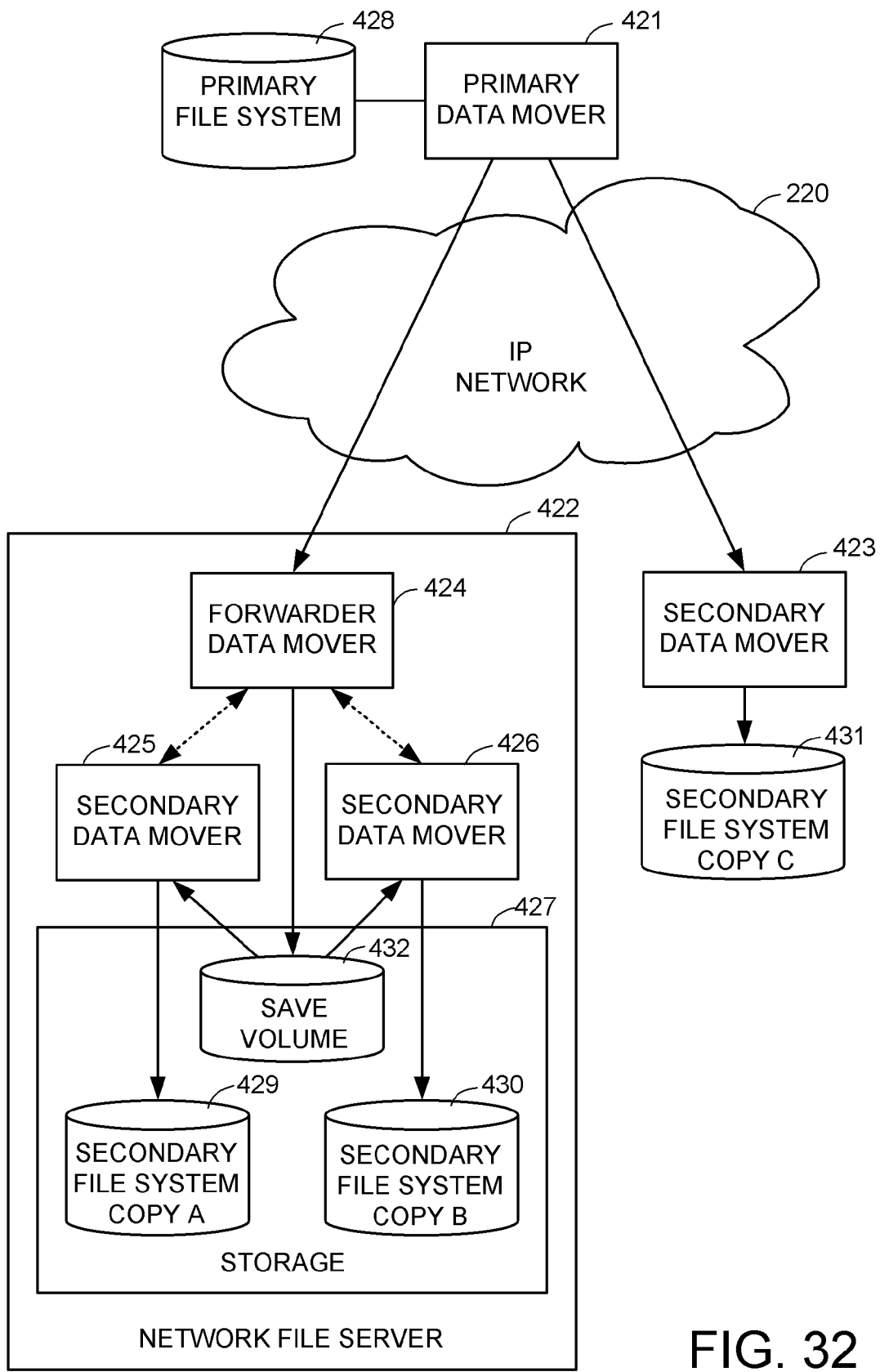
FIG. 32 is a block diagram showing a forwarder data mover performing local replication.

FIG. 32 shows an example of forwarding and local replication. In this example, the IP network 220 connects a primary data mover 421 to a network file server 422 and a secondary data mover 423. The network file server 422 includes three data movers 424, 425, and 426, and storage 427. The primary data mover manages network access to a primary file system 428. The data mover 424 functions as a forwarder data mover. The data mover 425 functions as a secondary data mover managing access from the network to a secondary file system (copy A) 429. The data mover 426 functions as a secondary data mover managing access from the network to a secondary file system (copy B) 430. The data mover 423 manages network access to a secondary file system (copy C) 431.

In operation, when the primary data mover 421 updates the primary file system 428, it multicasts the modified logical blocks of the file system volume over the IP network 220 to the forwarder data mover 424 and to the secondary data mover 423. The forwarder data mover 424 receives the modified blocks, and performs a local replication of the blocks to cause the secondary data mover 425 to update the secondary file system (copy A) 429 and the to cause the secondary data mover 426 to update the secondary file system (copy B) 430.

To perform the local replication, the forwarder data mover 424 has its volume multicast layer (323 in FIG. 23) save the modified blocks in a save volume 432 in the storage 427, and then the forwarder data mover 424 sends replication commands to the local secondary data movers 425 and 426. Each local secondary data mover 425, 426 has its playback module (328 in FIG. 23) replay the modifications from the save volume 432 into its respective secondary file system copy 429, 430.

Figure 33:
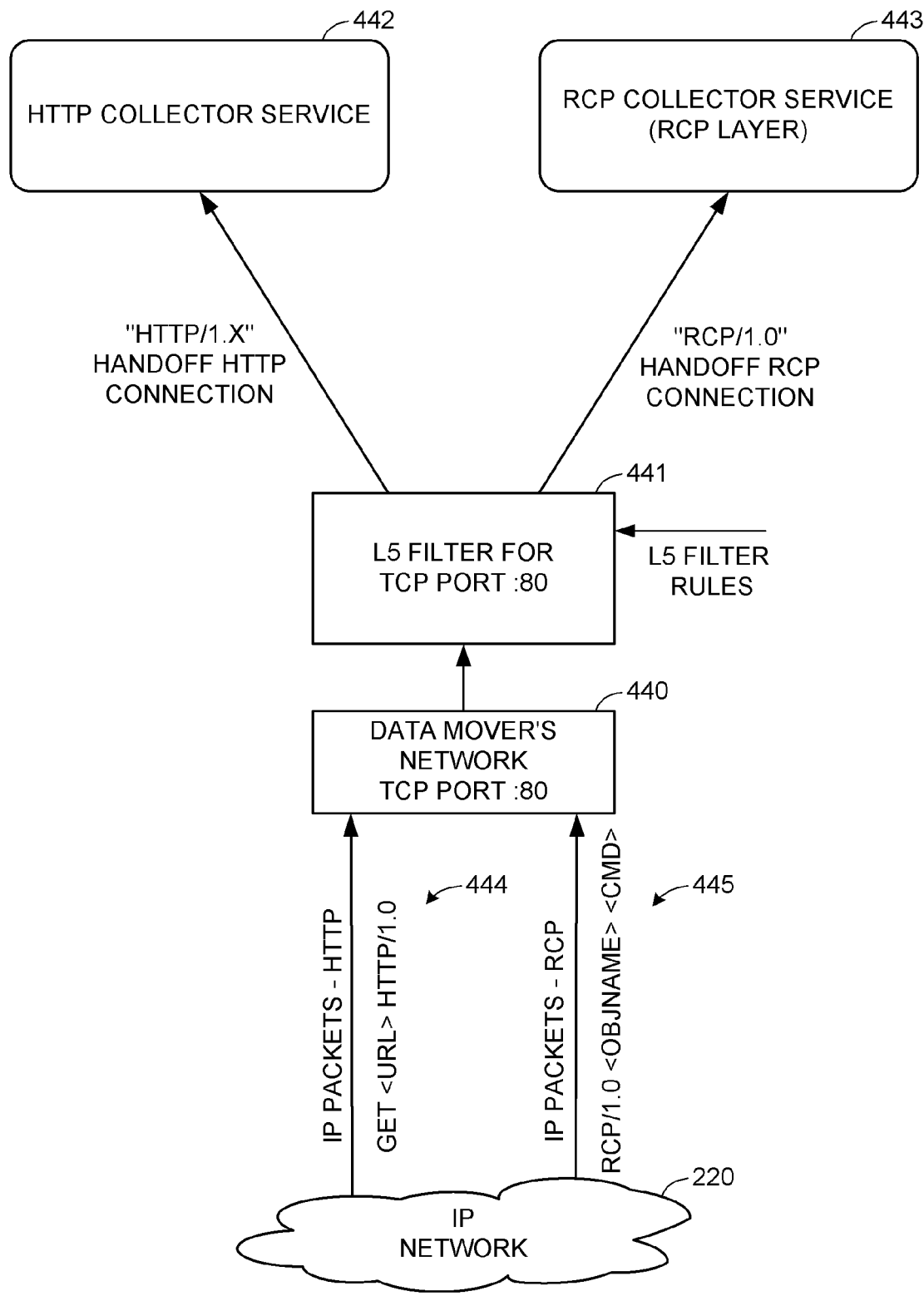
FIG. 33 is a block diagram showing the sharing of a data mover's single TCP port for RCP connections with Hypertext Transfer Protocol (HTTP) connections.

FIG. 33 shows the sharing of the data mover's network TCP port :80(440) between HTTP and RCP. This configuration is used in all data movers having the RCP collector service; i.e., primary, secondary, or forwarder. The TCP data channel from TCP port :80(440) provides an in-order byte stream interface. IP packets 444 for HTTP connections and IP packets 445 for RCP connections from the network 220 are directed to the data mover's TCP port :80 (440). The TCP port :80 (440) is opened in both directions (i.e., input and output). In the input direction, the data mover uses a level 5 (L5) filter 441 for demultiplexing the IP packets for the HTTP connections from the IP packets for the RCP connections based on an initial segment of each TCP connection. The L5 filter hands the TCP connection off to either a HTTP collector service 442 or an RCP collector service 443. (The RCP collector service 443 is the collector service 390 in the RCP primary of FIG. 28 or the RCP collector service 400 in an RCP secondary of FIG. 29.) For example, if the initial segment of a TCP connection contains "HTTP/1. X", then the L5 filter 441 directs the IP packets for the connection to the HTTP collector service 442. If the initial segment of the TCP connection contains "RCP/1.0", then the IP packets for the TCP connection are directed to the RCP collector service 443. (In an alternative arrangement, the connection could be split as is done in a conventional standalone IP switch.)

In view of the above, there has been provided a method and system for wide-area distribution of read-only data over an IP network. Consistent updates are made automatically over the wide-area network, and concurrently with read-only access to the remote copies. A replication control protocol (RCP) is layered over TCP/IP providing the capability for a remote site to replicate and rebroadcast blocks of the remote copy data to specified groups of destinations, as configured in a routing table. A volume multicast layer over RCP provides for multicasting to specified volume extents of the blocks. The blocks are copied at the logical level, so that it does not matter what physical structure is used for storing the remote copies. Save volumes buffer the remote copy data transmitted between the primary or secondary file system volume and the IP network, in order to ensure independence between the replication process, the IP transport method, and the primary file system being replicated. The save volumes store the progress of the replication over the IP network so as to maintain the consistency of the replication process upon panic, reboot, and recovery.

What is claimed is:

1. In a data processing system having a plurality of host computers linked by an Internet Protocol (IP) network to a plurality of data storage systems, each of the data storage systems having data storage and at least one data mover computer for moving data between the data storage and the IP network, a method of distributing remote copy data over the IP network from a primary one of the data mover computers to a plurality of secondary ones of the data mover computers, wherein the method comprises:

the primary data mover computer sending the remote copy data over the IP network to at least one forwarder data mover computer, and the forwarder data mover computer routing the remote copy data over the IP network to the plurality of secondary data mover computers;

wherein the primary data mover computer manages a primary file system in the data storage of the storage system including the primary data mover computer, each secondary data mover computer manages a secondary file system in the data storage of the data storage system including said each secondary data mover computer, and each secondary file system is maintained as a remote copy of the primary file system; and which includes operating a replication service that transmits modifications of the primary file system to the secondary data mover computers, and then creating a new secondary file system by copying the primary file system to the new secondary file system concurrent with the operation of the replication service, and after the primary file system has been copied to the new secondary file system, updating the new secondary file system with modifications transmitted by the replication service from the primary file system;

wherein the replication service transmits modifications from the primary file system to a save volume during the copying of the primary file system to the new secondary file system, and upon completion of the copying of the primary file system to the new secondary file system, the modifications are copied from the save volume to the new secondary file system; and wherein the new secondary file system is at a remote site and the save volume is at the remote site, and the method includes transmitting at least a portion of the modifications of the primary file system to the save volume concurrently with the copying of the primary file system to the new secondary file system.

2. In a data processing system having a plurality of host computers linked by an Internet Protocol (IP) network to a plurality of data storage systems, each of the data storage systems having data storage and at least one data mover computer for moving data between the data storage and the IP network, a method of distributing remote copy data over the IP network from a primary one of the data mover computers to a plurality of secondary ones of the data mover computers, wherein the method comprises:

the primary data mover computer sending the remote copy data over the IP network to at least one forwarder data mover computer, and the forwarder data mover computer routing the remote copy data over the IP network to the plurality of secondary data mover computers;

wherein the primary data mover computer manages a primary file system in the data storage of the storage system including the primary data mover computer, each secondary data mover computer manages a secondary file system in the data storage of the data storage system including said each secondary data mover computer, and each secondary file system is maintained as a remote copy of the primary file system; and wherein the remote copy is a copy by extent, so that there is not a remote copy of data blocks that are not used in the primary file system.

3. The method as claimed in claim 2, wherein the data blocks are remote copied at a logical level, so that it does not matter what physical structure is used for storing the data blocks in the secondary file systems.

4. The method as claimed in claim 2, wherein the primary data mover computer repetitively identifies a next valid block in a volume of the primary file system and identifies a number of valid contiguous blocks following the next valid block in the volume of the primary file system and transmits the next valid block and the number of valid contiguous blocks to said each secondary data mover computer.

5. In a data processing system having a plurality of host computers linked by an Internet Protocol (IP) network to a plurality of data storage systems, each of the data storage systems having data storage and at least one data mover computer for moving data between the data storage and the IP network, a method of distributing remote copy data over the IP network from a primary one of the data mover computers to a plurality of secondary ones of the data mover computers, wherein the method comprises:

the primary data mover computer sending the remote copy data over the IP network to at least one forwarder data mover computer, and the forwarder data mover computer routing the remote copy data over the IP network to the plurality of secondary data mover computers;

wherein only one TCP port to the IP network is used in the forwarder data mover computer for receiving and transmitting the remote copy data to and from the network, and the one TCP port is shared with HTTP connections.

6. In a data processing system having a plurality of host computers linked by an Internet Protocol (IP) network to a plurality of data storage systems, each of the data storage systems having data storage and at least one data mover computer for moving data between the data storage and the IP network, a method of distributing remote copy data over the IP network from a primary one of the data mover computers to a plurality of secondary ones of the data mover computers, wherein the method comprises:

the primary data mover computer sending the remote copy data over the IP network to at least one forwarder data mover computer, and the forwarder data mover computer routing the remote copy data over the IP network to the plurality of secondary data mover computers;

wherein a TCP port to the IP network is used in the forwarder data mover computer for receiving the remote copy data from the network, the TCP port is shared with HTTP connections, a level 5 filter in the forwarder data mover computer passes IP packets of HTTP connections from the TCP port to an HTTP collector service in the forwarder data mover computer, and the level 5 filter passes IP packets of the remote copy data from the TCP port to a replication collector service in the forwarder data mover computer.

7. A data processing system comprising:

a plurality of data storage systems linked by an Internet Protocol (IP) network for access by a plurality of host computers, each of the storage systems having data storage and at least one data mover computer for moving data between the data storage and the IP network, the data mover computers including means for distributing remote copy data over the IP network from a primary one of the data mover computers to a plurality of secondary ones of the data mover computers by the primary data mover computer sending the remote copy data over the IP network to at least one forwarder data mover computer, and the forwarder data mover computer routing the remote copy data over the IP network to the plurality of secondary data mover computers;

wherein the primary data mover computer includes means for managing a primary file system in the data storage of the storage system including the primary data mover computer, and each secondary data mover computer includes means for managing a secondary file system in the data storage of the data storage system including said each secondary data mover computer by maintaining each secondary file system as a remote copy of the primary file system;

which includes a replication service for transmitting modifications of the primary file system to the secondary data mover computers, and means for creating a new secondary file system by copying the primary file system to the new secondary file system concurrent with the operation of the replication service, and after the primary file system has been copied to the new secondary file system, updating the new secondary file system with modifications transmitted by the replication service from the primary file system;

wherein the replication service transmits modifications from the primary file system to a save volume during the copying of the primary file system to the new secondary file system, and upon completion of the copying of the primary file system to the new secondary file system, the modifications are copied from the save volume to the new secondary file system; and wherein the new secondary file system is at a remote site and the save volume is at the remote site, and the replication service transmits at least a portion of the modifications of the primary file system to the save volume concurrently with the copying of the primary file system to the new secondary file system.

8. A data processing system comprising:

a plurality of data storage systems linked by an Internet Protocol (IP) network for access by a plurality of host computers, each of the storage systems having data storage and at least one data mover computer for moving data between the data storage and the IP network, the data mover computers including means for distributing remote copy data over the IP network from a primary one of the data mover computers to a plurality of secondary ones of the data mover computers by the primary data mover computer sending the remote copy data over the IP network to at least one forwarder data mover computer, and the forwarder data mover computer routing the remote copy data over the IP network to the plurality of secondary data mover computers;

wherein the primary data mover computer includes means for managing a primary file system in the data storage of the storage system including the primary data mover computer, and each secondary data mover computer includes means for managing a secondary file system in the data storage of the data storage system including said each secondary data mover computer by maintaining each secondary file system as a remote copy of the primary file system;

wherein the remote copy is a copy by extent, so that there is not a remote copy of data blocks that are not used in the primary file system.

9. The data processing system as claimed in claim 8, wherein the data blocks are remote copied at a logical level, so that it does not matter what physical structure is used for storing the data blocks in the secondary file systems.

10. The data processing system as claimed in claim 8, wherein the primary data mover computer is programmed to repetitively identify a next valid block in a volume of the primary file system and identify a number of valid contiguous blocks following the next valid block in the volume of the primary file system and transmit the next valid block and the number of valid contiguous blocks to said each secondary data mover computer.

11. A data processing system comprising:

a plurality of data storage systems linked by an Internet Protocol (IP) network for access by a plurality of host computers, each of the storage systems having data storage and at least one data mover computer for moving data between the data storage and the IP network, the data mover computers including means for distributing remote copy data over the IP network from a primary one of the data mover computers to a plurality of secondary ones of the data mover computers by the primary data mover computer sending the remote copy data over the IP network to at least one forwarder data mover computer, and the forwarder data mover computer routing the remote copy data over the IP network to the plurality of secondary data mover computers;

wherein the forwarder data mover computer includes only one TCP port to the IP network for receiving and transmitting the remote copy data to and from the network, the one TCP port also servicing HTTP connections.

12. A data processing system comprising:

a plurality of data storage systems linked by an Internet Protocol (IP) network for access by a plurality of host computers, each of the storage systems having data storage and at least one data mover computer for moving data between the data storage and the IP network, the data mover computers including means for distributing remote copy data over the IP network from a primary one of the data mover computers to a plurality of secondary ones of the data mover computers by the primary data mover computer sending the remote copy data over the IP network to at least one forwarder data mover computer, and the forwarder data mover computer routing the remote copy data over the IP network to the plurality of secondary data mover computers;

wherein the forwarder data mover computer further includes an HTTP collector service, a replication collector service, a TCP port to the IP network for receiving IP packets of the remote copy data from the network and for receiving IP packets of HTTP connections, and a level 5 filter for passing the IP packets of the HTTP connections from the TCP port to the HTTP collector service and passing the IP packets of the remote copy data from the TCP port to the replication collector service.

\* \* \* \* \*